United States Patent
Obata

(10) Patent No.: US 8,769,051 B2
(45) Date of Patent: Jul. 1, 2014

(54) METHOD AND SYSTEM FOR PREDICTION OF SOFTWARE DATA CONSUMPTION PATTERNS

(75) Inventor: Kenji C. Obata, Seattle, WA (US)

(73) Assignee: Code Systems Corporation, Seattle, WA (US)

( * ) Notice: Subject to any disclaimer, the term of this patent is extended or adjusted under 35 U.S.C. 154(b) by 791 days.

(21) Appl. No.: 12/879,947

(22) Filed: Sep. 10, 2010

(65) Prior Publication Data

US 2012/0005310 A1 Jan. 5, 2012

Related U.S. Application Data

(60) Provisional application No. 61/361,373, filed on Jul. 2, 2010.

(51) Int. Cl.
*G06F 15/16* (2006.01)
(52) U.S. Cl.
USPC ............... 709/219; 709/200; 709/203; 726/5; 707/827
(58) Field of Classification Search
USPC ................ 709/200, 203, 219; 726/5; 707/827
See application file for complete search history.

(56) References Cited

U.S. PATENT DOCUMENTS

| | | | |
|---|---|---|---|
| 4,468,732 A | 8/1984 | Raver | |
| 5,437,031 A | 7/1995 | Kitami | |
| 5,495,610 A | 2/1996 | Shing et al. | |
| 5,860,068 A | 1/1999 | Cook | |
| 5,987,590 A | 11/1999 | Wing So | |
| 6,023,712 A | 2/2000 | Spear et al. | |
| 6,263,363 B1 | 7/2001 | Rosenblatt et al. | |
| 6,453,334 B1 | 9/2002 | Vinson et al. | |
| 6,493,733 B1 | 12/2002 | Pollack et al. | |
| 6,564,229 B1 | 5/2003 | Baweja et al. | |
| 6,675,216 B1 | 1/2004 | Quatrano et al. | |
| 6,704,808 B2 | 3/2004 | Kasamatsu et al. | |
| 7,064,760 B2 | 6/2006 | Capin et al. | |
| 7,089,259 B1 | 8/2006 | Kouznetsov et al. | |
| 7,096,253 B2 | 8/2006 | Vinson et al. | |

(Continued)

OTHER PUBLICATIONS

Chapin, "Hive: Operating System Fault Containment for Shared-Memory Multiprocessors", Technical Report No. CSL-TR-97-712, Computer Systems Laboratory, Departments of Electrical Engineering and Computer Science, Stanford University, Jul. 1997, 156 pages.

(Continued)

*Primary Examiner* — Anthony Mejia
(74) *Attorney, Agent, or Firm* — Davis Wright Tremaine LLP; Heather M. Colburn

(57) ABSTRACT

A method including downloading a streaming model file and at least one initial execution file from a server via a conventional download protocol without using a specialized streaming protocol. When executed, the initial execution file only partially implements an application. The model file stores information identifying additional portions of the application file to be downloaded from the server. Data is read from the initial execution file, and stored in a local copy of the application file. Then, the application is executed by executing the local copy. Until the entire application file has been downloaded and as the application is executing, the information is read from the model file to identify a next file to download, the next file is downloaded via the conventional download protocol without using a specialized streaming protocol, next data is read from the next file, and the next data is stored in the local copy.

46 Claims, 21 Drawing Sheets

(56) References Cited

U.S. PATENT DOCUMENTS

| | | |
|---|---|---|
| 7,096,416 B1 | 8/2006 | Smith et al. |
| 7,117,495 B2 | 10/2006 | Blaser et al. |
| 7,130,073 B2 | 10/2006 | Kumar et al. |
| 7,162,036 B2 | 1/2007 | Rowe |
| 7,240,162 B2 | 7/2007 | De Vries |
| 7,272,613 B2 | 9/2007 | Sim et al. |
| 7,337,298 B2 | 2/2008 | Kawachiya et al. |
| 7,356,679 B1 | 4/2008 | Le et al. |
| 7,360,097 B2 | 4/2008 | Rothstein |
| 7,386,542 B2 | 6/2008 | Maybury et al. |
| 7,437,371 B2 | 10/2008 | Rathakrishnan et al. |
| 7,451,196 B1 | 11/2008 | de Vries et al. |
| 7,499,991 B2 | 3/2009 | Johnson |
| 7,523,116 B2 * | 4/2009 | Yan ........................................ 1/1 |
| 7,536,541 B2 | 5/2009 | Isaacson |
| 7,577,751 B2 | 8/2009 | Vinson et al. |
| 7,590,644 B2 | 9/2009 | Matsakis et al. |
| 7,600,097 B1 | 10/2009 | Wright |
| 7,623,673 B2 | 11/2009 | Mercier |
| 7,634,477 B2 | 12/2009 | Hinshaw |
| 7,664,367 B2 | 2/2010 | Suzuki |
| 7,669,189 B1 | 2/2010 | Umamageswaran |
| 7,689,825 B2 | 3/2010 | Iwamura |
| 7,707,564 B2 | 4/2010 | Marvin et al. |
| 7,743,407 B2 | 6/2010 | Sprigg et al. |
| 7,752,511 B2 | 7/2010 | Fulton et al. |
| 7,761,503 B2 | 7/2010 | Dhawan et al. |
| 7,797,748 B2 | 9/2010 | Zheng et al. |
| 7,801,827 B2 | 9/2010 | Bishop et al. |
| 7,831,047 B2 | 11/2010 | Rowe |
| 7,840,961 B1 | 11/2010 | Weathersby |
| 7,950,026 B1 * | 5/2011 | Urbach ........................ 719/329 |
| 7,970,789 B1 | 6/2011 | Blaser et al. |
| 8,010,667 B2 | 8/2011 | Zhang et al. |
| 8,065,675 B2 | 11/2011 | Strauss et al. |
| 8,069,443 B2 | 11/2011 | Ackerman et al. |
| 8,219,805 B1 | 7/2012 | Le et al. |
| 8,230,442 B2 | 7/2012 | Aho et al. |
| 8,271,944 B2 | 9/2012 | Austin et al. |
| 8,375,140 B2 * | 2/2013 | Tippin et al. ................. 709/236 |
| 8,387,006 B1 | 2/2013 | Taylor |
| 8,434,093 B2 | 4/2013 | Larimore et al. |
| 8,468,175 B2 | 6/2013 | Obata |
| 8,489,513 B2 | 7/2013 | Bishop et al. |
| 2001/0016905 A1 | 8/2001 | Kasamatsu et al. |
| 2002/0029283 A1 | 3/2002 | Beckett et al. |
| 2002/0032754 A1 | 3/2002 | Logston et al. |
| 2002/0099951 A1 | 7/2002 | O'Connor |
| 2002/0129129 A1 * | 9/2002 | Bloch et al. .................... 709/220 |
| 2002/0133491 A1 | 9/2002 | Sim et al. |
| 2002/0161578 A1 | 10/2002 | Saidon et al. |
| 2002/0162015 A1 | 10/2002 | Tang |
| 2003/0031176 A1 * | 2/2003 | Sim ................................ 370/392 |
| 2003/0051169 A1 | 3/2003 | Sprigg et al. |
| 2004/0083474 A1 | 4/2004 | McKinlay et al. |
| 2004/0128342 A1 | 7/2004 | Maes et al. |
| 2004/0139315 A1 | 7/2004 | Tokutani et al. |
| 2005/0132359 A1 | 6/2005 | McGuire et al. |
| 2005/0198647 A1 | 9/2005 | Hipp et al. |
| 2005/0262553 A1 | 11/2005 | Bialick et al. |
| 2005/0273772 A1 | 12/2005 | Matsakis et al. |
| 2006/0048136 A1 | 3/2006 | Vries et al. |
| 2006/0053380 A1 | 3/2006 | Spataro et al. |
| 2006/0074733 A1 | 4/2006 | Shukla et al. |
| 2006/0075064 A1 * | 4/2006 | Keohane et al. ............... 709/217 |
| 2006/0123185 A1 | 6/2006 | de Vries et al. |
| 2006/0168294 A1 | 7/2006 | de Vries et al. |
| 2006/0218165 A1 | 9/2006 | Vries et al. |
| 2006/0222203 A1 | 10/2006 | Mercier |
| 2006/0230175 A1 | 10/2006 | de Vries et al. |
| 2006/0242626 A1 | 10/2006 | Pham et al. |
| 2006/0248442 A1 | 11/2006 | Rosenstein et al. |
| 2006/0253535 A1 | 11/2006 | Betros et al. |
| 2006/0256130 A1 | 11/2006 | Gonzalez |
| 2007/0016721 A1 | 1/2007 | Gay |
| 2007/0043943 A1 | 2/2007 | Peretti |
| 2007/0078988 A1 | 4/2007 | Miloushev et al. |
| 2007/0143704 A1 | 6/2007 | Laird-McConnell |
| 2007/0168953 A1 * | 7/2007 | Diez et al. ...................... 717/118 |
| 2007/0168965 A1 | 7/2007 | Zenz et al. |
| 2007/0174824 A1 | 7/2007 | Relyea et al. |
| 2007/0226798 A1 | 9/2007 | Sibert |
| 2007/0234277 A1 | 10/2007 | Lei et al. |
| 2007/0240155 A1 | 10/2007 | Shlomai |
| 2007/0245331 A1 | 10/2007 | Daynes et al. |
| 2007/0294674 A1 | 12/2007 | Marilly et al. |
| 2008/0010389 A1 | 1/2008 | Iwata |
| 2008/0155171 A1 | 6/2008 | Jeong |
| 2008/0163194 A1 | 7/2008 | Dias et al. |
| 2008/0181230 A1 * | 7/2008 | Hitt et al. ................... 370/395.1 |
| 2008/0184135 A1 | 7/2008 | Washburn et al. |
| 2008/0235680 A1 | 9/2008 | Strauss |
| 2008/0281882 A1 | 11/2008 | Hachio et al. |
| 2008/0294877 A1 | 11/2008 | Haga et al. |
| 2008/0298219 A1 | 12/2008 | Yamagata et al. |
| 2008/0301672 A1 | 12/2008 | Rao et al. |
| 2009/0055542 A1 | 2/2009 | Zhao et al. |
| 2009/0064086 A1 | 3/2009 | Faus et al. |
| 2009/0076966 A1 | 3/2009 | Bishop et al. |
| 2009/0077551 A1 | 3/2009 | Whiteley |
| 2009/0110307 A1 | 4/2009 | Markowitz |
| 2009/0158432 A1 | 6/2009 | Zheng et al. |
| 2009/0193057 A1 | 7/2009 | Maes |
| 2009/0198358 A1 * | 8/2009 | Logan et al. ..................... 700/94 |
| 2009/0235158 A1 | 9/2009 | Rosenstein et al. |
| 2009/0240663 A1 | 9/2009 | Plattner et al. |
| 2009/0249071 A1 | 10/2009 | De Atley et al. |
| 2009/0300076 A1 * | 12/2009 | Friedman et al. ............. 707/203 |
| 2009/0300151 A1 * | 12/2009 | Friedman et al. ............. 709/222 |
| 2009/0307351 A1 | 12/2009 | Raja et al. |
| 2009/0307763 A1 | 12/2009 | Rawlins et al. |
| 2009/0313322 A1 * | 12/2009 | Sheehan et al. ............... 709/203 |
| 2009/0328030 A1 | 12/2009 | Fries |
| 2010/0005291 A1 | 1/2010 | Hulten et al. |
| 2010/0023640 A1 | 1/2010 | Vinson et al. |
| 2010/0023934 A1 | 1/2010 | Sheehan et al. |
| 2010/0037206 A1 | 2/2010 | Larimore et al. |
| 2010/0037235 A1 | 2/2010 | Larimore et al. |
| 2010/0077096 A1 | 3/2010 | Philip et al. |
| 2010/0088448 A1 * | 4/2010 | Min et al. ....................... 710/301 |
| 2010/0106804 A1 * | 4/2010 | He et al. ........................ 709/219 |
| 2010/0107163 A1 | 4/2010 | Lee |
| 2010/0121973 A1 | 5/2010 | Lobacheva et al. |
| 2010/0138479 A1 | 6/2010 | Zhu |
| 2010/0146590 A1 | 6/2010 | Jung |
| 2010/0205604 A1 | 8/2010 | Brower et al. |
| 2010/0241718 A1 | 9/2010 | Rasmussen et al. |
| 2010/0250782 A1 | 9/2010 | Pratt et al. |
| 2010/0281458 A1 | 11/2010 | Paladino et al. |
| 2010/0306849 A1 | 12/2010 | Zheng et al. |
| 2011/0004840 A1 | 1/2011 | Feinberg et al. |
| 2011/0078625 A1 | 3/2011 | Mumford et al. |
| 2011/0145428 A1 | 6/2011 | Wei et al. |
| 2011/0145726 A1 | 6/2011 | Wei et al. |
| 2011/0153975 A1 | 6/2011 | Accapadi et al. |
| 2011/0173607 A1 | 7/2011 | Murphey et al. |
| 2011/0185013 A1 | 7/2011 | Obata et al. |
| 2011/0185043 A1 | 7/2011 | Zeller et al. |
| 2011/0191772 A1 | 8/2011 | Larimore et al. |
| 2011/0246659 A1 | 10/2011 | Bouazizi |
| 2011/0289513 A1 | 11/2011 | Degirmenci et al. |
| 2012/0005237 A1 | 1/2012 | Obata |
| 2012/0005244 A1 | 1/2012 | Obata et al. |
| 2012/0005246 A1 | 1/2012 | Obata |
| 2012/0005309 A1 | 1/2012 | Obata et al. |
| 2012/0005674 A1 | 1/2012 | Larimore et al. |
| 2012/0096071 A1 | 4/2012 | Murphey et al. |
| 2012/0110337 A1 | 5/2012 | Murphey et al. |
| 2012/0203807 A1 | 8/2012 | Larimore et al. |

(56) References Cited

U.S. PATENT DOCUMENTS

2012/0203808 A1   8/2012   Larimore et al.
2013/0132525 A1*  5/2013   Tippin .................. 709/219

OTHER PUBLICATIONS

Final Office Action received in U.S. Appl. No. 12/188,155, dated Aug. 31, 2012, 22 pages.
Final Office Action received in U.S. Appl. No. 12/695,107, dated Oct. 30, 2012, 16 pages.
Final Office Action received in U.S. Appl. No. 12/876,085, dated Nov. 14, 2012, 12 pages.
Information Disclosure Statement Transmittal Letter filed herewith on Nov. 21, 2012, 2 pages.
Non-Final Office Action received in U.S. Appl. No. 12/695,107, dated Dec. 8, 2011, 17 pages.
Non-Final Office Action received in U.S. Appl. No. 12/188,155, dated Dec. 19, 2011, 19 pages.
Non-Final Office Action received in U.S. Appl. No. 12/876,085, dated Mar. 8, 2012, 9 pages.
Non-Final Office Action received in U.S. Appl. No. 12/188,161, dated May 10, 2012, 14 pages.
Non-Final Office Action received in U.S. Appl. No. 12/879,956, dated Jun. 6, 2012, 11 pages.
Non-Final Office Action received in U.S. Appl. No. 13/171,258, dated Jul. 13, 2012, 15 pages.
Non-Final Office Action received in U.S. Appl. No. 12/876,082, dated Oct. 22, 2012, 18 pages.
Non-Final Office Action received in U.S. Appl. No. 12/916,348, dated Oct. 24, 2012, 24 pages.
Non-Final Office Action received in U.S. Appl. No. 12/685,576, dated Nov. 2, 2012, 8 pages.
Non-Final Office Action received in U.S. Appl. No. 12/906,904, dated Nov. 13, 2012, 19 pages.
Notice of Allowance received in U.S. Appl. No. 12/877,918, dated Mar. 19, 2012, 25 pages.
Notice of Allowance received in U.S. Appl. No. 12/877,918, dated Jun. 21, 2012, 31 pages.
Notice of Allowance received in U.S. Appl. No. 12/877,918, dated Aug. 16, 2012, 22 pages.
Notice of Allowance received in U.S. Appl. No. 12/877,918, dated Sep. 26, 2012, 24 pages.
Notice of Allowance received in U.S. Appl. No. 12/697,029, dated Aug. 17, 2012, 21 pages.
Notice of Allowance received in U.S. Appl. No. 12/188,161, dated Oct. 10, 2012, 13 pages.
Restriction Requirement received in U.S. Appl. No. 12/188,161, dated Dec. 20, 2011, 5 pages.
Restriction Requirement received in U.S. Appl. No. 12/876,085, dated Jan. 27, 2012, 6 pages.
Thinstall, "Application Virtualization: A Technical Overview of the Thinstall Application Virtualization Platform," Thinstall (Nov. 26, 2006 (retrieved from the Internet Archive Wayback Machine on Dec. 2, 2011 at http://web.archive.org/web/20061124201334/http://thinstall.com/products/respurces_geth.php?aid=5), 12 pages.
Susitaival, Riikka et al., Analyzing the File Availability and Download Time in a P2P File Sharing System, IEEE, pp. 88-95, 2007.
Final Office Action issued in U.S. Appl. No. 12/879,956, dated Nov. 23, 2012.
Notice of Allowance issued in U.S. Appl. No. 12/879,956, dated Feb. 21, 2013.
Final Office Action issued in U.S. Appl. No. 13/171,258, dated Jan. 11, 2013.
Final Office Action issued in U.S. Appl. No. 12/916,348, dated Jul. 11, 2013.
Non-Final Office Action issued in U.S. Appl. No. 13/449,140, dated Dec. 7, 2012.
Final Office Action issued in U.S. Appl. No. 13/449,140, dated Jul. 22, 2013.
Non-Final Office Action issued in U.S. Appl. No. 13/088,265, dated Dec. 12, 2012.
Final Office Action issued in U.S. Appl. No. 13/088,265, dated Jul. 25, 2013.
Non-Final Office Action issued in U.S. Appl. No. 12/685,576, dated Jun. 20, 2013.
Final Office Action issued in U.S. Appl. No. 12/906,904, dated Jul. 31, 2013.
Non-Final Office Action issued in U.S. Appl. No. 12/876,085, dated Mar. 18, 2013.
Non-Final Office Action issued in U.S. Appl. No. 12/879,947, dated Jul. 10, 2013.
Notice of Allowance issued in U.S. Appl. No. 12/877,918, dated Aug. 20, 2013.
Notice of Allowance issued in U.S. Appl. No. 12/697,029, dated May 24, 2013.
Notice of Allowance issued in U.S. Appl. No. 12/188,161, dated Dec. 4, 2012.
Notice of Allowance issued in U.S. Appl. No. 12/188,161, dated Jan. 4, 2013.
Notice of Allowance issued in U.S. Appl. No. 12/876,082, dated May 10, 2013.
Non-Final Office Action issued in U.S. Appl. No. 13/449,049, dated Dec. 13, 2012.
Notice of Allowance issued in U.S. Appl. No. 13/449,049, dated Apr. 29, 2013.
Notice of Allowance issued in U.S. Appl. No. 13/449,049, dated Aug. 13, 2013.
Non-Final Office Action issued in U.S. Appl. No. 12/188,155, dated Feb. 28, 2013.
Notice of Allowance issued in U.S. Appl. No. 12/188,155, dated Jun. 25, 2013.
Restriction Requirement issued in U.S. Appl. No. 12/705,492, dated Mar. 15, 2013.
Notice of Allowance issued in U.S. Appl. No. 12/877,918, dated Apr. 26, 2013.
Information Disclosure Statement Transmittal Letter filed herewith, Oct. 21, 2013.
Notice of Allowance issued in U.S. Appl. No. 12/188,155, dated Oct. 25, 2013.
Notice of Allowance issued in U.S. Appl. No. 12/876,085, dated Nov. 14, 2013.
Notice of Allowance issued in U.S. Appl. No. 12/916,348, dated Nov. 13, 2013.
Non-Final Rejection issued in U.S. Appl. No. 13/449,140, dated Nov. 15, 2013.
Notice of Allowance issued in U.S. Appl. No. 12/877,918, dated Dec. 13, 2013.
Notice of Allowance issued in U.S. Appl. No. 12/876,085, dated Mar. 6, 2014.
Final Office Action issued in U.S. Appl. No. 12/685,576, dated Jan. 30, 2014.
Notice of Allowance issued in U.S. Appl. No. 12/188,155, dated Feb. 13, 2014.
Notice of Allowance issued in U.S. Appl. No. 13/088,265, dated Feb. 14, 2014.
Non-Final Office Action issued in U.S. Appl. No. 13/683,969, dated Feb. 28, 2014.
Notice of Allowance issued in U.S. Appl. No. 12/876,082, dated Feb. 28, 2014.
Non-Final Office Action issued in U.S. Appl. No. 13/918,067, dated Feb. 27, 2014.
Non-Final Office Action issued in U.S. Appl. No. 13/171,258, dated Apr. 29, 2014.

* cited by examiner

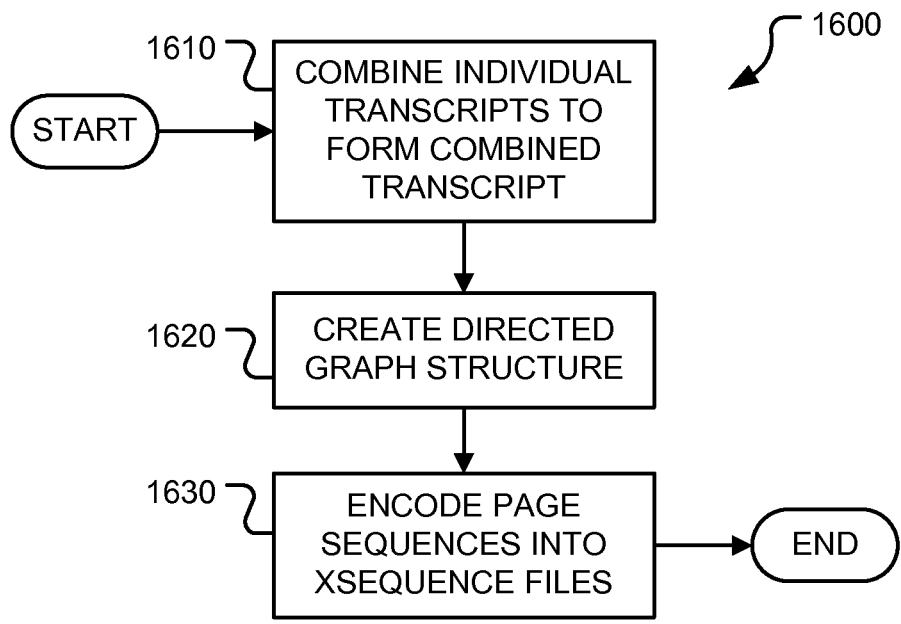
FIGURE 23
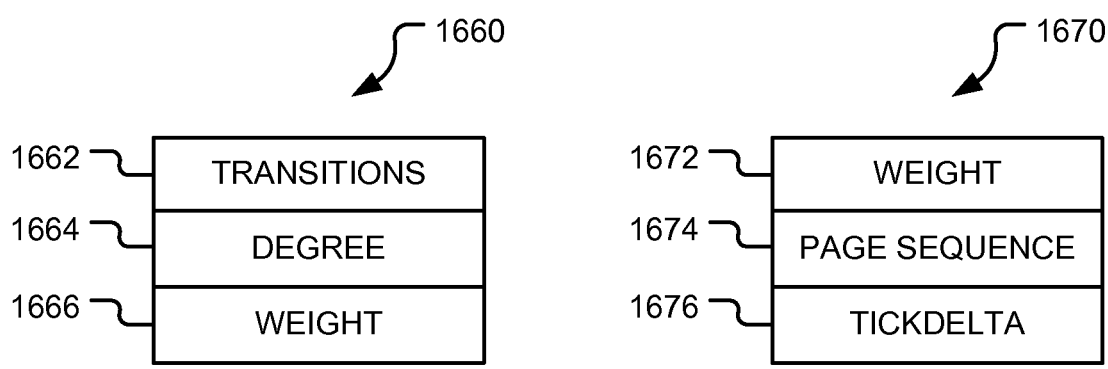
FIGURE 24
FIGURE 25

METHOD AND SYSTEM FOR PREDICTION OF SOFTWARE DATA CONSUMPTION PATTERNS

CROSS REFERENCE TO RELATED APPLICATION(S)

This application claims the benefit of U.S. Provisional Application No. 61/361,373, filed Jul. 2, 2010, which is incorporated herein by reference in its entirety.

BACKGROUND OF THE INVENTION

1. Field of the Invention

The present invention is directed generally to methods and systems for profiling access to a file that implements an application.

2. Description of the Related Art

A virtual application is a virtual machine image pre-configured with all of the files, registry data, settings, components, runtimes, and other dependencies required for a specific application to execute immediately and without installation on a host computing device. The virtual application is partially isolated from other applications implemented on a host computing device and partially isolated from an underlying host operating system installed and executing on the host computing device. The virtual application is encapsulated from the host operating system by a virtual runtime environment, which includes a virtual operating system, that receives operations performed by the virtualized application and redirects them to one or more virtualized locations (e.g., a virtual filesystem, virtual registry, and the like).

Thus, the virtual application may be conceptualized as including two components: a virtualization runtime and a virtual application configuration. The virtualization runtime implements the virtual runtime environment, which implements various operating system application programming interfaces ("APIs") in such a way that allows the executing virtual application to access and interact with items that may not be present on the host computer. The virtual application configuration includes data necessary to implement the virtual application within the virtualization runtime.

The virtual application is stored in and implemented by one or more data files and/or executable files. Depending upon the implementation details, the one or more data files and/or executable files storing and implementing the virtual application may include blocks of data corresponding to each application file of a natively installed version of the application. Herein, these blocks of data will be referred to as "virtual application files." The one or more data files and/or executable files storing and implementing the virtual application also include configuration information.

The data files and/or executable files are configured to execute within a virtual runtime environment that is provided at least in part by the virtual operating system. When the virtual application is executed within the virtual runtime engine, the configuration information is used to configure the virtual operating system to execute the virtual application. For example, the configuration information may contain information related to the virtual application files, virtual registry entries, environment variables, services, and the like. The virtual operating system is configured to communicate with the host operating system as required to execute the virtual application on the host computing device.

To download and execute a virtual application, a user must either use a specialized streaming protocol or download the entire virtualized application file before executing the application. Therefore, a need exists for a method and system configured to download and execute a virtualized application file without first downloading the entire file or using a specialized streaming protocol. The virtual application can be executed using less than the entire virtualized application file provided the executing virtual application does not request access to a portion of the file that has not been downloaded. Therefore, a need exists for a method or system that determines in which order the virtual application will request access to portions of the virtualized application file. A need also exists for systems and methods for managing the download and execution of a virtual application by a virtual runtime engine. The present application provides these and other advantages as will be apparent from the following detailed description and accompanying figures.

BRIEF DESCRIPTION OF THE SEVERAL VIEWS OF THE DRAWING(S)

FIG. 23 is a flow diagram of a method of constructing the streaming model of FIG. 19.

FIG. 24 is a block diagram of a state object.

FIG. 25 is a block diagram of a transition data structure.

DETAILED DESCRIPTION OF THE INVENTION

Figure 1:
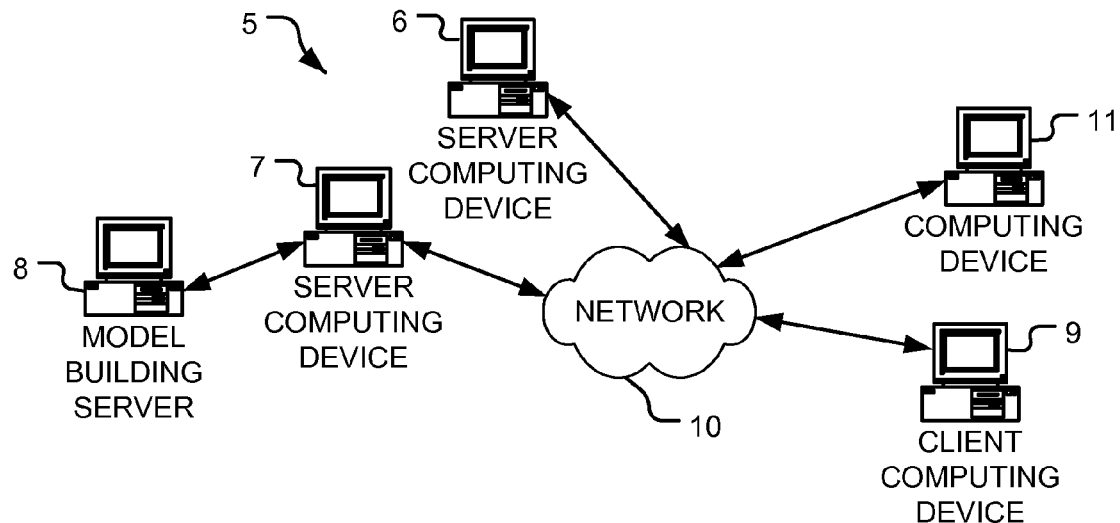
FIG. 1 is a diagram of a system for transferring a virtualized application file from a server computing device to a client computing device over a network.

FIG. 1 illustrates a system 5 for downloading or otherwise transferring a virtualized application file stored on a server computing device 7 to a client computing device 9 over a network 10 (e.g., the Internet, a WAN, a LAN, a combination thereof, and the like). One or more additional computing devices, such as a second server computing device 6 and a computing device 11, may also be coupled to the network 10. In the embodiment illustrated, the server computing device 7 is implemented as a web server. The server computing device 7 may be connected to one or more additional computing devices. In the embodiment illustrated, the server computing device 7 is connected to a model building server 8. Depending on the implementation details, the server computing device 7 may be connected to the model building server 8 by the network 10.

A diagram of hardware and an operating environment in conjunction with which implementations of the server computing device 7, the model building server 8, the client computing device 9, the computing device 11, and the network 10 may be practiced is provided in FIG. 28 and described below.

Figure 2:
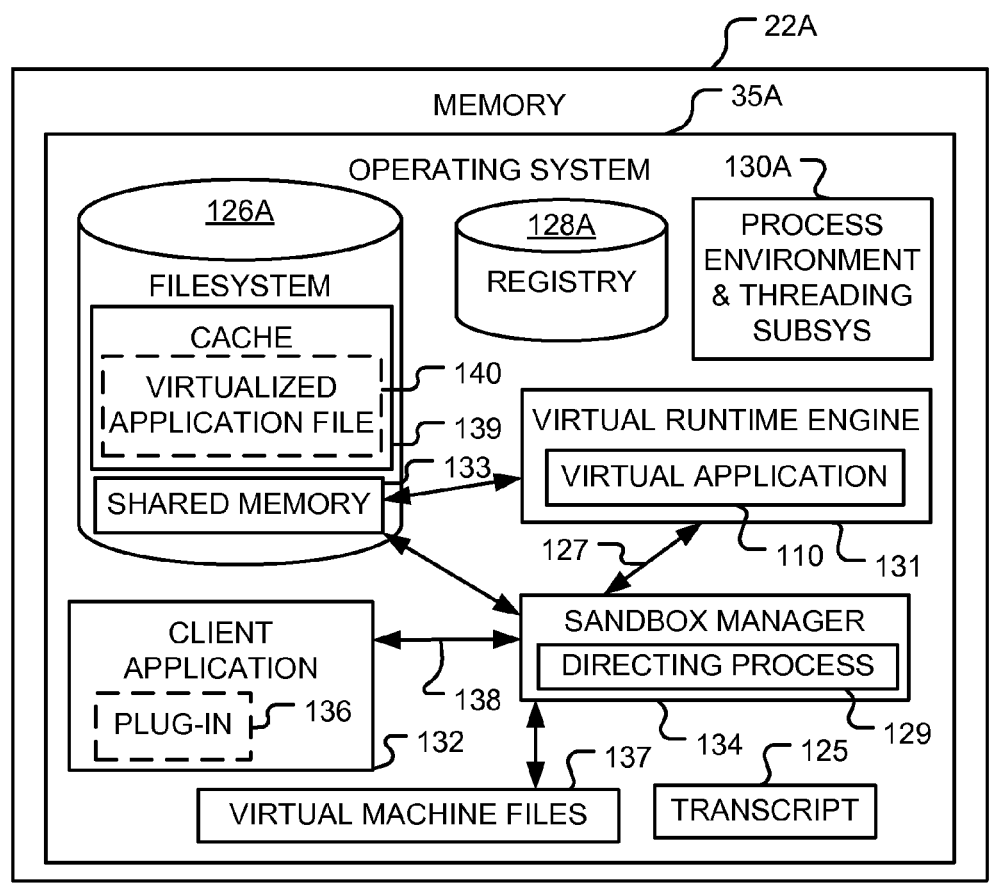
FIG. 2 is an illustration of a conceptualization of software components stored in a system memory of the client computing device of FIG. 1, the software components including a Client Application and a Sandbox Manager.

FIG. 2 illustrates a system memory 22A of the client computing device 9 (illustrated in FIG. 1) storing a conventional operating system 35A, that like most operating systems, includes a filesystem 126A, a registry 128A, and a process environment and threading subsystems component 130A. A Client Application 132 (e.g., a web browser application) and a Sandbox Manager 134 are also stored in the system memory 22A of the client computing device 9 (illustrated in FIG. 1). Optionally, the Client Application 132 may include a plug-in 136 or similar application. In the embodiment illustrated, the Client Application 132 communicates with the Sandbox Manager 134 over a communication link 138 that may be implemented as a Transmission Control Protocol ("TCP") connection using TCP protocol. Each virtualized application file being transferred and/or executed may be identified by a unique session identifier ("SessionId"). A cache 139 may be stored on the filesystem 126A for use by the Sandbox Manager 134. The Sandbox Manager 134 and Client Application 132 are described in detail in U.S. patent application Ser. No. 12/695,107, filed on Jan. 27, 2010, and titled SYSTEM FOR DOWNLOADING AND EXECUTING A VIRTUAL APPLICATION, which is incorporated herein by reference.

As explained above, a virtualized application file 140 is transferred to the client computing device 9 from the server computing device 7. The virtualized application file 140 is illustrated in dashed lines to indicate that the virtualized application file 140 is stored in the cache 139 during and after the download. However, before the download begins, the virtualized application file 140 is not stored in the cache 139. As will be explained below, the virtualized application file 140 may be an executable file or a file configured to execute within a virtualized environment provided by a virtual machine (or virtual runtime engine).

The system memory 22A stores one or more files implementing one or more virtual machines (or virtual runtime engines). By way of a non-limiting example, the system memory 22A may include a plurality of virtual machine executable files 137 that when executed, each implement a different virtual machine. For example, each of the virtual machine executable files 137 may implement a different version of the same virtual machine. The virtual machine executable files 137 may be executed individually. When executed, a virtual machine executable file implements a virtualized environment. Execution of a virtual machine executable file may be initiated by the Sandbox Manager 134 using a command including a parameter (e.g., a file path) identifying a virtualized application file to execute. In response to receiving the parameter, the virtual machine executable file executes the identified virtualized application file inside the virtualized environment implemented by the virtual machine executable file. FIG. 2 illustrates a virtual application 110 (implemented by the virtualized application file 140) being executed by a virtual runtime engine 131. The virtual runtime engine 131 may execute within an operating system shell process. Optionally, the virtual machine executable files 137 may be stored in the cache 139.

The Sandbox Manager 134 and the virtual runtime engine 131 may both have read/write access to a block of shared memory 133 that may be used to send settings and state information between the Sandbox Manager 134 and the virtual runtime engine 131.

The virtualized application file 140 includes a version identifier that may be used by the Sandbox Manager 134 to select which of the virtual machine executable files 137 is configured to execute the virtualized application file 140.

Figure 3:
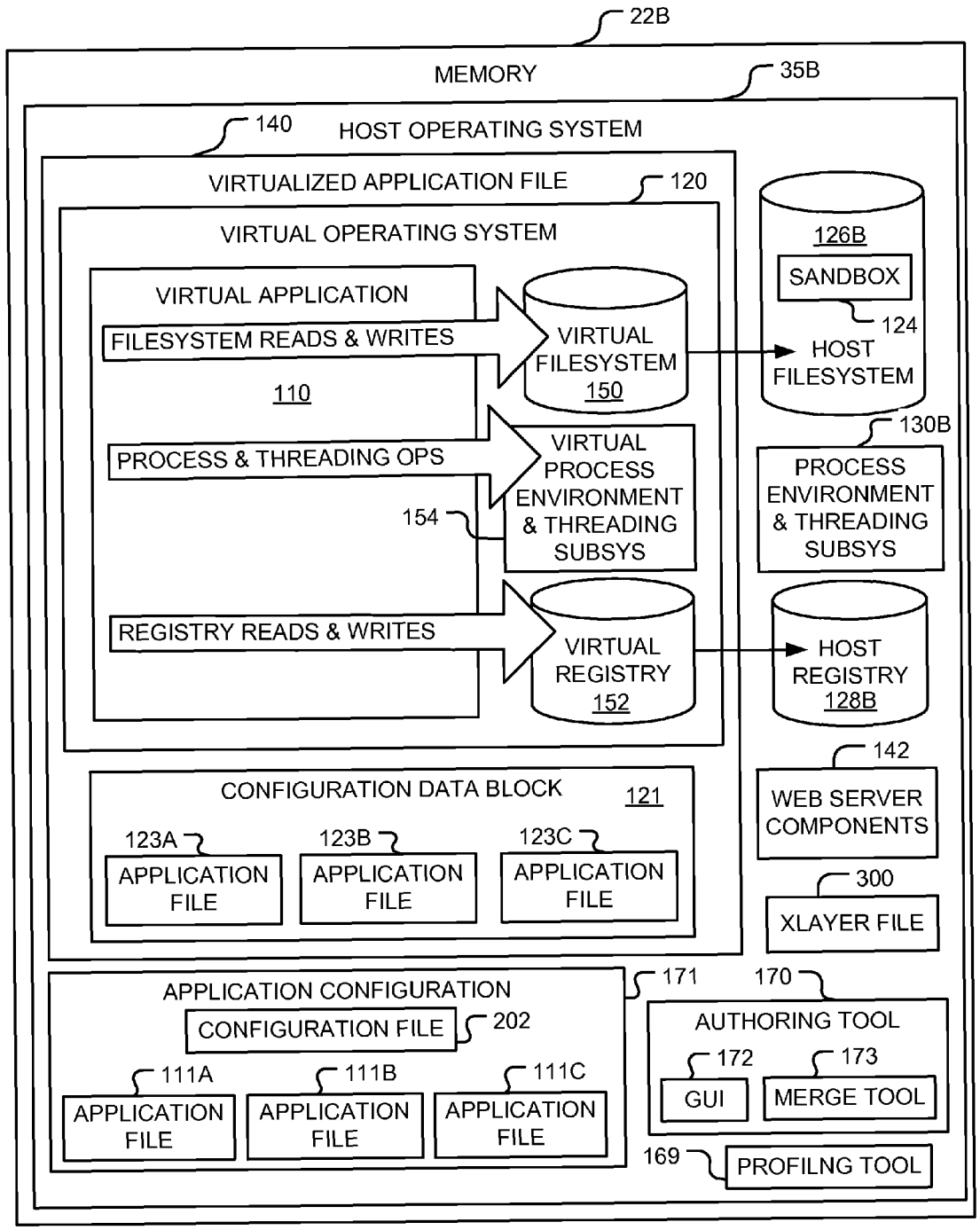
FIG. 3 is an illustration of a conceptualization of software components stored in memory and executing on the server computing device of FIG. 1, the software components include a virtualized application file, and a virtual application authoring tool.

FIG. 3 illustrates a system memory 22B of the server computing device 7 (illustrated in FIG. 1). The system memory 22B stores a conventional host operating system 35B, that like most operating systems, includes a host filesystem 126B, a host registry 128B, and a process environment and threading subsystems component 130B. FIG. 3 also illustrates an executable virtualized application file 140 stored in the system memory 22B and configured to execute on the host operating system 35A (see FIG. 2) of the client computing device 9 (illustrated in FIG. 1), optionally within a virtual machine implemented by a separate virtual machine executable file, without having been installed on the host operating system 35B. The virtualized application file 140 may be configured to execute on the operating system 35B of the server computing device 7 (illustrated in FIG. 1), optionally within a virtual machine (or virtual runtime engine) implemented by a separate virtual machine executable file, but this is not a requirement.

In the embodiment illustrated, the system memory 22B stores web server components 142 configured to implement a web server. The web server components 142 may be configured to provide a web page having one or more links to virtualized application files using standard Hypertext Transfer Protocol ("HTTP") protocol. By way of non-limiting examples, the web server components 142 may include Internet Information Services ("IIS") provided by Microsoft Corporation, Apache, and the like. While illustrated as being outside the filesystem 126B, those of ordinary skill in the art appreciate that the virtualized application file 140 and the web server components 142 may be conceptualized as being within the filesystem 126B.

The virtualized application file 140 may include components necessary to implement a virtual runtime environment including a virtual operating system 120 configured to execute in the operating system 35A (see FIG. 2) of the client computing device 9 (illustrated in FIG. 1). Alternatively, the virtual runtime environment may be implemented by one of the virtual machine executable files 137 (see FIG. 2). The virtualized application file 140 includes components necessary to implement the virtual application 110 configured to execute in the virtual runtime environment (provided by the virtual runtime engine 131 illustrated in FIG. 2). In particular embodiments, a single virtualized application file is used to implement both the virtual operating system 120 and the virtual application 110. However, those of ordinary skill in the art appreciate that more than one virtualized application file may be used to implement the virtual operating system 120 and the virtual application 110. For example, the components implementing the virtual runtime environment may be stored in one of the virtual machine executable files 137 (see FIG. 2) and the components implementing the virtual application 110 may be stored in the virtualized application file 140. Further, one or more of the files used to implement the virtual application 110 may be other than an executable file having the "exe" file extension.

The virtual operating system 120 includes a virtual filesystem 150, a virtual registry 152, and a virtual process environment and threading subsystems component 154. The virtual application 110 interacts with the virtual filesystem 150, virtual registry 152, and virtual process environment and threading subsystems component 154, instead of interacting directly with the host filesystem 126A, the host registry 128A, and the process environment and threading subsystems component 130A of the host operating system 35A illustrated in FIG. 2. The virtual operating system 120 is configured to communicate with the host operating system 35A illustrated in FIG. 2 as required to execute the virtual application 110.

The virtual application 110 executes inside a virtual runtime environment provided at least in part by the virtual operating system 120. Some virtual applications require one or more additional runtime environments to execute. For example, to execute a Flash application, the Flash runtime engine must also be installed. Therefore, to virtualize a Flash application, both the Flash application and Flash runtime engine must be included in the virtualized application file 140 and configured to execute in the portions of the virtual runtime environment provided by the virtual operating system 120. Collectively, all runtime components necessary to execute the virtual application 110 will be referred to as a virtual runtime engine. However, those of ordinary skill in the art appreciate that the virtual runtime engine may include only the virtual operating system 120 and components of other additional runtime engines (e.g., the Flash runtime engine) required to execute the virtual application 110 may be loaded separately by the virtual operating system 120. When executed, the virtual runtime engine generates, at least in part, the virtual runtime environment in which the virtual application 110 executes.

Referring to FIG. 2, a natively installed version of an application is configured to execute within a runtime environment provided at least in part by the host operating system 35A. Typically, to execute within the runtime environment provided at least in part by the host operating system 35A, a natively installed version of an application modifies the configuration and settings of the host operating system 35A. For example, the natively installed version may install dynamic link libraries or change registry settings of the host operating system 35A. In contrast, a virtual version of the same application may be executed on the host operating system 35A without installation on the host operating system 35A. Thus, the virtual application 110 does not modify the configuration or settings of the host operating system 35A. For example, to execute the virtual application 110, dynamic link libraries ("dlls"), data files, registry settings, environment variables, and the like need not be modified on to the host operating system 35A.

The virtualized application file 140 includes virtualized application files 123A-123C corresponding to application files 111A-111C of a natively installed version of the same application. The virtualized application files 123A-123C are stored as blocks of data inside a configuration data block 121. During execution, the virtualized application files 123A-123C are accessed via the virtual filesystem 150. The virtualized application files 123A-123C include one or more startup executables. The virtualized application file 140 identifies one or more startup executables that are executed when the virtual application 110 is first executed. The startup executables may be identified in the configuration data block 121.

When the virtualized application file 140 is executed, the configuration data block 121 is used to configure the virtual operating system 120 to execute the virtual application. For example, the configuration data block 121 may contain configuration information related to the files in the virtual filesystem 150 (e.g., the virtualized application files 123A-123C), entries in the virtual registry 152, environment variables, services, and the like. The configuration data block 121 may also include basic application metadata and settings such as the application name, application version, and sandbox location. Further, the configuration data block 121 may provide isolation information to the virtual operating system 120. This information indicates which virtualized application files 123A-123C, virtual registry keys, virtual registry values, environment variables, and services are to be isolated from the host operating system 35A.

The configuration data block 121 may also include one or more virtual layers. Each virtual layer may identify files, registry entries, environment variables, and services. As the virtual layers are read, the corresponding files, registry entries, environment variables, and services are added to appropriate runtime data-structures. If the virtualized application file 140 is configured to execute on more than one host operating system, the configuration data block 121 may include a virtual layer for each operating system. In such an embodiment, each virtual layer includes information necessary to configure the virtual runtime environment to execute on a particular operating system. Further, the configuration data block 121 may include a virtual layer that includes configuration information common to the other virtual layers (e.g., a "default" virtual layer).

To execute the virtual application 110, an initialization process is first performed. During this process, the virtual operation system 120 is launched and configured by the configuration data block 121. A component of the virtual runtime engine 131 referred to as a "reader" (not shown) reads data stored in the configuration data block 121 and uses that data to configure the virtual runtime environment. For example, the reader reads the virtual layer for the host operating system 35A and any other applicable virtual layers and uses the information read to configure the virtual operation system 120 (and in some implementations, other components of the virtual runtime environment) to execute the virtual application 110 on the host operating system 35A. The virtual filesystem 150 may be configured to mirror a host filesystem configured to execute a natively installed version of the application. Similarly, the virtual registry 152 may be configured to mirror a host registry configured to execute a natively installed version of the application.

After the initialization process has completed, the appropriate startup executable(s) is/are launched inside the virtual operating system 120. The virtual operating system 120 intercepts calls to the host operating system 35A (see FIG. 2) and routes them to corresponding components of the virtual operating system 120. For example, when the virtual application 110 requests to access an application file using a path of a natively installed version of the application, the virtual operating system 120 intercepts the request and routes the request to one of the virtualized application files 123A-123C corresponding to the application file requested. The virtual operating system 120 may also route some requests and actions to the host operating system 35A (see FIG. 2) for processing.

The virtualized application file 140 is read-only and when executed, cannot be modified by the virtual application 110 or components of the virtual runtime engine 131 (see FIG. 2). Therefore, modifications to the data stored in the configuration data block 121 (e.g., modifications to the virtualized application files 123A-123C, modifications to the registry keys of the virtual registry 152, and the like) are written to a readable and writable memory location referred to herein as a sandbox 124. The sandbox 124 is a location on the host filesystem 126A, a network share, a removable storage device, and the like whereat files may be created, modified, and deleted by the virtual application 110 at runtime. For example, when the virtual operating system 120 needs to create, modify, or delete a virtualized application file, the virtual operating system does so in the sandbox 124. Similarly, if the virtual application 110 modifies a virtual registry value, the virtual registry value is changed in the sandbox 124. The virtual operating system 120 may also route some requests and actions to the host operating system 35A for processing.

U.S. patent application Ser. No. 12/188,155, filed on Aug. 7, 2008, U.S. patent application Ser. No. 12/188,161 filed on Aug. 7, 2008, and U.S. patent application Ser. No. 12/685,576 filed on Jan. 11, 2010, all of which are incorporated herein by reference in their entireties, disclose systems that may be used to create and configure the virtualized application file 140. As described in greater detail in U.S. patent application Ser. Nos. 12/188,155, 12/188,161, and 12/685,576, the virtualized application file 140 may be created by a virtual application executable constructor or authoring tool 170 using an application template that includes copies of files, such as a configuration file 202, application files 111A-111C, and the like, used to configure the virtualized application file 140. However, the template is not a requirement. Instead, to build the virtualized application file 140, the authoring tool 170 needs only the configuration file 202 and copies of any applications files 111A-111C necessary for a natively installed version of the application to execute. The applications files 111A-111C, and the configuration file 202 are referred to collectively as an application configuration 171.

The authoring tool 170 combines the application configuration 171 and the components of the virtual runtime engine (e.g., the virtual operating system 120) into the executable virtualized application file 140. Sometimes multiple virtual applications share a common set of virtual machine configuration settings or virtual runtime engine components. By way of a non-limiting example, multiple Flash applications may be configured to be executed by the same Flash runtime engine. Further, system administrators may want to share a common set of configuration options (e.g., browser bookmarks, application settings, etc.) across a department or enterprise. These settings may be stored in a file, referred to as an xlayer file 300, and incorporated into one or more virtual application files at runtime by the virtual runtime engine 131. Depending upon the implementation details, the authoring tool 170 may be used to create the xlayer file 300.

The xlayer file 300 cannot be executed directly from the host operating system 35A and instead requires the virtual runtime environment supplied at least in part by the virtual operating system 120. Like the configuration data block 121, the xlayer file 300 may be read by the reader of the virtual runtime engine at runtime. The information stored within the xlayer file 300 may be made available to a virtual application (e.g., the virtual application 110) via the virtual filesystem 150 and virtual registry 152 of the virtual operating system 120 at runtime. By way of a non-limiting example, the configuration data block 121 may specify a location on the host filesystem 126A whereat the virtual runtime engine 131 is configured to look for xlayer files. If an xlayer file is located in the specified location, the xlayer file 300 may be read automatically by the reader of the virtual runtime environment. Alternatively, the virtual runtime engine 131 may be configured to look for xlayer files in a particular location each time the virtual application 110 is executed.

The xlayer file 300 may be shared between users and used to supply virtual machine settings to multiple virtual applications. The xlayer file 300 may include all virtual registry and virtual filesystem information associated with a particular software component (e.g., a virtual runtime engine component), allowing the component to be fully installed in the virtual runtime environment. The xlayer file 300 may include all of the application data required to implement the virtual application 110 when executed by the virtual runtime engine 131. The xlayer file 300 may be implemented as a binary file. The data in the xlayer file 300 may be organized in one or more virtual layers substantially similar to the virtual layers of the configuration data block 121 described above.

As is apparent to those of ordinary skill in the art, the number of files and registry keys needed to implement a virtual application (such as the virtual application 110) and/or a component encoded in the xlayer file 300 can be very large. For example, it is not uncommon for the number of files and registry keys needed to implement a virtual application to total in the tens of thousands. Therefore, the performance characteristics of the configuration data block 121 and the xlayer file 300 can affect the performance of the virtual application 110 significantly. In other words, the performance characteristics of the configuration data block 121 and/or the xlayer file 300 can increase or decrease the startup time for the virtual application 110.

Further, the size of the xlayer file 300 may affect an amount of time required to access data stored by the xlayer file 300, which may affect the performance of the virtual application 110. The size of the xlayer file 300 also affects an amount of time required to download (or otherwise communicate) the xlayer file 300 between computing devices (e.g., the computing devices 7 and 9 illustrated in FIG. 1) and across a network (e.g., the network 10 illustrated in FIG. 1).

As is apparent to those of ordinary skill in the art, the configuration data block 121 and the xlayer file 300 store similar data and therefore, can be formatted in accordance with a common format. U.S. patent application Ser. No. 12/697,029, filed on Mar. 31, 2010, entitled Method and System for Improving Startup Performance and Interoperability of a Virtual Application, which is incorporated herein by reference in its entirety, describes a file format that may be used to configure the configuration data block 121 portion of the executable virtualized application file 140 and/or the xlayer file 300.

Xsequence Files

Referring to FIG. 3, as mentioned above, the size of the xlayer file 300 may affect the amount of time required to access data stored by the xlayer file 300, which may affect the performance of the virtual application 110. The size of the xlayer file 300 also affects an amount of time required to download (or otherwise communicate) the xlayer file 300 between computing devices (e.g., from the server computing device 7 to the client computing device 9 illustrated in FIG. 1) and across a network (e.g., the network 10 illustrated in FIG. 1).

Applications often store large amounts of data in a single file stored on a hard disk. For example, the virtual application 110 may be executed using one or more xlayer files (e.g., the xlayer file 300). Unlike streaming media where a file is used in a linear fashion, some applications (e.g., the virtual application 110) require random access to chunks of data, referred to herein as "pages." Thus, the pages required by the end user (or the application) are retrieved from a file in a non-sequential fashion. In other words, the pages are accessed in non-predetermined sequences that may include some randomness and may be difficult to predict. Depending upon the implementation details, pages may have a predetermined size (e.g., 4 kilobytes, 10 kilobytes, etc.). Alternatively, pages may have non-uniform sizes.

If during execution, an application suddenly requires access to a page that has not yet been downloaded, a delay must be introduced to download the page. Alternatively, execution of the application may end. To avoid this problem, when the xlayer file 300 is hosted on a web server (e.g., a web server implemented by the web server components 142 of the server computing device 7 illustrated in FIG. 1), the user may download the entire xlayer file 300 to the client computing device 9 illustrated in FIG. 1 before the virtual application 110 can be executed on the client computing device 9 illustrated in FIG. 1. The delay introduced by the download process greatly impacts the user experience. However, delays may be avoided by preemptively downloading pages before they are needed but, as mentioned above, preemptive downloading is difficult because which pages will be accessed by the application and when may be difficult to predict. Thus, it is desirable to download the pages in an order that is consistent with an order in which the application (when operated by a user) will request access to the pages.

If there is a predictable pattern in the order in which the pages are requested by the application, the pages can be ordered and encoded into files that model this pattern. In this manner, the most commonly accessed pages or page sequences may be downloaded first. This improves access time and transmission efficiency. Depending upon the implementation details, this ordering and encoding allows the pages to be distributed using standard Hypertext Transfer Protocol ("HTTP"), which is a conventional download technology, and does not require the use of specialized streaming protocols. By way of additional non-limiting examples, the pages to be distributed using other conventional download protocols, including File Transfer Protocol ("FTP"), Server Message Block Protocol ("SMB"), and the like.

For example, pages stored in a large single xlayer file (e.g., the xlayer file 300) can be reordered and divided into a plurality of smaller files (referred to herein as "xsequence files") encoded using a predetermined file format (referred to herein as "xsequence file format," which is described in detail below). The xsequence file format is configured to store permutations of at least a portion of the pages stored in a larger file (e.g., the xlayer file 300) and enables streaming distribution of the larger xlayer file. As mentioned above, the smaller xsequence files may be streamed over the Internet using conventional download methods thereby transferring the data of the xlayer file between different computing devices. Thus, the virtual application 110 may be launched by the client computing device 9 from the web without first downloading the entire xlayer file 300. This may greatly decrease startup latency. The remaining portions of the xlayer file may be downloaded subsequently while the user interacts with the executing virtual application 110.

For ease of illustration, the file from which one or more xsequence files are created will be referred to as an "original file." While the original file may be an xlayer file (e.g., the xlayer file 300) having one or more of the file format(s) described in U.S. patent application Ser. No. 12/697,029, it is apparent to those of ordinary skill in the art that the original file may have a format other than the file format(s) described in U.S. patent application Ser. No. 12/697,029. For example, the original file may be an alternate encoding of a virtual machine or virtual application, a data file, an xml file, and the like. For ease of illustration, the original file is described below as implementing the virtual application 110. However, as is apparent to those of ordinary skill in the art, the original file may implement other applications, including applications requiring installation on the client computing device 9 (see FIG. 1).

Profiling

Profiling generally refers to a method of analyzing an application (e.g., the virtual application 110) to determine usage statistics. A profile or transcript of the application contains information about a single execution of the application such as the order of the page access, and the time spent in each transition between pages. The transcript may be stored in a transcript file 125 (see FIG. 2). Multiple transcript files may be combined or merged to generate a streaming model 122 (illustrated in FIG. 19 and described below).

An application (e.g., the virtual application 110) may implement one or more processes that are selectively executed as the application executes. As the virtual application 110 executes, it implements one or more such processes that each access the original file (e.g., the xlayer file 300) to obtain information about the virtual application 110. This information includes, but is not limited to, virtual environment settings, virtual filesystem information, virtual registry information, and the like. This information resides in various locations within the original file (e.g., the xlayer file 300). Threads and processes spawned by the virtual application 110 as it executes may be treated as separate instances and merged together in the same transcript file in a manner similar to that used to merge multiple transcript files together (discussed below).

A profiling process 700 described below may be used to determine an order in which blocks of data (pages) stored in a file are accessed by an executing application. For ease of illustration, the profiling process 700 will be described as being performed with the virtual application 110. However, as is apparent to those of ordinary skill in the art, the profiling process 700 may be performed with other types of applications, including applications requiring installation on the client computing device 9 (see FIG. 1).

The profiling process 700 profiles usage of the virtual application 110 to generate transcript files (such as the transcript file 125 illustrated in FIG. 2) that are used to generate a streaming model (e.g., the streaming model 122 illustrated in FIG. 19) that specifies an order in which pages are downloaded from the server computing device 7 to the client computing device 9. While the xlayer file 300 may be thought of as generally opaque, data is written sequentially within the xlayer file 300. Furthermore, virtual files within a specific virtual directory are generally written sequentially, one after the other. The same can be said for virtual registry keys and values. Therefore, profiling access to the xlayer file 300 is substantially similar to profiling access to the underlying files and registry entries of a natively installed application.

As mentioned above, the Sandbox Manager 134 (see FIG. 2) may execute the virtual application 110 (inside the virtual runtime engine 131). As will be explained below, the Sandbox Manager 134 may implement a directing process 129 (see FIG. 2) configured to collect profile information that may be used to profile the virtual application's access to the underlying original file (e.g., the xlayer file 300). Such profile information may be used to perform statistical analysis of a software application (e.g., the virtual application 110) to create a model of its data consumption. The profile information may also be used to make runtime adjustments in real-time to the data-delivery schedule (described in the Modeling Subsection below). The data-delivery schedule being the order in which data or pages are organized in the xsequence files and/or the order in which the xsequence files are delivered to the client computing device 9.

The information stored in the transcript files (generated by the profiling process 700) is then used to divide the original file into pages that are loaded onto the server computing device 7 for download to the client computing device 9. The server computing device 7 streams the xsequence files to the client computing device 9 through the Client Application 132 and the Sandbox Manager 134 that together download and execute the pages.

The profiling process 700 described herein may be used to perform accurate and low-overhead profiling of a virtual application's access to an underlying xlayer file. Depending upon the implementation details, the profiling process 700 may include the use of per-thread data structures and named-pipes to communicate to the directing process 129 that by the executing virtual application 110 has requested access to raw block level data (stored in the original file, e.g., the xlayer file 300). The term "per-thread data structure" refers to a data structure corresponding to a single thread. Thus, a separate per-thread data structure may be created for each thread used by an application (e.g., the virtual application 110). A ThreadDiscriminate value is sent to the Sandbox Manager 134 by the virtual runtime engine 131 when a thread is created. The ThreadDiscriminate value is an entry point discriminator for the thread accessing the xlayer file. An example method of generating the ThreadDiscriminate value is described below.

The profiling process 700 is performed using a PseudoPid value and a PseudoTid value. The PseudoPid value and the PseudoTid value are determined by the virtual runtime engine 131.

The PseudoPid value is a unique process identifier of the application process accessing the original file (e.g., the xlayer file 300). Because operating system allocated process identifiers ("Pid" values) can be recycled and reused, a unique identifier (the PseudoPid value) is generated for each process. The PseudoPid value may be generated by performing a hash function using the operating system allocated Pid value and the current system time as input parameters. For example, the following pseudo code may be used to generate the PseudoPid value:

PseudoPid=Hash(GetCurrentProcessId( ), GetSystemTime( )).

The hash function performed may be a 32-bit "good" hash function. Those of ordinary skill in the art are familiar with good hash functions. Therefore, such functions will not be described herein.

Furthermore, because operating system allocated thread identifiers ("Tid" values) can be recycled and reused, a unique identifier (the PseudoTid value) is generated for each thread. The PseudoTid value may be generated by performing a hash function using the operating system allocated Tid value and the current system time as input parameters. For example, the following pseudo code may be used to generate the PseudoTid value:

PseudoTid=Hash(GetCurrentThreadId( ), GetSystemTime( ))

The hash function performed may be a 32-bit "good" hash function.

Thus, there may be three different scopes for the profiling process 700: Session, Process, and Thread. Session scope includes the profiling context of a single execution of the virtual application 110. As is apparent to those of ordinary skill in the art, during execution, the virtual application 110 may include multiple processes and multiple threads.

Process scope refers to the lifetime of a single process instance (given a unique PseudoPid value, described below) within a session. If two or more virtualized application files are launched more than once, a separate process for each launched file (each having a different PseudoPid value) and a separate process contexts for each launched file are created (or recorded) within a transcript. If the same virtualized application file is launched more than once, execution statistics recorded for each process can be aggregated using the name of the virtualized application file (or other identifier) to identify execution statistics associated with the same virtualized application file.

Thread scope refers to the lifetime of a single thread instance (given a unique PseudoTid value, described below) within a process (and therefore session). Different threads may be identified in the transcript using the ThreadDiscriminate value (described below). If a thread with the same ThreadDiscriminate value is launched more than once, execution statistics recorded for the thread (having that ThreadDiscriminate value) can be aggregated using the ThreadDiscriminate value (or other identifier) to identify execution statistics associated with the same thread or similar threads. As is apparent to those of ordinary skill in the art, because the ThreadDiscriminate value stores an identifier (e.g., a file name) of an entry point module (e.g., a Dynamic Link Library "dll" file, an executable file, and the like) and a relative offset within the module whereat execution of the thread began, different threads may have the same ThreadDiscriminate value.

Each time the virtual application 110 accesses the original file, access information (including one or more execution statistics) is recorded. For example, each time the virtual application 110 accesses the original file (e.g., the xlayer file 300), the Sandbox Manager 134 may record a PseudoTid value, an xlayerId value, an AccessOffset value, an AccessBytes value, a TickCount value, and flags. This access is associated with the PseudoPid value of the process that created the thread.

The xlayerId value is an identifier of the xlayer file 300. The xlayerId value may be a hash (e.g., a "good" hash) of the path of the xlayer file 300. The AccessOffset value is an offset in bytes of the portion of the xlayer file 300 accessed. The AccessBytes value is a size in bytes of the portion of the xlayer file 300 accessed. The TickCount value is a current Operating System ("OS") tick count at the time the xlayer file 300 is accessed. The flags may include a Blocked value implemented as Boolean field. The Blocked value indicates whether the virtual runtime engine 131 and/or the virtual application 110 is/are blocked from further execution of the page for which access is requested.

During performance of the profiling process 700, data is recorded for each process over its lifetime. Thus, each process is tracked over the duration of its lifetime. Optionally, shut-down notifications may not be tracked. During performance of the profiling process 700, data is recorded for each thread over its lifetime. Thus, each thread is tracked over the duration of its lifetime. Optionally, thread-shutdown notifications may not be tracked.

When the profiling process 700 is performed, it may be useful to aggregate statistics collected for the same application code path. A thread discriminate (the ThreadDiscriminate value) is used to identify a code path by its starting point. The ThreadDiscriminate value may be obtained by performing a hash function using the name of the entry point module (e.g., a file name) and the entry point relative offset within the module as input parameters. Optionally, the name of the entry point module may include the file path. The hash function performed may be a 32-bit "good" hash function. For example, if the entry point for the thread was in a file named "myapplogic.dll," and at an offset of 0x10025, the hash function is performed on the bytes of the string "myapplogic.dll" using the offset (0x10025) as a seed value. The ThreadDiscriminate value for any xlayer access from this thread is set to the resulting value generated by the hash function. For example, the following pseudo code may be used to generate the ThreadDiscriminate value:

```
ThreadDiscriminate = Hash(<module name>,
    <relative entry point offset
    in bytes>)
```

The ThreadDiscriminate value may be stored in a per-thread data structure. The following is a non-limiting example of such a structure:

```
struct CVmTlsData
{
    DWORD UniqueThreadId;
    DWORD Discriminant;
};
```

By way of a non-limiting example, the ThreadDiscriminate value may be stored in a per-thread data structure (e.g., the structure "CVmTlsData") using dynamic thread-local-storage mechanisms via Win32::TlsGetValue and ::TlsSetValue APIs. As is apparent to those of ordinary skill in the art, thread-local-storage mechanisms refer to storing data in a thread-local-storage location that is accessible only by a thread associated with the thread-local-storage location. The ThreadDiscriminate value and/or the PseudoTid value for a particular thread may be stored in the thread-local-storage location associated with the particular thread. The thread may look up the ThreadDiscriminate value and/or the PseudoTid stored in the thread-local-storage location and provide such information to the virtual runtime engine 131, which may in turn, communicate the information to the directing process 129.

The structure may be initialized at thread creation time. By way of a non-limiting example, hooking the CreateThread system call may be used to initialize the structure at thread creation time. In other words, an instance of the structure "CVmTlsData" may be created in response to each detection of the CreateThread system call by the hook on the CreateThread system call. Hooking the CreateThread system call is a technique known to those of ordinary skill in the art and will not be described in detail.

When an application thread is created, a PseudoTid value and ThreadDiscriminate value are determined as described above. Then, memory for the structure "CVmTlsData" is allocated, and the structure "CVmTlsData" is saved in thread-local-storage. By way of a non-limiting example, the structure may be saved in thread-local-storage via the Win32::TlsSetValue API. By way of another non-limiting example, the following pseudo code may be used to create a per-thread data structure, which in this example, is the structure "CVmTlsData."

```
Intercept application thread creation
    On new thread creation Do
        CVmTlsData data = AllocateMemory (sizeof(CVmTlsData))
        data.PseudoTid =   Hash(GetCurrentThreadId( ),
                                GetSystemTime( ))
        data.Discriminate = Hash(<module name>, <relative
                                entry point offset in
                                bytes>)
        ::TlsSetValue(VM_TLS_INDEX, data)
    End
```

After the PseudoTid value and the ThreadDiscriminate value are stored in the per-thread data structure (e.g., the structure "CVmTlsData"), each access to the original file (e.g., the xlayer file 300) during execution of the virtual application 110 is recorded by the Sandbox Manager 134 in a transcript file 125 (see FIG. 2). By way of a non-limiting example, the transcript file 125 may have a simple binary format and may use the extension "xt." The transcript file 125 may include a header followed by a series of tuples that each include a thread identifier (e.g., the PseudoTid value), a timestamp value, and a block identifier or number. Optionally, the transcript file 125 may also store the PseudoPid value. In the transcript file 125, the tuples may be organized by process (or PseudoPid value) in a hierarchical structure.

Named pipe communication may be used to provide communication between the virtual runtime engine 131 and the directing process 129 (implemented by the Sandbox Manager 134). Thus, the directing process 129 may "listen" to the virtual runtime engine 131 over at least one named pipe connection 127 illustrated in FIG. 2. Those of ordinary skill in the art are familiar with the use of named pipes as a means of implementing communication between processes. Therefore, named pipes will not be described in further detail.

Figure 4:
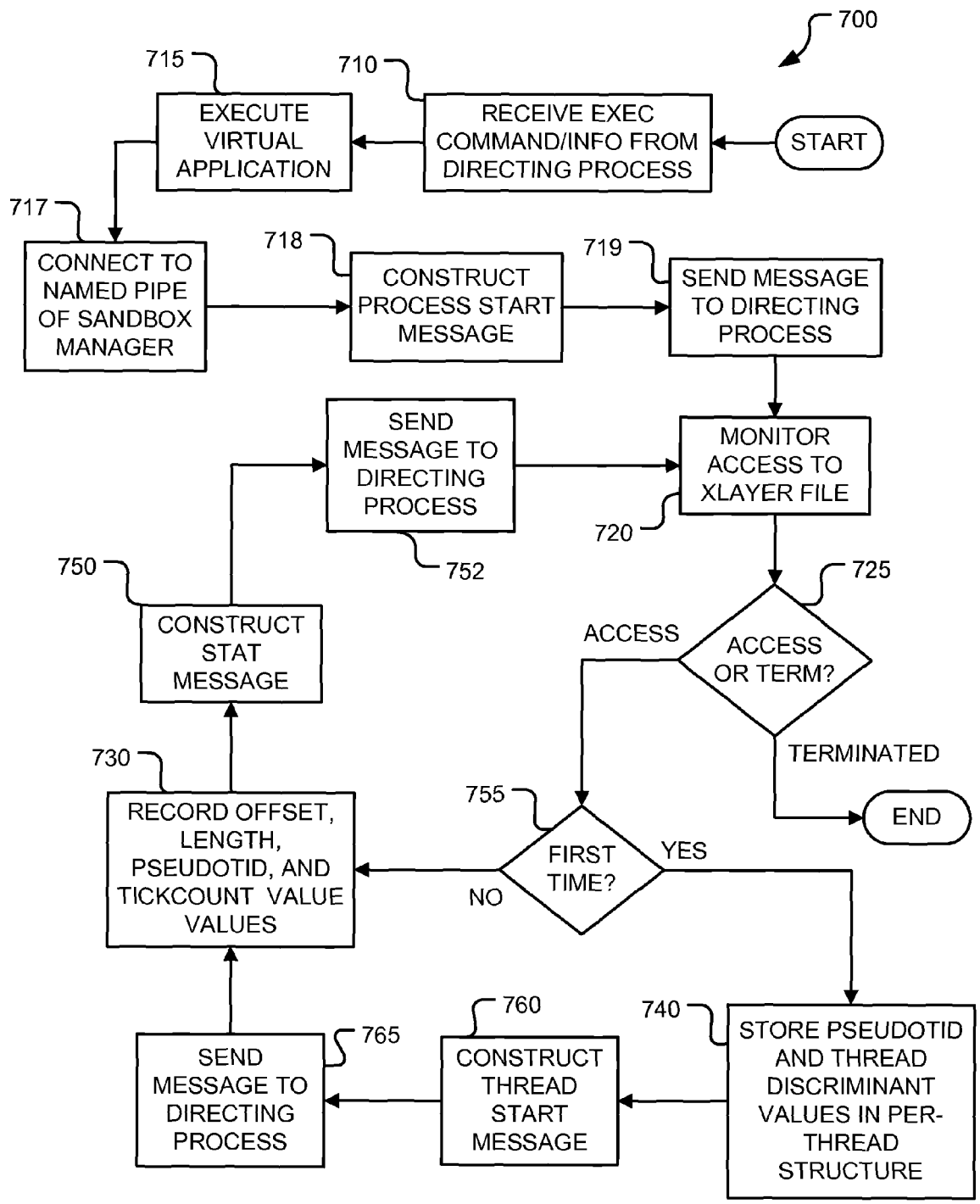
FIG. 4 is a flow diagram of a profiling process that records accesses made to the xlayer file by a virtual application as it executes.

FIG. 4 is a flow diagram of the profiling process 700 that records accesses made to the original file (e.g., the xlayer file 300) by the virtual application 110 as it executes.

In first block 710, the virtual runtime engine 131 receives an instruction from the Sandbox Manager 134 to execute the virtual application 110 in profiling mode. As will be described in more detail below, the virtual runtime engine 131 may also receive information (e.g., the SessionId value, and the path to the xlayer file) from the Sandbox Manager 134.

Then, in block 715, the virtual runtime engine 131 begins execution of the virtual application 110 in profiling mode.

In block 717, the virtual runtime engine 131 connects to the named pipe of the Sandbox Manager 134 to form the named pipe connection 127.

In block 718, the virtual runtime engine 131 constructs a message containing the SessionId value received from the Sandbox Manager 134 in block 710 and optionally other information (e.g., the Pid value, the PseudoPid value, a ProcessName value, and a Process Name Length value). This message signals the start of a new process. The virtual application 110 is associated with a process that may launch one or more additional processes. Thus, the first message received by the Sandbox Manager 134 signals the start of the virtual application 110. The Pid value in the first message is associated with the virtual application 110 itself. By way of a non-limiting example, the Pid value may be obtained using a function named "::GetCurrentProcessId( )" As mentioned above, the PseudoPid value may be obtained using a hash function. By way of a non-limiting example, the ProcessName value may be obtained using a function named "GetStartupExecutableName( )" The ProcessName value is a file name of the entry point executable file of the process. For example, the ProcessName value may be the filename of the original file (e.g., the xlayer file 300). However, this is not always the case. The ProcessName value may not be the filename of the original file (e.g., the xlayer file 300). The ProcessName Value may be used to merge statistics across processes having the same name.

The following structure named "SProcessConnectMessage" may be used to construct the message containing the new process information.

```
struct SProcessConnectMessage
{
    ULONGLONG SessionId;
    DWORD Pid;
    DWORD PseudoPid;
    DWORD NameLength;
    WCHAR Name[CWC_MAX_PROCESS_NAME+1];
};
```

In the above pseudo code, the Name variable stores the ProcessName value. The message constructed in block 718 may inform listeners (e.g., the directing process 129) that a new process is starting. The message may be sent by the virtual runtime engine 131 to the Sandbox Manager 134 once for each PseudoPid value.

Then, in block 719, the virtual runtime engine 131 sends the message constructed in block 718 to the directing process 129 implemented by the Sandbox Manager 134. At this point, communication between the Sandbox Manager 134 and the virtual runtime engine 131 has been properly initialized, and messages including statistics may be sent from the virtual runtime engine 131 to the Sandbox Manager 134 for recordation in a transcript file.

In next block 720, all read operations (e.g., IStream::Read operations) performed by the virtual application 110 with respect to the original file (e.g., the xlayer file 300) are monitored. This may be achieved by abstracting access to the original file through the standard IStream interface, which is used to read data from the original file. The IStream interface is configured to read from and write data to stream objects. Those of ordinary skill in the art are familiar with reading data from a file (such as the xlayer file 300) and this process will not be described in detail.

In decision block 725, the virtual runtime engine 131 determines whether a read operation is being performed on the original file (e.g., the xlayer file 300) or execution of the virtual application 110 has terminated. The decision in decision block 725 is "ACCESS" when a read operation has been detected by the virtual runtime engine 131. The decision in decision block 725 is "TERMINATED" when the virtual runtime engine 131 detects execution of the virtual application 110 has terminated.

A method of detecting when execution of the virtual application 110 has terminated is described below. When the decision in decision block 725 is "TERMINATED," the method 700 terminates.

When the decision in decision block 725 is "ACCESS," in decision block 755, the virtual runtime engine 131 determines whether this is the first time the thread associated with the PseudoTid has accessed the xlayer file. The data stored in the per-thread data structures (e.g., the structures "CVmTIsData" described above) may be used to determine whether this is the first time the thread associated with the PseudoTid value has accessed the original file. The decision in decision block 755 is "YES" when this is the first time the thread associated with the PseudoTid value has accessed the xlayer file. Otherwise, the decision in decision block 755 is "NO" when this is not the first time the thread associated with the PseudoTid value has accessed the xlayer file.

When the decision in decision block 755 is "NO," the virtual runtime engine 131 advances to block 730.

When the decision in decision block 755 is "YES," in block 740, the virtual runtime engine 131 stores the new thread information (e.g., the PseudoTid value, and the ThreadDiscriminate value). In block 740, both of the PseudoTid value and the ThreadDiscriminate value may be stored in the per-thread data structure (e.g., the structure "CVmTIsData"). By way of a non-limiting example, these values may be obtained via the Win32::TIsGetValue API.

Then, in block 760, the virtual runtime engine 131 constructs a message containing the new thread information (e.g., the PseudoTid value and the ThreadDiscriminate value). The message constructed in block 760 is sent by the virtual runtime engine 131 to the Sandbox Manager 134 once for each PseudoTid value. The following structure named "SThreadStartedMessage" may be used to construct the message containing the new thread information.

```
struct SThreadStartedMessage
{
    DWORD    PseudoTid;
    DWORD    Discriminate;
};
```

The variable named "Discriminate" in the above pseudo code stores a ThreadDiscriminate value that is sent when a new thread is created. The ThreadDiscriminate value is an entry point discriminator for the thread accessing the original file (e.g., the xlayer file 300).

In block 765, the virtual runtime engine 131 sends the message constructed in block 760 to the Sandbox Manager 134. Then, the virtual runtime engine 131 advances to block 730.

In block 730, an offset value indicating where in the original file the read operation started and a length value indicating an amount of the original file read are recorded. The offset may be implemented as a 64-bit value. The PseudoTid value is also recorded. Further, the current process tick count is recorded as the TickCount value.

In next block 750, a message including the information recorded above (e.g., the PseudoTid value, the xlayerId value, the AccessOffset value, the AccessBytes value, the Tick-Count value, and flags) is constructed. The message also includes an xlayerId value that is an identifier of the original file (e.g., the xlayer file 300). By way of a non-limiting example, the message may be implemented using the following data structure (named "SFeedbackStatsMessage"):

```
struct SFeedbackStatsMessage
{
    DWORD       PseudoTid;
    DWORD       XLayerId;
    DWORD       Flags;
    DWORD       TickCount;
    ULONGLONG   AccessOffset;
    ULONGLONG   AccessBytes;
};
```

In the data structure named "SFeedbackStatsMessage," a flags member may store the Blocked value (discussed above).

In summary, the Sandbox Manager 134 sends the SessionId value and the path of the original file to the virtual runtime engine 131. The xlayerId value may be determined by performing a hash function (e.g., a "good" hash function) on the path. When a new process accesses the original file, the virtual runtime engine 131 sends the SessionId value, the Pid value, the PseduoPid value, the ProcessName value, and the Process Name Length value to the Sandbox Manager 134. The Sandbox Manager 134 may use this information to associate processes with the session identified by the SessionId value. Because two different sessions launched under the directing process 129 (see FIG. 2) may use the same xlayerId value, the SessionId value is send to the Sandbox Manager 134 to inform the Sandbox Manager as to which child session sent the information to the directing process 129 (see FIG. 2).

When a new thread accesses the original file, the virtual runtime engine 131 sends the PseudoTid value and the ThreadDiscriminate value to the Sandbox Manager 134. For each read operation performed by the virtual application 110 on the original file, the virtual runtime engine 131 sends the PseudoTid value, the xlayerId value, the AccessOffset value, the AccessBytes value, the TickCount value, and flags to the Sandbox Manager 134. The Sandbox Manager 134 may use this information to associate each read operation with the original file identified by the xlayerId value and the thread identified by the PseudoTid value. The xlayerId value is used because a single session may include the execution of one or more application file in addition to the original file.

Then, in block 752, the virtual runtime engine 131 sends the message "SFeedbackStatsMessage" to the directing process 129. Then, the virtual runtime engine 131 returns to block 720.

The following pseudo code provides a non-limiting example of an implementation of the blocks 755, 740, 760, 765, 730, 750, and 752 of the profiling process 700 described above.

```
Method CaptureXLayerAccess(AccessOffset, AccessBytes)
    CVmTlsData tlsData = ::TlsGetValue(VM_TLS_INDEX)
    PseudoTid = tlsData.UniqueThreadId
    ThreadDiscriminate = tlsData.Discriminant
    TickCount = ::GetTickCount( )
    If FirstTimeSeen(PseudoTid) Then
        SThreadStartedMessage msgNewThread
        msgNewThread.PseusoTid = PseudoTid
        msgNewThread.Discriminate = ThreadDiscriminate
```
```
        SendMessageToDirectingProcess(msgNewThread)
    End
    SFeedbackStatsMessage msgStats
    msgStats.PseudoTid = PseudoTid
    msgStats.TickCount = TickCount
    msgStats.AccessOffset = AccessOffset
    msgStats.AccessBytes = AccessBytes
    SendMessageToDirectingProcess(msgStats)
```

If the virtual application 110 initiates a child process, the virtual runtime engine 131 will perform block 718 using the same SessionId received in block 710. The named pipe connection 127 created in block 717 is used for child processes.

It may be beneficial if the profiling process 700 has as little affect on the running application as possible. In such implementations, communication mechanisms may be very fast and invisible to the running application itself. Using the named pipe of the Sandbox Manager 134 to provide communication between the virtual runtime engine 131 and the directing process 129 may provide such benefits. Thus, the messages sent in blocks 719, 752, and 765 may be sent over the named pipe connection(s) 127.

On the WINDOWS® platform, named pipes are implemented with multiple instance support. Thus, multiple clients (e.g., virtual runtime engines) can communicate with a single named pipe server (implemented by the Sandbox Manager 134), with each client having an isolated connection to the same named pipe. In other words, each process (even processes started by the process associated with the virtual application) will connect separately to the named pipe server. On the named pipe server (implemented by the Sandbox Manager 134), multiple connections are handled via a unique connection handle for each client (e.g., virtual runtime engine). Thus, each virtual runtime engine running a virtual application can connect to the name pipe of the same Sandbox Manager 134 and send statistics to the single Sandbox Manager.

One named pipe connection per process may be used. In such implementations, access to the named pipe from multiple threads may be serialized within a process via a critical section. This may impact performance of the virtual application 110 slightly. However, the size of the data being sent is small and named pipe communication is inherently fast. Thus, this method may provide satisfactory performance.

Figure 5:
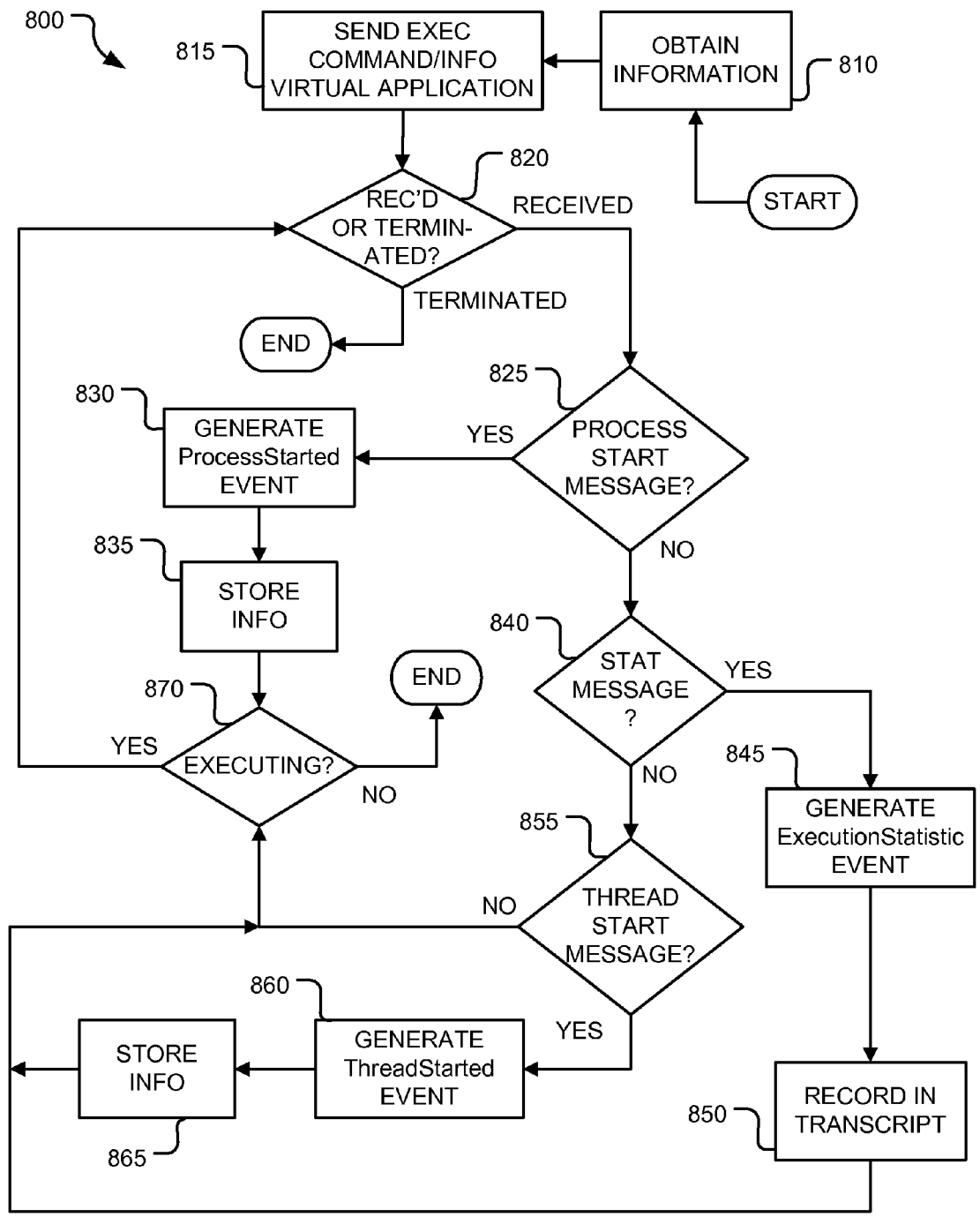
FIG. 5 is a flow diagram of a method performed by a directing process implemented by the Sandbox Manager.

FIG. 5 is a flow diagram of a method 800 performed by the directing process 129 implemented by the Sandbox Manager 134. When the virtual application 110 is launched by the Sandbox Manager 134 (e.g., by a command received by the virtual runtime engine 131 from the Sandbox Manager 134 in block 710 of the profiling process 700 illustrated in FIG. 4), the Sandbox Manager 134 may provide information (e.g., one or more command line parameters) to the virtual runtime engine 131. This information may include the SessionId value and the path to the original file (e.g., the xlayer file 300). The SessionId value may be the same session identifier value used by a connection between the Client Application 132 (e.g., the plug-in 136) and the Sandbox Manager 134 (described in U.S. patent application Ser. No. 12/695,107). The SessionId value is passed to the virtual runtime engine 131 so the directing process 129 can associate all statistics with the correct virtual application instance, in the event multiple virtual applications are executing and being profiled concurrently.

In first block 810, the Sandbox Manager 134 obtains information (e.g., command line parameters) to send to the virtual runtime engine 131 along with a command to execute the virtual application 110 in profiling mode. By way of a non-limiting example, the SessionId may have been obtained via a /XExecutionSession command line parameter.

In block 815, the Sandbox Manager 134 sends the information and a command to execute the virtual application 110 in profiling mode to the virtual runtime engine 131. The virtual runtime engine 131 knows it was started by a parent process (the directing process 129 of the Sandbox Manager 134). With that information, the virtual runtime engine 131 initiates the named pipe communication with the Sandbox Manager 134 to send messages (including those with execution statistics) to the directing process 129.

The execute command and the SessionId value are received by the virtual runtime engine 131 in block 710 of the profiling process 700 illustrated in FIG. 4 and described above.

As discussed above, while the virtual application 110 is executing in profiling mode, the Sandbox Manager 134 may receive messages from the virtual runtime engine 131 and generate events in response to those messages.

In decision block 820, the Sandbox Manager 134 determines whether it has received a message from the virtual runtime engine 131 or execution of the virtual application 110 has terminated. If a message is received, the decision in decision block 820 is "RECEIVED" and the Sandbox Manager 134 advances to decision block 825. Otherwise, if the virtual runtime engine 131 stops executing the virtual application 110 before a message is received, the decision in decision block 820 is "TERMINATED" and the method 800 terminates.

When the virtual runtime engine 131 detects that a process is accessing the original file (e.g., the xlayer file 300) for the first time, the virtual runtime engine 131 sends a message (optionally implemented using a structure name "SProcessConnectMessage") to the directing process 129. In decision block 825, the Sandbox Manager 134 determines whether the message received in block 820 indicates a process is accessing the original file (e.g., the xlayer file 300) for the first time. The decision in decision block 825 is "YES" when the message received in block 820 indicates a process is accessing the original file (e.g., the xlayer file 300) for the first time. For example, the decision in decision block 825 is "YES" when the message received was constructed in block 718 of the profiling process 700 illustrated in FIG. 4. Otherwise, the decision in decision block 825 is "NO" when the message received in block 820 does not indicate the process is accessing the original file (e.g., the xlayer file 300) for the first time.

When the decision in decision block 825 is "YES," in block 830, the Sandbox Manager 134 generates a ProcessStarted event. In block 835, Sandbox Manager 134 records information included in the message (e.g., the SessionId, PseudoPid, and ProcessName values). This information may be recorded in the transcript file 125 (see FIG. 2). Then, the Sandbox Manager 134 advances to decision block 870.

When the decision in decision block 825 is "NO," in decision block 840, the Sandbox Manager 134 determines whether the message received in block 820 includes statistics to be stored in the transcript file 125 (see FIG. 2). The decision in decision block 840 is "YES" when the message received in block 820 indicates the message received in block 820 includes statistics to be stored in the transcript file 125. For example, the decision in decision block 840 is "YES" when the message received was constructed in block 750 of the profiling process 700 illustrated in FIG. 4. Otherwise, the decision in decision block 840 is "NO" when the message received in block 820 does not indicate that the message received in block 820 includes statistics to be stored in the transcript file 125.

When the decision in decision block 840 is "YES," in block 845, the Sandbox Manager 134 generates an ExecutionStatistic event. Then, in block 850, the statistics included in the message are stored in the transcript file 125. Then, the Sandbox Manager 134 advances to decision block 870.

When the decision in decision block 840 is "NO," in decision block 855, the Sandbox Manager 134 determines whether the message received in block 820 indicates a thread is accessing the original file (e.g., the xlayer file 300) for the first time. The decision in decision block 855 is "YES" when the message received in block 820 indicates a thread is accessing the original file for the first time. Otherwise, the decision in decision block 855 is "NO."

When the decision in decision block 855 is "YES," in block 860, the Sandbox Manager 134 generates a ThreadStarted event. Then, in block 865, the PseudoTid and ThreadDiscriminate values are stored in memory. This information may be recorded in the transcript file 125 (see FIG. 2). Then, the Sandbox Manager 134 advances to decision block 870.

When the decision in decision block 855 is "NO," the Sandbox Manager 134 advances to decision block 870.

In decision block 870, the Sandbox Manager 134 determines whether the virtual runtime engine 131 has stopped executing the virtual application 110 (and therefore, no additional statistics will be generated for the virtual application 110). The decision in decision block 870 is "NO" when the virtual runtime engine 131 has stopped executing the virtual application 110. Otherwise, the decision in decision block 870 is "YES."

When the decision in decision block 870 is "NO," the method 800 terminates.

When the decision in decision block 870 is "YES," the Sandbox Manager 134 returns to decision block 820.

The information received in the messages constructed in block 750 of the profiling process 700 illustrated in FIG. 4 is stored in the transcript file 125 associated with the original file (e.g., the xlayer file 300).

The Sandbox Manager 134 may include a dictionary accessible by the directing process 129. The directing process 129 may use the dictionary to associate all subsequent messages (e.g., implemented using the structures named "SThreadStartedMessage" and "SFeedbackStatsMessage") with the correct PseudoPid value. The dictionary may be keyed by a connection handle to a structure storing the PseudoPid value, Pid value, and Process Name value. The following data structure (named "SPipeConnection") is an example of a data structure that may be used to implement the dictionary:

```
class SPipeConnection
{
    private uint    SessionId;
    private uint    Pid;
    private uint    PseudoPid;
    private string  Name;
};
```

As described above, the information stored in the class defined by the pseudo code above is received by the Sandbox Manager 134 (from the virtual runtime engine 131) in the message constructed in block 718 of the profiling process 700 illustrated in FIG. 4.

The dictionary lookup may be hidden by the implementation of the .NET System.IO.Pipes.NamedPipeServerStream class, which may have been used to perform the named pipe communication. This class uses IO Completion Ports to schedule asynchronous pipe reads from the pipe clients (e.g., the virtual runtime engine 131) in the virtual application processes. An asynchronous named pipe completion routine may be responsible for determining the type of message received, reading the message, and calling back into the listening code of the directing process 129 with the appropriate callbacks. Possible callbacks are: SignalNewProcess (which is called when a new process is started in the virtual application 110); SignalNewThread (which is called when a new thread is started within a virtual application process); and SignalXLayerAccess (which is called when access to the original file has been requested by a particular thread within the virtual application process). How this data provided by these callbacks is handled is described below.

The following pseudo code provides a non-limiting example of a server-side named pipe completion routine. Portions of the routine may be performed in blocks 820, 825, 840, and 855.

```
SPipeConnection pipeConnect =
        GetConnectionDataFromHandle(hPipeClient)
Byte MessageId = ReadByte( )
If (MessageId == ConnectionMessageId) Then
    pipeConnect.SessionId = ReadInt64( )
    pipeConnect.Pid = ReadInt32( )
    pipeConnect.PseudoPid = ReadInt32( )
    countChars = ReadInt32( )
    arrayChars = ReadChars(countChars)
    pipeConnect.Name = MakeString(arrayChars)
    SignalNewProcess(pipeConnect.SessionId,
            pipeConnect.Pid,
            pipeConnect.PseudoPid,
            pipeConnect.Name)
Else If (MessageId == ThreadCreatedMessageId) Then
    PseudoTid = ReadInt32( )
    Discriminate = ReadInt32( )
    SignalNewThread(pipeConnect.PseudoPid,
            PseudoTid, Discriminate)
Else If (MessageId == FeedbackStatsMessageId) Then
    PseudoTid = ReadInt32( )
    TickCount = ReadInt32( )
    AccessOffset = ReadInt64( )
    AccessSize = ReadInt64( )
    SignalXLayerAccess (pipeConnect.PseudoPid, PseudoTid,
            TickCount, AccessOffset,
            AccessSize)
End
```

Building and Distributing Application Profiles via the Web

As mentioned above, the transcript file 125 generated by the profiling process is used to determine a predictive application access model that is used to determine an order in which to download blocks of data (e.g., portions of the xlayer file 300) to the client computing device 9. When used to stream blocks of data or pages to the client computing device 9, the access model is referred to as a streaming model.

The server computing device 7 provides applications to the client computing device 9 on a "self-serve" basis (i.e., a user operating the client computing device 9 may select any of the applications provided by the server computing device 7 for download at anytime). After the user has selected an application for download and execution, the server computing device 7 downloads or streams the selected application to the client computing device 9. Multiple client computing devices (e.g., the computing devices 9 and 11) may select applications for download at the same time.

Because training and building streaming models is a computationally intensive process and relies on proprietary technologies, it may be preferable to perform this process on a centralized server (e.g., the server computing device 7 or another computing device connected thereto). The access model may be generated using machine learning techniques that require training. The training of streaming models requires information about the program's access patterns under realistic and/or actual use. Thus, generating "transcripts" via profiling is a task best performed manually, by an application publisher or test users.

As described above, the Sandbox Manager 134 may be configured to profile an application downloaded from a web page (e.g., via the plug-in 136). Transcript files generated by the Sandbox Manager 134 may then be uploaded to the server computing device 7 (or another computing device connected thereto), which automatically generates and distributes a streaming model (e.g., the streaming model 122 illustrated in FIG. 19) for the application.

As mentioned above, the authoring tool 170 allows application developers and publishers to virtualize an application and publish it to the web. The result of this process is one or more executable files or xlayer files (e.g., a file named "application_p.xlayer") residing on the server computing device 7. As described in U.S. patent application Ser. No. 12/695,107, these files can be downloaded and executed from the web via the plug-in 136 and the Sandbox Manager 134. If the plug-in 136 is executing on a computing device (e.g., the computing device 11) that is also executing the authoring tool 170, optionally, when the layer file is published to the server computing device 7, the xlayer file 300 will also be copied to the local cache 139 (see FIG. 2), making future downloads unnecessary.

Figure 13:
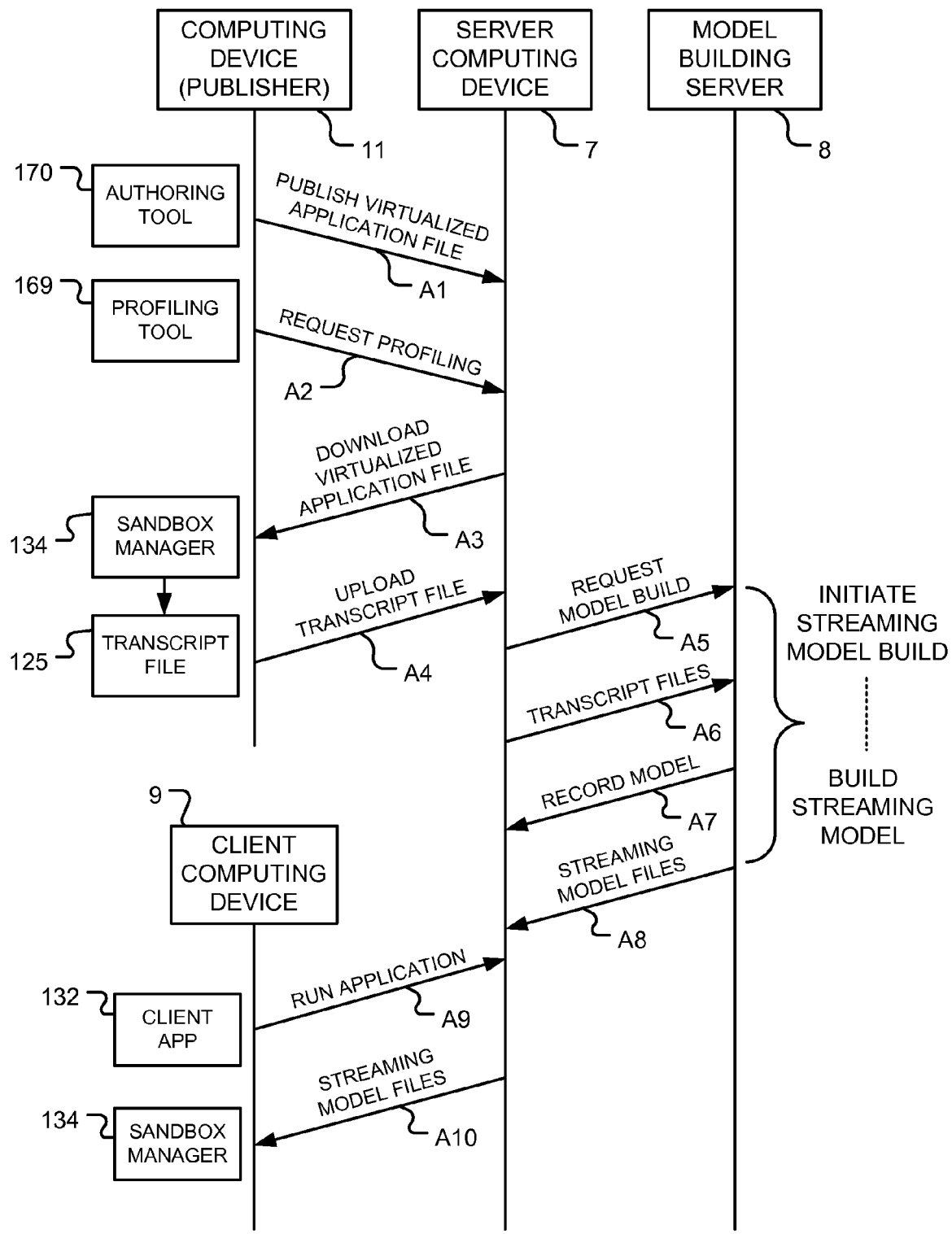
FIG. 13 is a diagram illustrating exemplary communications between a computing device operated by an application publisher or developer (labeled "Client (Publisher)"), the server computing device of FIG. 1 (labeled "Public Spoon Serve"), and the model building server of FIG. 1 (labeled "Build Server").

An upper portion of FIG. 13 illustrates exemplary communications between the computing device 11 operated by an application publisher or developer, the server computing device 7, and the model building server 8. A lower portion of FIG. 13 illustrates exemplary communications between the client computing device 9 operated by a user and the server computing device 7. In FIG. 13, the authoring tool 170, the profiling tool 169, and the Sandbox Manager 134 are installed and operating on the computing device 11. Another instance of the Sandbox Manager 134 and the Client Application 132 are installed and operating on the client computing device 9. For ease of illustration, the computing device operated by an application publisher will be described as being the computing device 11. However, this is not a requirement.

Figure 9:
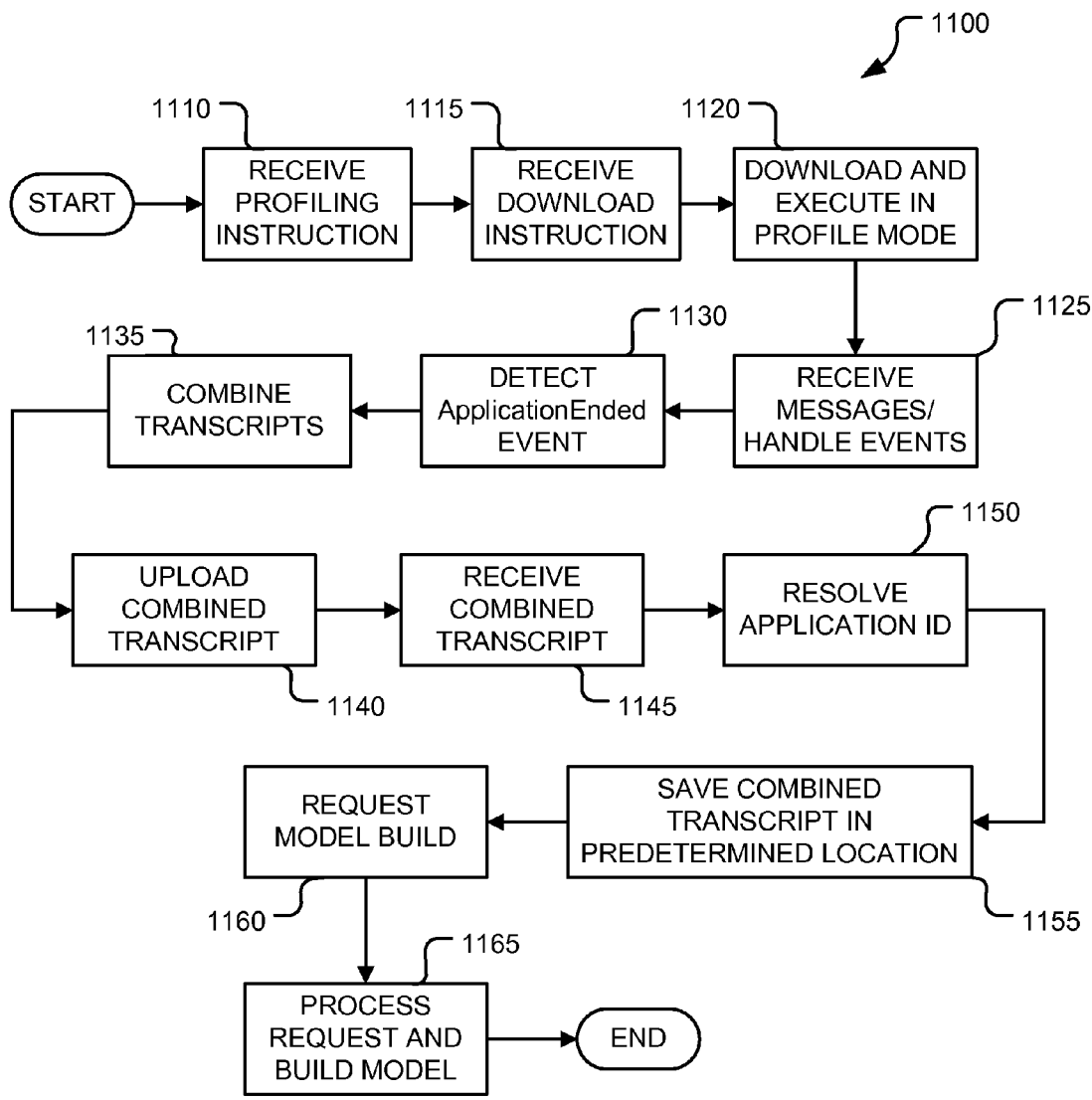
FIG. 9 is a flow diagram of a method of building a streaming model for a particular application and distributing that streaming model across multiple server computing devices.

FIG. 9 is a flow diagram of a method 1100 of building a streaming model (e.g., the streaming model 122 illustrated in FIG. 19) for a particular application (e.g., the virtual application 110) and distributing that streaming model across multiple servers (e.g., the server computing devices 6 and 7 illustrated in FIG. 1). Before the method 1100 is performed, the application publisher or developer has published the application (e.g., the virtual application 110) to the server computing device 7. Turning to FIG. 13, arrow "A1" illustrates a communication from the computing device 11 operated by the application publisher or developer publishing the application (e.g., the virtual application 110) to the server computing device 7.

Returning to FIG. 9, in first block 1110, the server computing device 7 receives an instruction from an application publisher or developer that a particular application is to be profiled. Arrow "A2" in FIG. 13 illustrates a communication from the computing device 11 to the server computing device 7 requesting profiling for an application. The authoring tool 170 may be configured to allow an application publisher or developer to specify that after an application is downloaded, the Sandbox Manager 134 is to profile the application and upload transcript files (generated by the profiling process 700 illustrated in FIG. 4) to the server computing device 7. For example, the authoring tool 170 may have a link to an online management panel configured to display a profiling tool 169 (see FIGS. 3 and 13) operable by a user to indicate a particular application is to be profiled following its download. Using the online management panel the user selects a virtual application (e.g., by selecting an xlayer file implementing the virtual application). For example, the publisher or developer may select a virtual application implemented by an xlayer file named "app.xlayer." If an application has been identified as "to be profiled," streaming is not enabled. Instead, to run the application from the web, the entire application file (e.g., the xlayer file named "application_p.xlayer") must be downloaded before execution can begin. Thus, arrow "A3" in FIG. 13 illustrates a communication downloading the xlayer file from the server computing device 7 to the computing device 11.

The profiling tool 169 may be implemented as a "Profile" link in the online management panel. When the publisher clicks on the "Profile" link, a panel launcher page may be displayed that includes a query string parameter (e.g., "&profile=") set to a value that indicates the application should be profiled. The page may pass the query string parameter (e.g., "&profile=") to an iframe that renders the panel launcher page. The panel launcher page renders a javascript call to the xrfw.go( ) method that sets the query string parameter (e.g., "&profile=") equal to "TRUE."

In block 1115, the server computing device 7 receives an instruction to download the virtual application 110 to the client computing device 9. For example, this instruction may be received in response to a user clicking on a launch button on the panel launcher page.

In block 1120, the Sandbox Manager 134 downloads and executes the virtual application file 140 in a profile mode. When executing an application in profile mode, the Sandbox Manager 134 instructs the virtual machine (e.g., the virtual runtime engine 131) to provide execution statistics (e.g., via messages implemented using the structure named "SFeedbackStatsMessage").

In block 1125, the Sandbox Manager 134 receives messages from the virtual runtime engine 131 and handles events generated by the virtual runtime engine 131 executing the application as the application is running. The method 800 (described above) may be performed in blocks 1120 and 1125.

By way of non-limiting examples, the events may include a ProcessStarted event, a ThreadStarted event, an ExecutionStatistic event, and an Application Ended event. A ProcessStarted event may be identified by the Sandbox Manager 134 when the directing process 129 receives a message from the virtual runtime engine 131 indicating a process has requested access to the xlayer file for the first time. As explained above, such a message may be sent by the virtual runtime engine 131 in block 719 of the profiling process 700 illustrated in FIG. 4 and implemented using the structure named "SProcessConnectMessage." A ThreadStarted event may be identified by the Sandbox Manager 134 when the directing process receives a message indicating a thread has requested access to the xlayer file for the first time. As explained above, such a message may be sent by the virtual runtime engine 131 in block 765 of the profiling process 700 illustrated in FIG. 4 and implemented using the structure named "SThreadStartedMessage." The ProcessStarted and ThreadStarted events allow the Sandbox Manager 134 to separately track access requests from different processes and threads.

An ExecutionStatistic event may be identified by the Sandbox Manager 134 when the directing process 129 receives a message including access statistics. As explained above, such a message may be sent by the virtual runtime engine 131 in block 752 of the profiling process 700 illustrated in FIG. 4 and implemented using the structure named "SFeedbackStatsMessage." Every time the virtual application 110 finishes reading a contiguous section of an xlayer file 300, the virtual runtime engine 131 triggers an ExecutionStatistic event and sends a message including access statistics to the directing process. The message, which may be implemented using the structure named "SFeedbackStatsMessage" may include an identifier for the xlayer file (e.g., the xlayerId value), the thread (e.g., the PseudoTid value), time (e.g., the TickCount value, timestamp, and the like), the location of the block in the xlayer file (e.g., the AccessOffset value), and the size of the block read (e.g., the AccessBytes value). The TickCount value may be used to track the runtime of a process. An identifier for the process (e.g., the PseudoPid value) may be inferred from the named pipe connection used because the named pipe connection used by each process is unique.

In next block 1130, the Sandbox Manager 134 detects that an ApplicationEnded event has been triggered.

Figure 6:
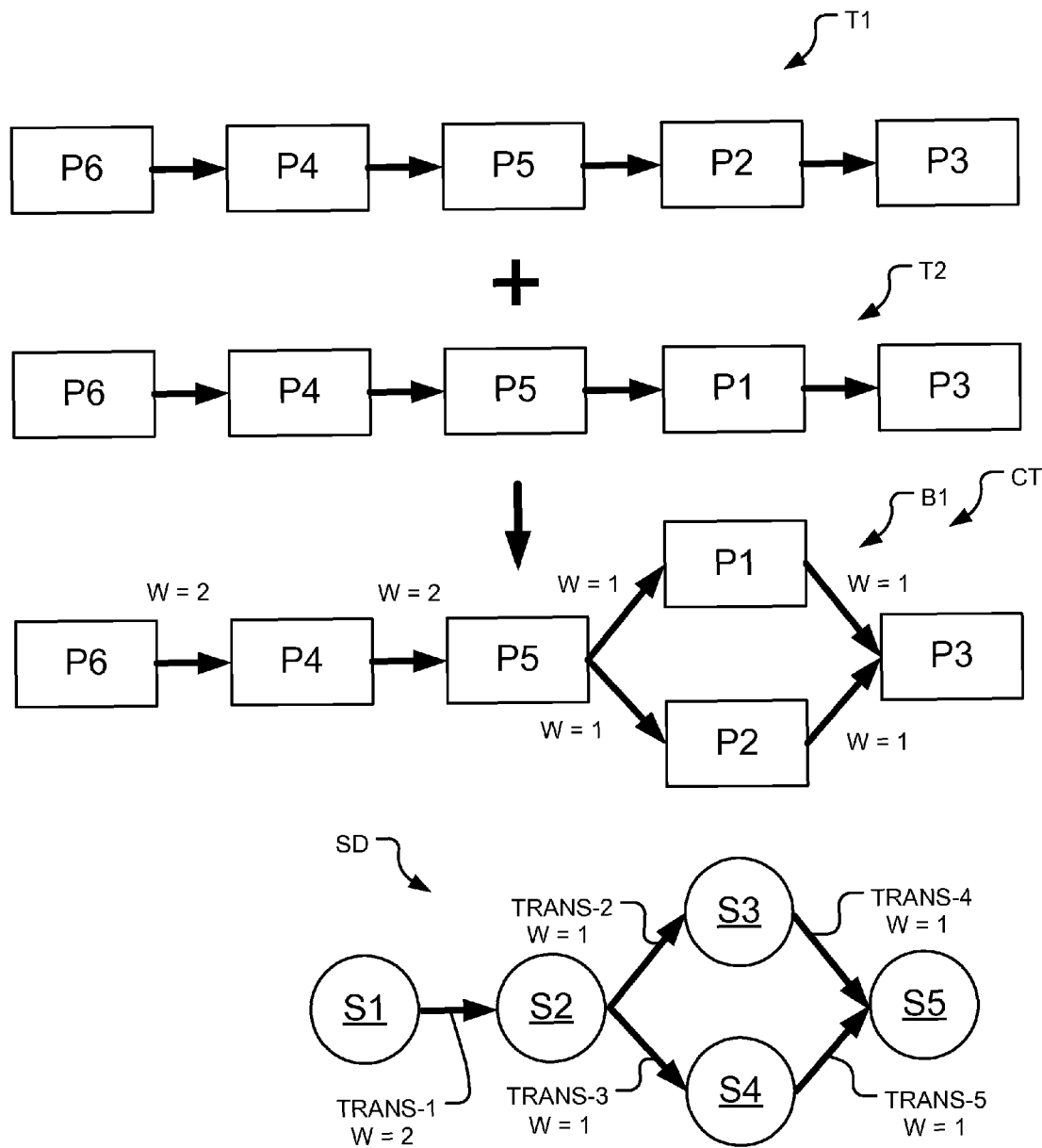
FIG. 6 is a block diagram illustrating transcripts, a combined transcript created based on the transcripts, and a directed graph structure constructed based on the combined transcript.

Then, in block 1135, the Sandbox Manager 134 combines the collected execution statistics into a single combined transcript (e.g., the combined transcript "CT" illustrated in FIG. 6).

In block 1140, the Sandbox Manager 134 uploads the combined transcript to the server computing device 7. Arrow "A4" in FIG. 13 illustrates a communication from the computing device 11 to the server computing device 7 uploading the combined transcript. In block 1140, the Sandbox Manager 134 may connect to a web service running on the server computing device 7, and transfer a unique application identifier and a byte array containing the binary data of combined transcript to the server computing device 7. By way of a non-limiting example, the application identifier may have the following format: <AppInternalName>/<AppVersion>_<LayerRevision>/<AppInternalName>_p.xlayer.

In block 1145, the server computing device 7 receives the uploaded combined transcript and associated application identifier.

Figure 11:
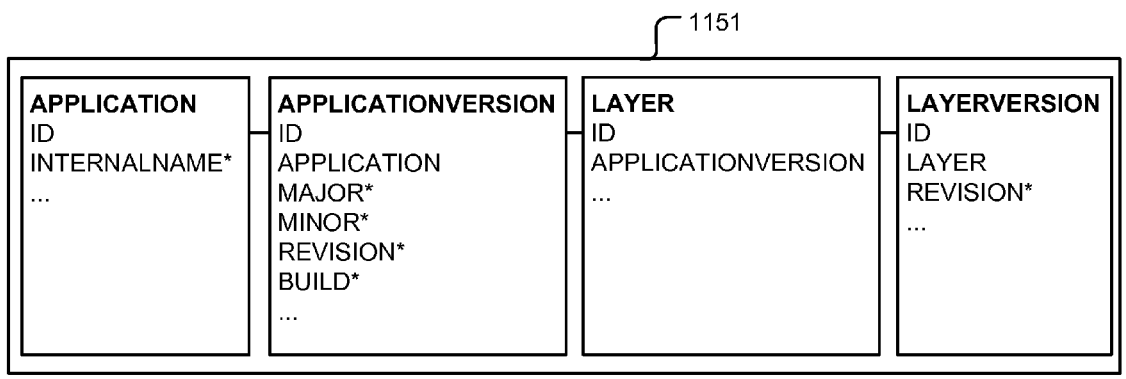
FIG. 11 is an illustration of an application library database that includes an application table, an application version table, an xlayer table, and an xlayer version table.

In block 1150, the server computing device 7 resolves the application identifier to determine which application and version created the transcript. The server computing device 7 includes an application library database 1151 illustrated in FIG. 11. In block 1150, the application library database may be queried for an application that has a matching version and xlayer revision. If an xlayer file is found, the transcript will be associated with this xlayer file.

In block 1155, the server computing device 7 saves the combined transcript in a predetermined location on the filesystem. In block 1155, the binary data contained in the transcript may be written to a file on the server computing device 7 using a standard .NET BinaryWriter. Each transcript is named using a unique GUID. Files containing the transcripts may be stored at the following location, relative to the web root:

---

Layers\Transcripts\<AppInternalName>\
<AppVersion>_<LayerRevision>\
<AppInternalName>_p.xlayer\<GUID>.xt.

---

In block 1160, the server computing device 7 requests a build of a new streaming model for the xlayer file identified in block 1150. Arrow "A5" in FIG. 13 illustrates a communication from the server computing device 7 to the model building server 8 requesting a build of a new streaming model for the xlayer file identified in block 1150. If a streaming model has not been created for a particular xlayer file, in block 1160, the server computing device 7 may automatically add a request for a streaming model to a streaming model build queue. By way of a non-limiting example, the streaming model build queue may be implemented as a ModelRequest table 1161 illustrated in FIG. 10. In implementations including multiple model build servers, the ModelRequest table 1161 may be stored in a database accessible by all model build servers.

Figure 10:
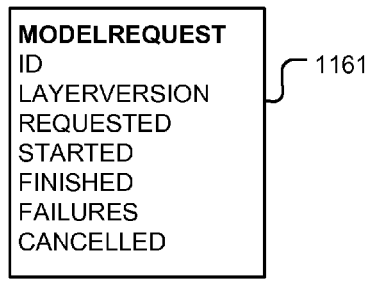
FIG. 10 is an illustration of a ModelRequest table.

Application publishers can use the profiling tool 169 to request subsequent model builds as needed (e.g., by adding a request to the ModelRequest table illustrated in FIG. 10), after additional profiling has been performed to generate additional transcripts. This may be achieved by adding a record to the ModelRequest table illustrated in FIG. 10.

In block 1165, the request is processed and a streaming model (e.g., the streaming model 122 illustrated in FIG. 19) is generated for the xlayer file identified in block 1150. The streaming model may be generated by the server computing device 7 or another computing device connected thereto. In the embodiment illustrated in FIG. 1, streaming models are generated by the model building server 8. By way of a non-limiting example, an application running as a windows service on the model building server 8 may be responsible for building the streaming model based on the transcripts associated with the unique application identifier. The model building server 8 may periodically query the ModelRequest table 1161 for any requests that have not yet been started. When one is found, the model building server 8 begins a build (i.e., starts constructing a streaming model).

Figure 19:
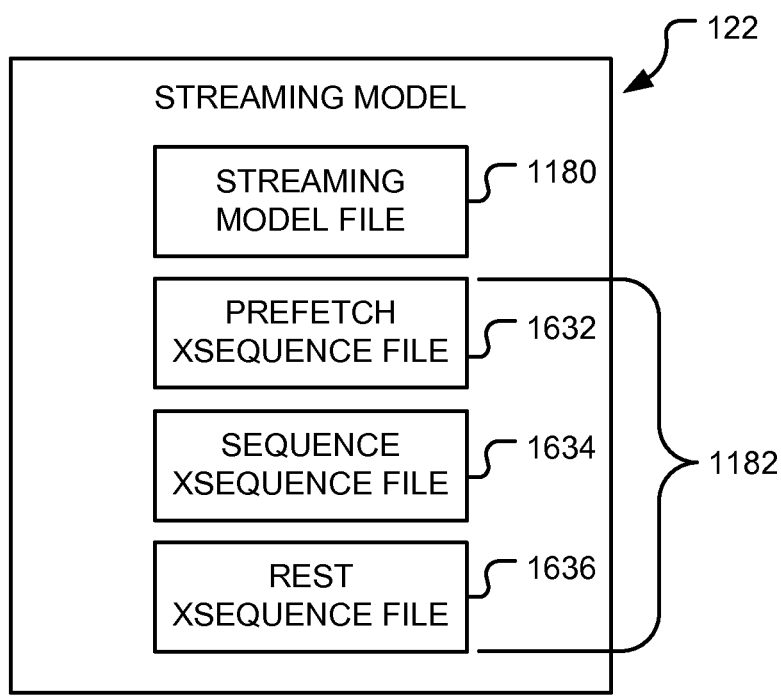
FIG. 19 is a block diagram of a streaming model.
Figure 20:
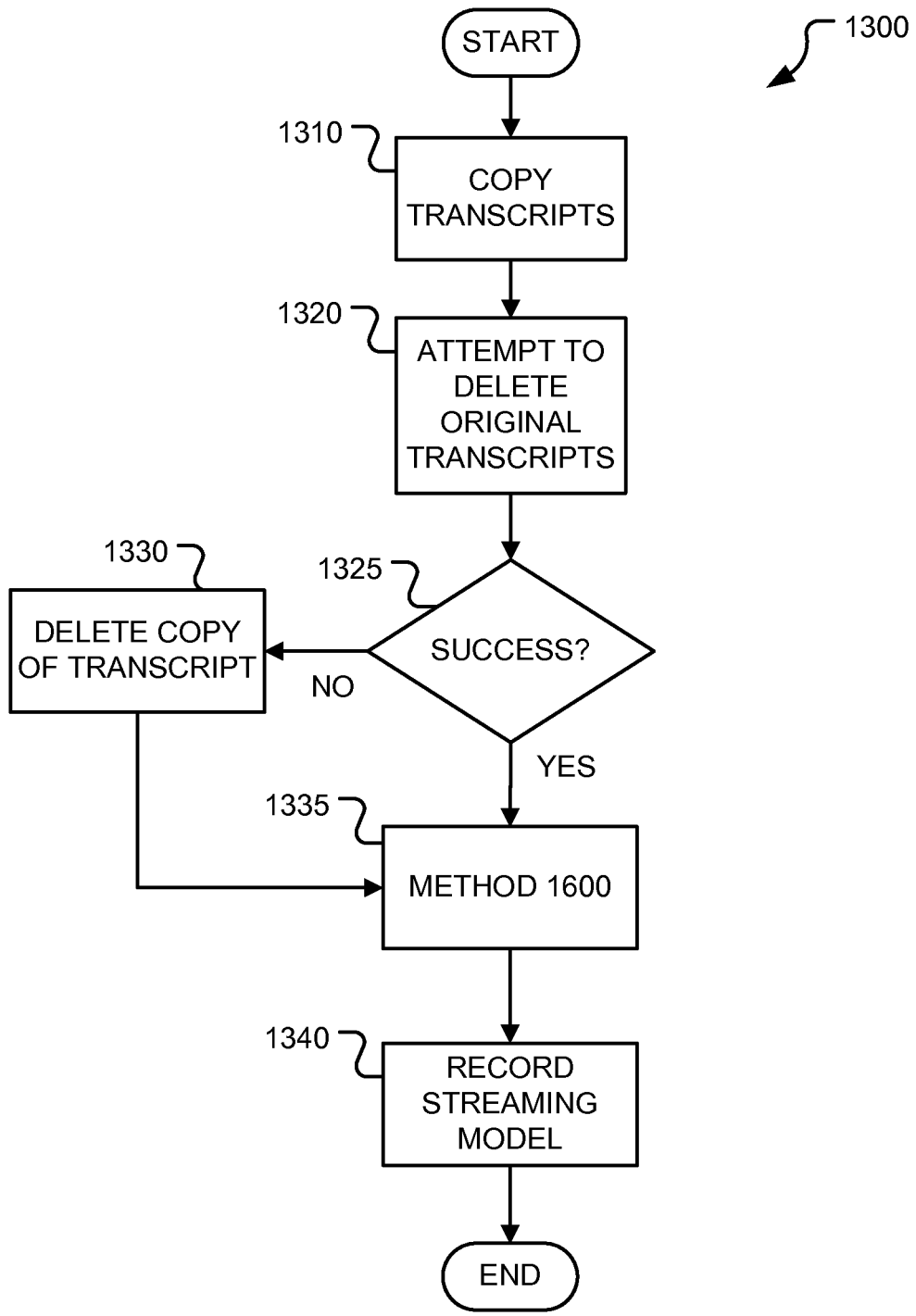
FIG. 20 is a flow diagram of a method of building the streaming model of FIG. 19.

FIG. 20 illustrates a method 1300 of building the streaming model 122 illustrated in FIG. 19 that may be performed in block 1165 of the method 1100 illustrated in FIG. 9. To build the streaming model, in block 1310, the model building server 8 first collects transcripts associated with the xlayer file identified in block 1150 (which may be stored on multiple server computing devices, such as the server computing devices 6 and 7 illustrated in FIG. 1). In implementations that include more than one model building server 8, the server computing devices may networked, and share a (LibraryResources) folder at the base of their application library resources, so that each can access the other using the following path "\\<ServerName>\LibraryResources\." Transcript files associate with a particular xlayer file can be stored on one or more different server computing devices. If the transcript files associated with a particular xlayer file are stored on a particular server computing device, then the transcript files can be retrieved from that particular server computing device using a consistent folder structure (e.g., "<ServerHostName>\LibraryResources\Layers\Transcripts\ . . . "). In other words, a predetermined path may be used to obtain transcript files from different server computing devices that each store transcript files in the same storage location. If a transcript file is not stored on a particular server computing device, the server computing device will issue an error.

Then, in block 1310, the model building server 8 copies all transcript files associated with the xlayer file identified in block 1150 into the same directory in the filesystem of the model building server 8. For example, all files stored in a first directory named "\\<SpoonServer>\LibraryResources\Layers\Transcripts\<AppInternalName>\<AppVersion>_<LayerRevision>\<AppinternalName>_p.xlayer\" may be copied to a second directory named "\\<BuildServer>\LibraryResources\Layers\Transcripts\<AppInternalName>\<AppVersion>_<LayerRevision>\<AppinternalName>_p.xlayer\." Arrow "A6" in FIG. 13 illustrates a communication from the server computing device 7 to the model building server 8 uploading the transcript files to the model building server 8.

When the copying is finished, in block 1320, the model building server 8 tries to delete the original transcript files (stored in the first directory).

In decision block 1325, the model building server 8 determines whether the transcript files have been successfully deleted. If the attempt to delete a particular transcript file fails, the model building server 8 concludes the transcript is still being written and the decision in decision block 1325 is "NO." Then, in block 1330, the copy stored in the second directory is deleted. These copy and delete actions may use the standard .NET File class.

In block 1335, the model building server 8 then performs a method 1600 (illustrated in FIG. 23) to construct a streaming model based on the transcripts stored in the second directory. The collection of files (including the transcripts stored in the second directory and the streaming model) may be stored in a third directory named "\\<BuildServer>\LibraryResources\Layers\<AppInternalName>\<AppVersion>_<LayerRevision>\xstream\0\."

Figure 12:
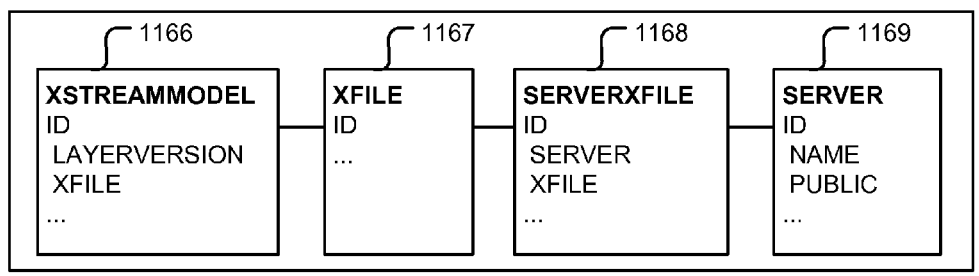
FIG. 12 is an illustration of a data schema that includes an XStreamModel table, an XFile table, a ServerXFile table, and a Server table.

In block 1340, referring to FIG. 12, when the streaming model is saved, the model building server 8 creates a record in an XStreamModel table 1166, as well as corresponding entries in an XFile table 1167 and a ServerXFile table 1168. Arrow "A7" in FIG. 13 illustrates a communication from the model building server 8 to the server computing device 7 recording information in the XStreamModel table 1166, the XFile table 1167, and the ServerXFile table 1168. These tables may be stored in the same database used to store the Model Request table 1161. This database may be accessible by each of the server computing devices and model building servers.

Referring to FIG. 19, a streaming model (e.g., the streaming model 122 illustrated in FIG. 19) includes a streaming model file 1180, and one or more xsequence files 1182.

Returning to FIG. 12, the records in the XFile table 1167 and ServerXFile table 1168 indicate the existence of a new streaming model, and identify on which server(s) the streaming model is stored. The server table 1169 stores information about each of the server computing devices (e.g., the server computing devices 6 and 7). The XStreamModel table 1166 indicates a particular streaming model exists, the XFile table 1167 stores data about the streaming model file 1180, and the ServerXFile table 1168 describes the streaming model file 1180 located on a particular server computing device. Arrow "A8" in FIG. 13 illustrates a communication from the model building server 8 to the server computing device 7 storing the streaming model file 1180 and associated one or more xsequence files 1182 on the server computing device 7. Optionally, the model building server 8 may store the streaming model file 1180 and associated one or more xsequence files 1182 on one or more other server computing devices. The streaming model (which includes the streaming model file 1180 and associated one or more xsequence files 1182) may be stored in a predetermined storage location on the server computing device 7.

Figure 21:
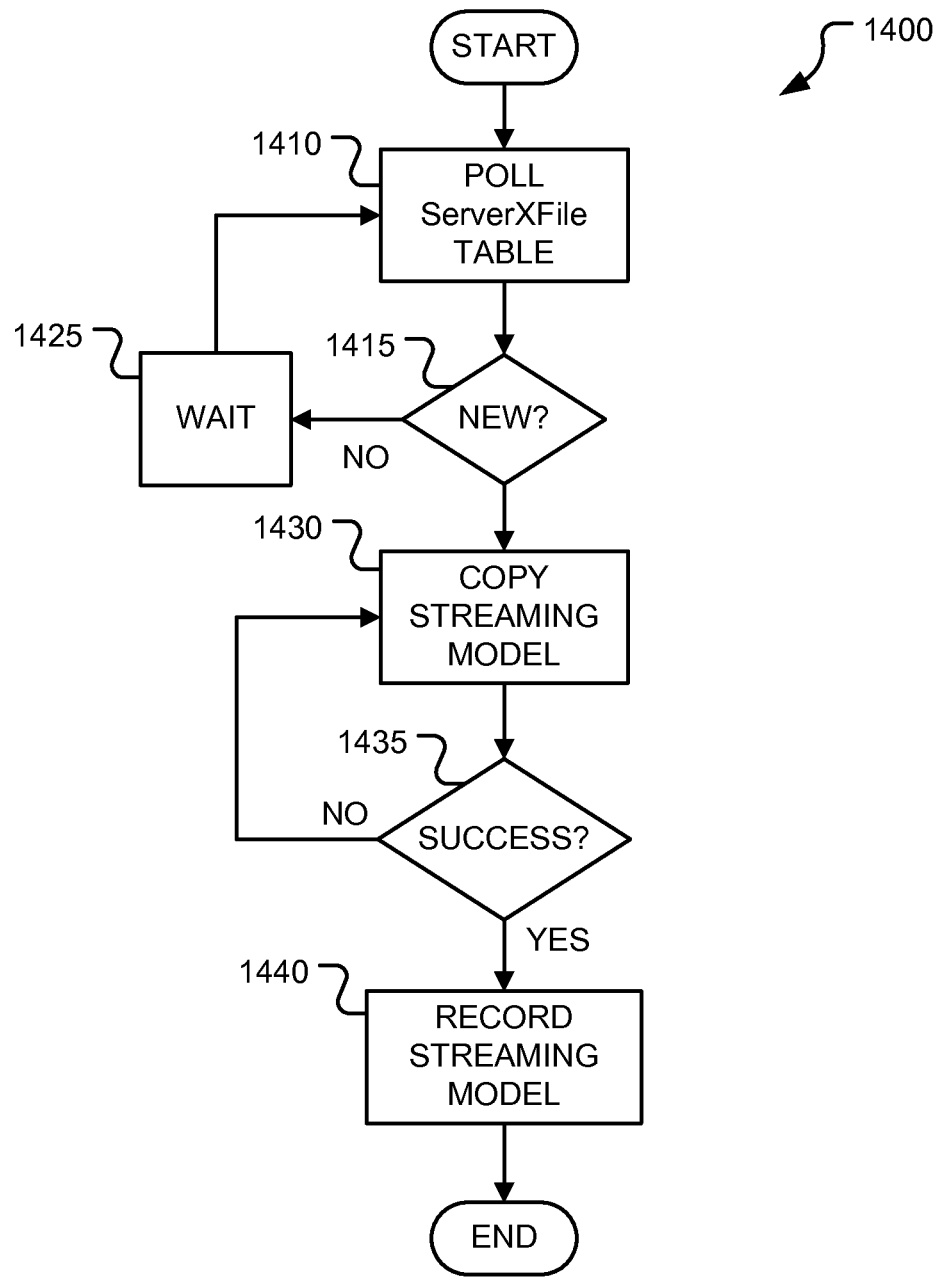
FIG. 21 is a flow diagram of a method of distributing streaming models.

At this point, the streaming models may be distributed to other computing devices connected to the model building server 8 and/or the network 10. FIG. 21 is a flow diagram of a method 1400 of distributing streaming models. Server computing devices (e.g., the server computing devices 6 and 7) may poll or query the ServerXFile table 1168 to locate files stored on other server computing devices. In first block 1410, a querying server computing device (e.g., the server computing device 6) polls or queries the ServerXFile table 1168 for streaming models stored on other server computing devices (e.g., the server computing device 7). For example, in block 1410, the server computing device 6 may receive a list of streaming models identified in the ServerXFile table 1168 that are stored on all other server computing devices.

In decision block 1415, for each streaming model identified in block 1410, the querying server computing device determines whether the streaming model is already stored in the filesystem of the querying server computing device. The decision in decision block 1415 is "NO" when the streaming model is already stored in the filesystem of the querying server computing device. Otherwise, the decision in decision block 1415 is "YES" when the streaming model is not already stored in the filesystem of the querying server computing device.

When the decision in decision block 1415 is "YES," in block 1425, the querying server computing device waits for a period of time and then returns to block 1410. In block 1425, the querying server computing device may wait for a predetermined amount of time, a randomly selected amount of time, or a combination thereof.

When the decision in decision block 1415 is "YES," in block 1430, the streaming model is copied from a server computing device on which the streaming model is stored to the querying server computing device. Thus, when a record is found in the ServerXFile table 1168 that the querying server computing device does not yet have stored in its filesystem (according to the ServerXFile table), a copy is initiated. In other words, the querying server computing device (e.g., the server computing device 6) may use the ServerXFile table 1168 to locate model files stored on other server computing devices (e.g., the server computing device 7) and copy those files to the local filesystem of the querying server computing device. The files located in this manner may be copied from the third directory to a fourth directory named "\\<SpoonServer>\LibraryResources\Layers\ <AppInternalName>\<AppVersion>_<LayerRevision>\ xstream\0\." In other words, each server computing device is responsible for distributing streaming model files by copying those files onto their own filesystem.

In decision block 1435, for each streaming model copied in block 1430, the querying server computing device determines whether the streaming model was copied to the filesystem of the querying server computing device successfully. The decision in decision block 1435 is "YES" when the streaming model was copied to the filesystem of the querying server computing device successfully. Otherwise, the decision in decision block 1435 is "NO" when the streaming model was not copied to the filesystem of the querying server computing device successfully.

When the decision in decision block 1435 is "NO," the querying server computing device may return to block 1430 to retry the copy operation.

When the decision in decision block 1435 is "YES" (the copy operation has completed successfully), in block 1440, the querying server computing device (e.g., the server computing device 6) adds a new record to the ServerXFile table 1168, indicating that the streaming model is now stored on that particular server computing device. Thus, after a server computing device (e.g., the server computing device 6) copies streaming models onto its filesystem, the server computing device records this in the database illustrated in FIG. 12. For example, if a server computing device named "publicserver1" copies a streaming model named "Model1" into its filesystem, the "publicserver1" computing device creates a record in the ServerXFile table 1168 in which a field named "Server" is set to "publicserver1." Then, the method 1400 terminates.

Figure 22:
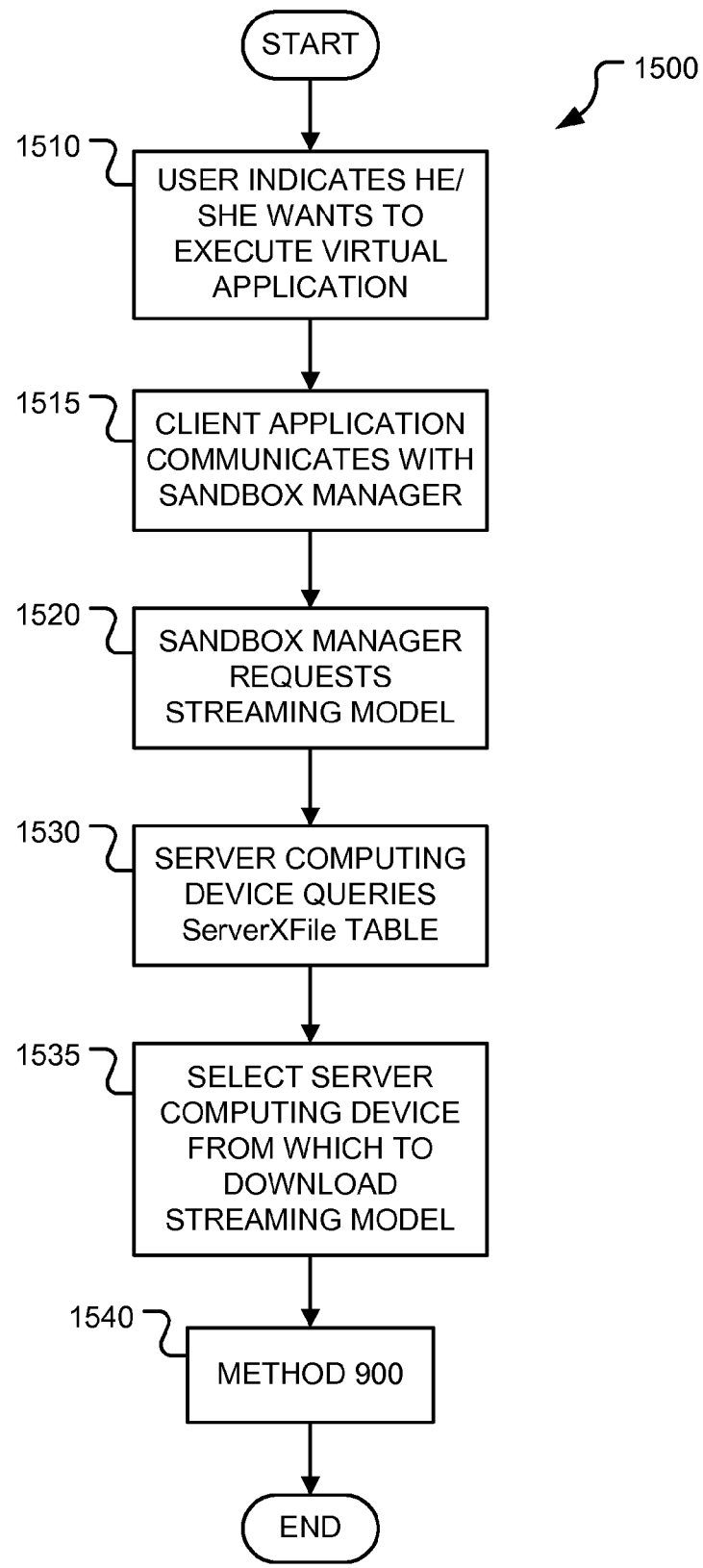
FIG. 22 is a flow diagram of a method of locating a streaming model.

FIG. 22 illustrates a flow diagram of a method 1500 of locating a streaming model. A server table 1169 may be used to list all servers on which streaming models may be stored. If the querying server computing device is indicated as being "Public" in the server table 1169 illustrated in FIG. 12, pages that render the plug-in 136 will read a record in the ServerXFile table 1168 (associated with the querying server computing device) and may instruct the plug-in 136 to use the new streaming model copied onto the querying server computing device on subsequent application launches. In first block 1510, a user operating the client computing device 9 indicates he/she would like to execute a virtual application (e.g., the virtual application 110). By way of a non-limiting example, in block 1510, the user may click on a hyperlink (displayed in a web browser) provided by the server computing device 7 and associated with the virtual application.

In optional block 1515, the Client Application 132 communicates that the user would like to execute a virtual application to the Sandbox Manager 134.

In block 1520, the Sandbox Manager 134 executing on the client computing device 9 (which may be located somewhere across the world from the server computing device 7) requests the virtual application the user indicated he/she would like to execute in block 1510.

In block 1530, the server computing device that services the request (e.g., the server computing device 7) will query the ServerXFile table 1168 to determine which server computing device(s) is/are storing the streaming model for the application requested in block 1520. For example, in block 1520, the Sandbox Manager 134 may request an application named "App1.xlayer" for which a streaming model named "Model1" was created. In this example, in block 1530, the server computing device 7 may query the ServerXFile table 1168 to determine which server computing device(s) are storing the streaming model named "Model1" associated with the application requested in block 1520.

Then, in block 1535, the server computing device that services the request (e.g., the server computing device 7) selects one of the server computing device(s) storing the streaming model requested in block 1520 from which to download the streaming model. Load balancing techniques or a random selection algorithm may be used to select a server computing device in block 1535. For example, in block 1535, load balancing techniques or a random selection algorithm may be used to select a server computing device (e.g., the "publicserver1" computing device) from which the "Model1" model file may be downloaded to the client computing device 9.

Then, in block 1540, the method 900 (illustrated in FIG. 18) is performed to download and execute the virtual application on the client computing device 9 using the streaming model. Then, the method 1500 terminates.

Modeling

FIG. 23 illustrates the method 1600 of constructing a streaming model (e.g., the streaming model 122 illustrated in FIG. 19). As mentioned above, multiple transcripts are recorded during profiling process 700 and later combined to build a streaming model (e.g., the streaming model 122 illustrated in FIG. 19) for an application (e.g., the virtual application 110). In first block 1610, referring to FIG. 19, the individual transcripts (e.g., the transcript "T1" and "T2") are combined to form a combined transcript "CT."

Among other data, each transcript includes information identifying transitions between pages ("page transitions"). To combine the transcripts, in block 1610, the page transitions are broken down and combined. For example, referring to FIG. 6, if a first transcript "T1" records a first sequence of page transactions (P6▶P4▶P5▶P2▶P3) indicating a first order in which the pages P6, P4, P5, P2, and P3 were accessed by the application, and a second transcript "T2" records a second sequence of page transactions (P6▶P4▶P5▶P1▶P3) indicating a second order in which the pages P6, P4, P5, P1, and P3 were accessed by the application, the transcripts "T1" and "T2" are broken down into individual transitions: (P6▶P4), (P4▶P5), (P5▶P2), (P2▶P3) for the first transcript "T1" and (P6▶P4), (P4▶P5), (P5▶P1), (P1▶P3) for the second transcript "T2." In this example, the first sequence (in the first transcript "T1") transitioned from page P6 to page P4 to page P5 to page P2 to page P3 and the second sequence (in the second transcript "T2") transitioned from page P6 to page P4 to page P5 to page P1 to page P3. Because a transition from page P6 to page P4 is present in both transcripts "T1" and "T2," in block 1610, this transition (P6▶P4) is combined into a single transition and assigned a weight "W" (indicating how many times the transition appears in the transcripts, e.g., a weight equal to two) in a combined transcript "CT." Similarly, because a transition from page P4 to page P5 is present in both transcripts "T1" and "T2," in block 1610, this transition (P4▶P5) is combined into a single transition and assigned a weight "W" (indicating how many times the transition appears in the transcripts, e.g., a weight equal to two) in a combined transcript "CT." The other transitions appear in only one transcript. Therefore, in this example, in block 1610, these transitions are each assigned a weight equal to one. Further, a timestamp value may be stored for each page indicating a time at which the page was first accessed. After transitioning to page P5, the first and second transcripts "T1" and "T2" indicate the user may transition to either page P2 or page P1. Thus, the combined transitions include a branch "B1" and no longer follow a linear path.

After the individual transcripts have been combined to form the combined transcript "CT," in block 1620, the combined transcript "CT" is used to create a directed graph structure "SD." The directed graph structure "SD" includes states and transitions between states. The states are merely end points (or nodes) for the transitions. Each transition is associated with one or more pages. The directed graph structure "SD" illustrated in FIG. 6 includes five states S1 to S5, and five transitions TRANS-1 to TRANS-5.

In the directed graph structure "SD," linear sequences of transitions (i.e., sequences of transitions without any branches) in the combined transcript "CT" are reduced or simplified into a single transition. For example, the linear sequence of transitions that includes the following transitions (P6▶P4▶P5), is simplified into the single transition TRANS-1 (or S1▶S2) that is associated with the pages P6, P4, and P5. The weight of transition TRANS-1 is the same as the weight of each of the transitions (P6▶P4▶P5). The transition TRANS-2 (or S2▶S3) is associated with the pages P5 and P1. The transition TRANS-3 (or S2▶S4) is associated with the pages P5 and P2. The transition TRANS-4 (or S3▶S5) is associated with the pages P1 and P3. The transition TRANS-5 (or S4▶S5) is associated with the pages P2 and P3.

When the states and transitions are created by combining the transitions in the combined transcript "CT," a timestamp delta valued is calculated for each page. The timestamp delta is the difference between the start time of the transcript (e.g., a time at which execution of the virtual application began) and the timestamp recorded for the page in the transcript. Then, an average timestamp delta value is calculated for the pages associated with each of the transitions between states. This average is recorded for each transition between states as a TickDelta member.

The directed graph structure "SD" describes data access by the application while executing and may be stored in one or more state objects. Referring to FIG. 24, each of the states (e.g., the states S1 to S5) may be stored in a different state object 1660. The state object 1660 may include a list of transitions 1662 associated with the state. For example, the list of transitions for a state object corresponding to the state S1 would include only the transition TRANS-1. By way of another example, the list of transitions for a state object corresponding to the state S2 would include the transitions TRANS-2 and TRANS-3. The state object 1660 may include a degree member 1664 that indicates a number of transitions associated with the state object 1660. For example, the degree member of the state object corresponding to the state S1 would indicate only a single transition is associated with the state object (e.g., degree=1). By way of another example, the degree member of the state object corresponding to the state S2 would indicate two transitions are associated with the state object (e.g., degree=2). The state object 1660 may include a weight member 1666 that stores a total of the weights assigned to the transitions. For example, the weight member of the state object corresponding to the state S1 may be set to a weight of two. By way of another example, the weight member of the state object corresponding to the state S2 may be set to a weight of two. The weight members of state objects corresponding to the states S3 and S4 may each be set to a weight of one.

Referring to FIG. 25, each of the transitions may be stored in a transition data structure 1670 that has a weight member 1672 indicating how many times the transition occurs in the combined transcript. The transition data structure 1670 may include a page sequence member 1674 that stores the page identifiers of the pages included in the transition. For example, the page sequence member of a transition data structure storing the transition TRANS-1 would store identifiers for pages P6, P4, and P5. The transition data structure 1670 may include a TickDelta member 1676 that stores an amount of time (e.g., in nanoseconds) that the transition required.

The directed graph structure "SD" (stored by the one or more state objects) may include loops or cycles. By way of a non-limiting example, the directed graph structure "SD" may be a directed acyclic graph ("DAG"). However, this is not a requirement. As mentioned above, in the directed graph structure "SD," the transitions (or "edges") are labeled with a set of pages or data blocks.

Transition data structures that are too large may be divided into two or more separate transition data structures. For example, transition data structures that have a large value stored in the TickDelta member, or have a large number of pages stored in the page sequence member may be subdivided into two or more separate transition data structures.

In block 1630, the pages identified in the page sequence members of the transition data structures are encoded in one or more xsequence files. The xsequence files each belong to one of three categories: initial execution xsequence files, sequence xsequence files, and rest xsequence files. For example, the xsequence files 1182 of the streaming model 122 illustrated in FIG. 19 include a initial execution xsequence file 1632, a sequence xsequence file 1634, and a rest xsequence file 1636.

As mentioned above, the virtual application 110 may be streamed from the server computing device 7 without using a special streaming protocol by encoding the xlayer file into smaller xsequence files. In particular embodiments, the virtual application 110 may be streamed from the server computing device 7 using well-known download protocols, such as HTTP, FTP, SMB, and the like. Which category a particular page is encoded into is based upon the directed graph structure "SD" which predicts when the page may be used by a virtual application as it is executing as xsequence files are concurrently being downloaded.

Figure 26:
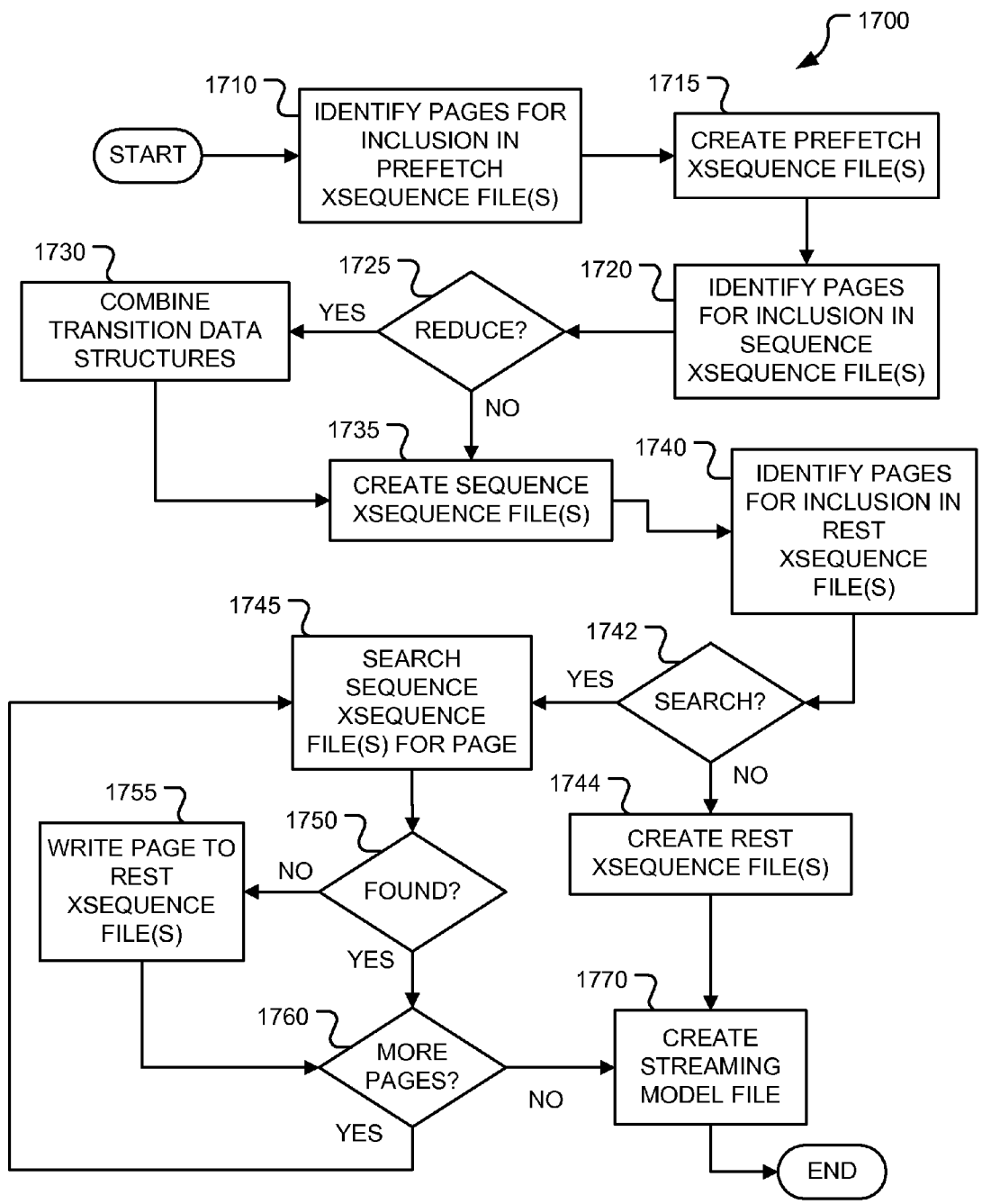
FIG. 26 is a flow diagram of a method of encoding pages of a directed graph structure into xsequence files.

FIG. 26 is a flow diagram of a method 1700 of encoding the pages of the directed graph structure "SD" into xsequence files. The method 1700 may be performed in block 1630 of the method 1600 illustrated in FIG. 23. In first block 1710, the model building server 8 identifies the pages to be stored in the initial execution xsequence files. Initial execution xsequence files contain pages that must be downloaded before the virtual application (e.g., the virtual application 110) launches. For example, depending upon the implementation details, the user may see a buffering dialog while initial execution xsequence files are downloaded. Depending upon the implementation details, each streaming model may include only a single initial execution xsequence file including the pages identified in block 1710.

In block 1710, the pages included in the initial execution xsequence file may be identified by determining how close in time (which may be determined using the time stamp for the page) each page is to an origin or first transition data structure listed in the list of transitions in a first state object in the directed graph structure "SD." Then, only the pages accessed within a predetermined amount of time from the first transition data structure may be selected for inclusion in the initial execution xsequence file(s). Alternatively, a predetermined number of pages accessed within a least amount of time from the first transition data structure may be selected for inclusion in the initial execution xsequence file(s). By way of another non-limiting example, a predetermined percentage of pages including those that were accessed within the least amount of time from the first transition data structure may be selected for inclusion in the initial execution xsequence file(s).

The following pseudo code provides a non-limiting example of a method of encoding the pages in the initial execution xsequence file using the directed graph structure "SD."

```
public void CompileInitial execution ( )
{
    foreach (State s in Model.states)
    {
        if (s.IsChildOf (OriginState) &&
            s.Ticks < BUFFERTIME_THRESHOLD)
        {
            ListOfPrefectchStates.Add (s);
        }
    }
}
```

In the pseudo code above, the function named "IsChildOf" determines whether a second state (stored in variable named "s") is reachable from the first state (stored in a variable named "OriginState"). In other words, the function named "IsChildOf" determines whether a path exists in the directed graph structure "SD" from the first state to the second state. In FIG. 6, the state "S1" is considered the first or origin state. If the second state is reachable from the first state and less than a threshold amount of time (stored in a constant named "BUFFERTIME_THRESHOLD") elapsed between the first and second states, the second state is added to a list of initial execution states. Then, while not included in the pseudo code above, the pages associated with the transitions between the first and second states are written into the initial execution xsequence file.

In block 1715, the model building server 8 writes the pages identified in block 1710 to the initial execution xsequence file(s).

In block 1720, the model building server 8 identifies pages for inclusion in the sequence xsequence files. For example, in block 1720, the model building server 8 may identify the pages (identified in the page sequence members of the transition data structures) that were not written to the initial execution xsequence file(s) in block 1715.

In decision block 1725, the model building server 8 decides whether to create a sequence xsequence file for each transition data structure that was not used to populate the initial execution xsequence file or to reduce the number of sequence xsequence files created by combining the transition data structures that were not used to populate the initial execution xsequence file. The decision in decision block 1725 is "YES" when the model building server 8 decides to combine the transition data structures that were not used to populate the initial execution xsequence file. Otherwise, the decision in decision block 1725 is "NO" when the model building server 8 decides to create a sequence xsequence file for each transition data structure that was not used to populate the initial execution xsequence file.

When the decision in decision block 1725 is "YES," in block 1730, the model building server 8 combines at least a portion of the transition data structures that were not used to populate the initial execution xsequence file. For example, in block 1730, the model building server 8 may combine similar transitions into a single transition to be stored in a single sequence xsequence file. By way of another example, a threshold file size may be used to identify sequence xsequence files having a size less than the threshold file size. The sequence xsequence files identified may be combined into one or more larger sequence xsequence files. The following pseudo code provides a non-limiting example of a method of combining transitions into a single transition for storage in a single sequence xsequence file.

```
public void CompileSequences ( )
{
    foreach (State s in Model.states)
    {
        MergeSimilarSequences (s);
    }
}
```

Next, in block 1735, the pages identified in block 1720 are stored in sequence xsequence files. As mentioned above, a sequence xsequence file may be created for each transition data structure that was not used to populate the initial execution xsequence file and used to store the pages of the transition data structure for which the sequence xsequence file was created. Optionally, the number of transition data structures that were not used to populate the initial execution xsequence file may be reduced by combining two or more of them before creating the sequence xsequence files.

The sequence xsequence files store the pages that were accessed by the application as it executed. Thus, the sequence xsequence files store all of the pages appearing in all of the transcripts.

In block 1740, the model building server 8 identifies pages for inclusion in the rest xsequence files. In block 1740, the model building server 8 identifies pages that did not appear in every transcript for inclusion in the rest xsequence files. For example, referring to FIG. 6, one or more rest xsequence files would store the pages P1 and P2. Further, in block 1740, the model building server 8 identifies pages that did not appear in any of the transcripts for inclusion in the rest xsequence files.

While a rest xsequence file may store one or more pages also stored in one of the sequence xsequence files, this is not a requirement. Optionally, in decision block 1742, the model building server 8 may decide whether to search the sequence xsequence files for each page and only write pages not found in the sequence xsequence files to the rest xsequence file(s). The decision in decision block 1742 is "YES" when the model building server 8 decides to search the sequence xsequence files for each page. Otherwise, the decision in decision block 1742 is "NO" when the model building server 8 decides not to search the sequence xsequence files for each page.

When the decision in decision block 1742 is "NO," in block 1744, the model building server 8 writes the pages identified in block 1740 to the rest xsequence file(s). It may be beneficial to include all of the pages that did not appear in every transcript in the rest xsequence file(s) because as the directed graph structure "SD" is traversed, particular transitions may not be visited.

When the decision in decision block 1742 is "YES," for each page, in block 1745, the model building server 8 searches the sequence xsequence files to determine whether the page has been written to one or more of the sequence xsequence files.

Then, in decision block 1750, the model building server 8 determines whether the page has been written to one or more of the sequence xsequence files. The decision in decision block 1750 is "YES" when the page has been written to one or more of the sequence xsequence files. Otherwise, the decision in decision block 1750 is "NO" when the page has not been written to one or more of the sequence xsequence files.

When the decision in decision block 1750 is "NO," in block 1755, the model building server 8 writes the page to a rest xsequence file. Then, the model building server 8 advances to decision block 1760.

When the decision in decision block 1750 is "YES," the page may be omitted from the rest xsequence file and the model building server 8 advances to decision block 1760.

In decision block 1760, the model building server 8 determines whether there are any pages for which the sequence xsequence files have not been searched. The decision in decision block 1760 is "YES" when the model building server 8 has not searched the sequence xsequence files for all of the pages. Otherwise, the decision in decision block 1760 is "NO" when the model building server 8 has searched the sequence xsequence files for all of the pages.

The pages may be ordered within the rest xsequence files based on the frequencies at which the pages appeared in the transcripts. Rest xsequence files may be downloaded when the download pipeline (that is downloading the xsequence files from the server computing device 7 to the client computing device 9) is idle.

The following pseudo code provides a non-limiting example of a method of adding pages to the rest xsequence file.

```
public void CompileRest(Transcripts)
{
    Transcript.Pages.SortByFrequency ( );
    foreach(Page p in Transcript.Pages)
    {
```

-continued

```
        RestSequence.Add (p);
    }
}
```

Then, in block 1770, the model building server 8 creates the streaming model file 1180 (see FIG. 19). The streaming model file 1180 stores information in the directed graph structure "SD." By way of a non-limiting example, the model file may store a number of states in the directed graph structure "SD," a list of states in the directed graph structure "SD," a list of transitions for each state, a weight associated with each transition, and a list of pages associated with each transition. The Sandbox Manager 134 may use this information to predict to which pages the virtual application 110 will request access as the virtual application 110 executes. Based on these predictions, the Sandbox Manager 134 may preemptively download pages before the pages are requested by the virtual application 110.

Referring to FIG. 19, the following pseudo code provides a non-limiting example of a method of creating the streaming model file 1180, and the xsequence files 1182, which in the following pseudo code include a single initial execution xsequence file, one or more sequence xsequence files, and one or more rest xsequence files. The following pseudo code uses data that was stored in data structures by pseudo code portions provided above.

```
public void Save ( )
{
    // save the model
    Model.SaveAs("Model.xm");
    // save initial execution file
    ListOfPrefectchStates.Squence.SaveAs("p.xs");
    // save sequences
    foreach(Sequence s in States.Sequences)
    {
        // {0} represents the sequence id
        s.SaveAs("s{0}.xs");
    }
    // save rest files
    foreach(Sequence s in
        RestSequence.SplitSequenceBy(RestPagesPerStream))
    {
        // {0} represents the rest sequence id
        s.SaveAs("r{0}.xs");
    }
}
```

Then, the method 1700 terminates.

Figure 7:
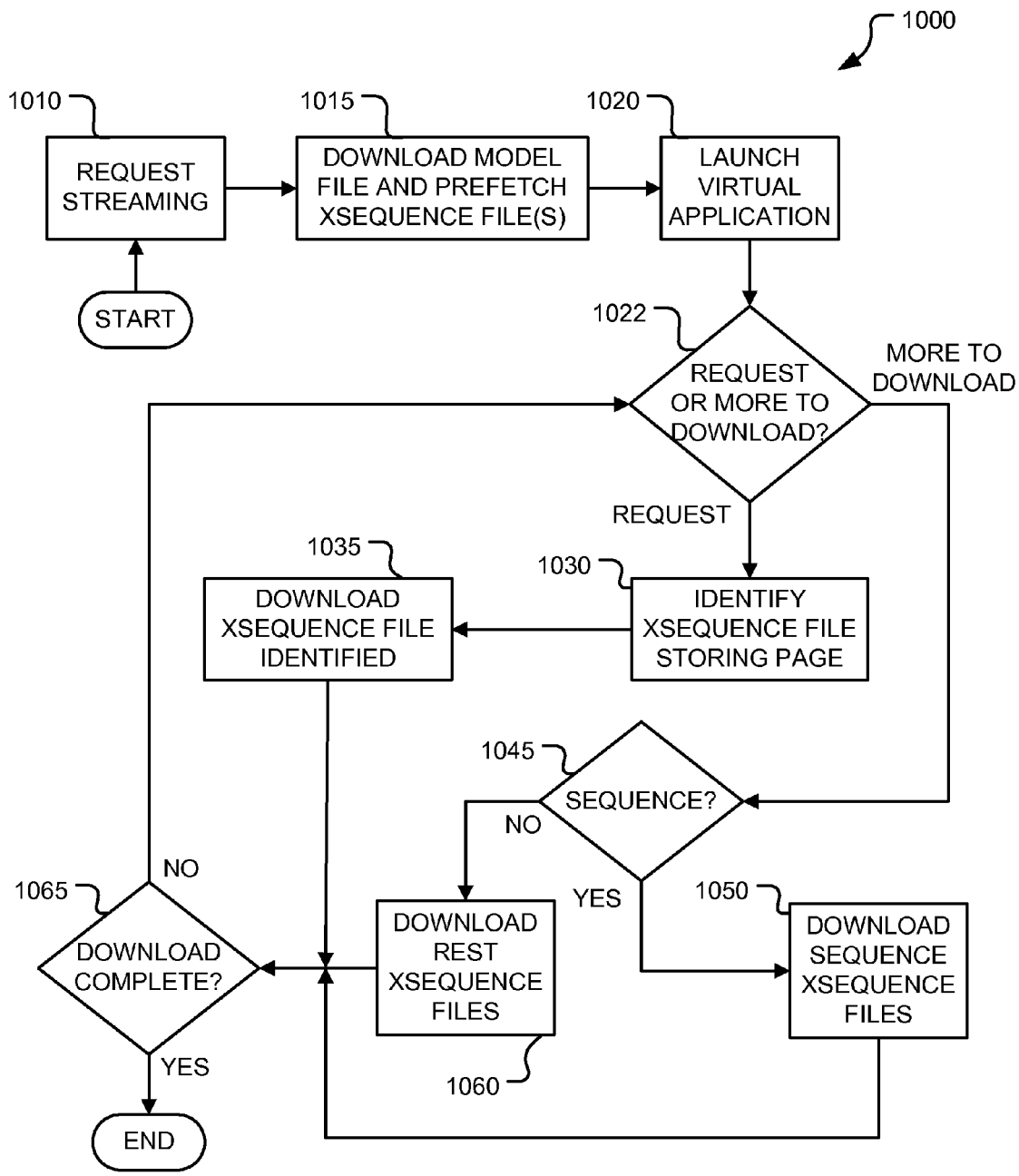
FIG. 7 is a flow diagram of a method that may be performed by the Sandbox Manager and/or a Client Application.

FIG. 7 is a block diagram of a method 1000 that may be performed by the Sandbox Manager 134 and/or the Client Application 132. In first block 1010, the Sandbox Manager 134 and/or the Client Application 132 requests that the server computing device 7 stream the virtual application 110 to the client computing device 9. Arrow "A9" in FIG. 13 illustrates a communication from the client computing device 9 to the server computing device 7 requesting that that the server computing device 7 stream a virtual application (e.g., the virtual application 110) to the client computing device 9. By way of a non-limiting example, in block 1010, the Sandbox Manager 134 and/or the Client Application 132 may request streaming by passing a URL to the server computing device 7.

In response to this request, the server computing device 7 streams the streaming model file 1180 and the initial execution xsequence file(s) (e.g., the initial execution xsequence file 1632) to the Sandbox Manager 134 and/or the Client Application 132. Arrow "A10" in FIG. 13 illustrates a communication from the server computing device 7 to the client computing device 9 that streams streaming model file 1180 and the xsequence files 1182 (which include the initial execution xsequence file 1632) from the server computing device 7 to the client computing device 9.

In block 1015, the Sandbox Manager 134 and/or the Client Application 132 receive the model file and the initial execution xsequence file(s).

By way of a non-limiting example, the following code may be used in blocks 1010 and 1015 to pass a URL to the server computing device 7 and download the model file and the initial execution xsequence files.

```
LaunchApplication("http://Host/StreamingApp/");
LaunchApplication(WebUrl)
{
    Model m = DownloadModel(WebUrl + "/Model.xm");
    Initial execution p = DownloadInitial
execution(WebUrl + "/p.xs");
    Execute(m, p);
}
```

Then, in block 1020, the Sandbox Manager 134 launches the virtual application 110. Thus, the virtual application 110 begins executing even though less then all of the data stored in the xlayer file 300 has been downloaded.

In decision block 1022, the Sandbox Manager 134 determines whether it has received a notification from the virtual runtime engine 131 that a page has been requested by the virtual application 110 that has not yet been downloaded, or whether there are additional xsequence files to be downloaded for the virtual application 110.

The decision in decision block 1022 is "REQUEST" when the Sandbox Manager 134 determines it has received a notification from the virtual runtime engine 131 that a page has been requested by the virtual application 110 that has not yet been downloaded.

The decision in decision block 1022 is "MORE TO DOWNLOAD" when the Sandbox Manager 134 determines there are additional xsequence files to be downloaded for the virtual application 110 and the Sandbox Manager 134 determines it has not received a notification from the virtual runtime engine 131 that a page has been requested by the virtual application 110 that has not yet been downloaded.

When the decision in decision block 1022 is "REQUEST," in block 1030, the directing process 129 identifies the xsequence file storing the page for which access has been requested. The directing process 129 may use the model file to look up which xsequence file is storing the page for which access has been requested. Optionally, the directing process 129 may pause execution of the virtual application 110.

In block 1035, the Sandbox Manager 134 and/or the Client Application 132 download the xsequence file identified in block 1030 while the virtual application 110 is in use. Then, the Sandbox Manager 134 and/or the Client Application 132 advance to decision block 1065.

The Sandbox Manager 134 and/or the Client Application 132 may download additional xsequence files even without receiving a notification from the virtual runtime engine 131 indicating a page stored by the xsequence file has been requested. For example, after the Sandbox Manager 134 and/or the Client Application 132 have downloaded the model file and the initial execution xsequence file(s), the Sandbox Manager 134 and/or the Client Application 132 may download the sequence xsequence files.

When the decision in decision block 1022 is "MORE TO DOWNLOAD," in decision block 1045, the Sandbox Manager 134 determines whether one or more of the sequence xsequence files have yet to be downloaded. The decision in decision block 1045 is "YES" when one or more of the sequence xsequence files have yet to be downloaded. Otherwise, the decision in decision block 1045 is "NO" when all of the sequence xsequence files have been downloaded.

When the decision in decision block 1045 is "YES," in block 1050, the Sandbox Manager 134 and/or the Client Application 132 download one of the sequence xsequence files. The directing process 129 may use the model file to determine which sequence xsequence file to download. Because the directing process 129 knows which of the sequence xsequence file was the last one downloaded, the directing process 129 may use the model file to traverse the directed graph structure "SD" and locate the next sequence xsequence file to download. By way of a non-limiting example, the following pseudo code provides an exemplary download loop that may be used to download the sequence xsequence file (referred to in the following pseudo code as "blocks"). The function named "GetNextXferBlock( )" reads the model file to identify the next sequence xsequence file to download.

```
private void DoStreamDownload( )
{
    while (!DownloadComplete)
    {
        // prediction logic
        Url urlBlock = GetNextXferBlock( );
        // download the block using http
        Block block = DownloadBlock(urlBlock);
        // write the pages to memory shared
        // with virtual machine
        MemoryMap.Write(block);
    }
}
```

The above download loop continues looping until all of the sequence xsequence files listed in the model file are written to the shared memory block 133. As mentioned above, in the above pseudo code, the order in which the sequence xsequence files are downloaded is determined by the function named "GetNextXferBlock( )" The following pseudo code provides an exemplary implementation of the function named "GetNextXferBlock( )"

```
public Block GetNextXferBlock( )
{
    // sort all threads and processes by last
    // scheduled time to ensure fairness
    VirtualApp.Threads.SortByLastScheduledTime( );
    Block xferBlock = null;
    // get the predicted sequence
    foreach (VirtualThread vt in VirtualApp.Threads)
    {
        xferBlock =
          GetPredictedBlock(VirtualApp.Threads.First);
        if (xferBlock != null)
        {
            vt.LastScheduledTime = DateTime.UtcNow;
            return xferBlock;
        }
    }
    // finally get a rest block if no other blocks
    // are required
    xferBlock = GetNextRestBlock( );
    return xferBlock;
}
```

Figure 8:
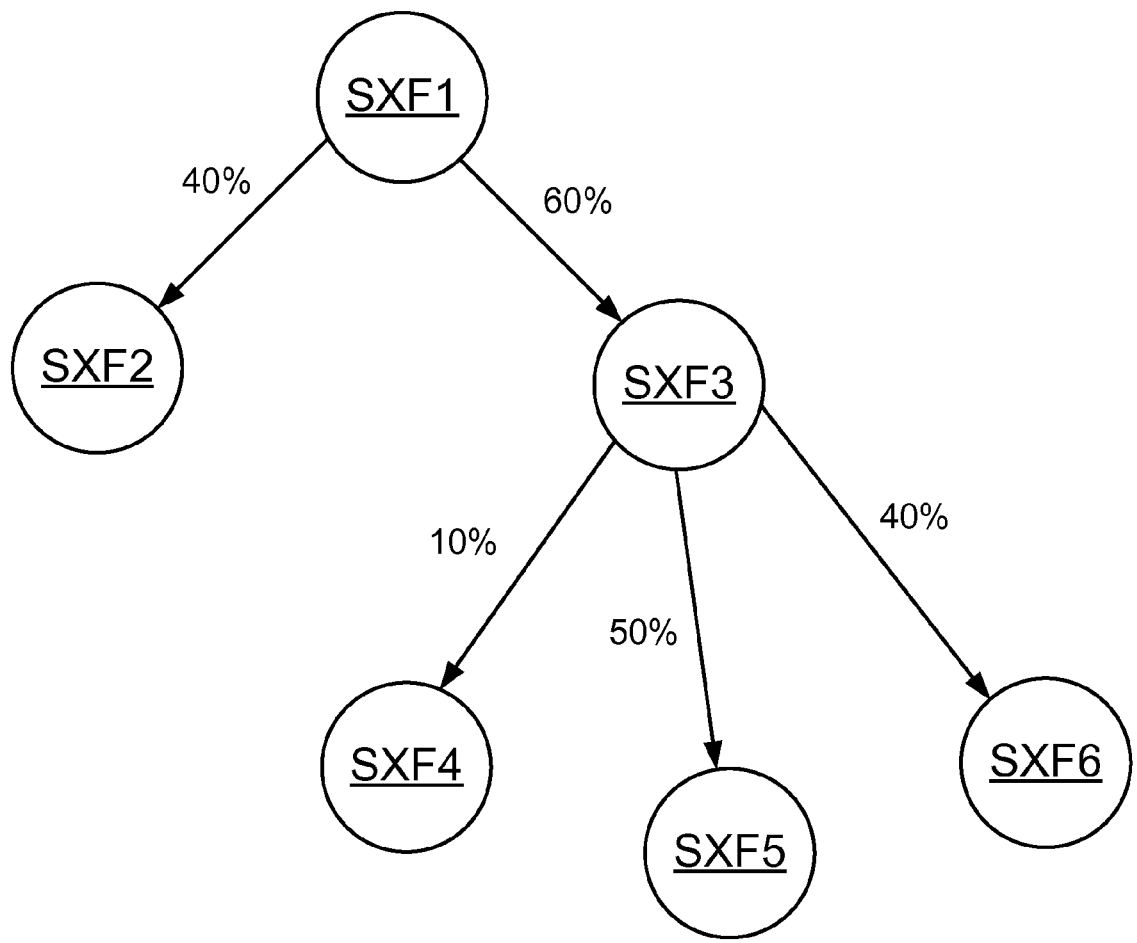
FIG. 8 is a diagram of a streaming model.

As discussed above, the directed graph structure "SD" may include one or more branches. Therefore, when the Sandbox Manager 134 is traversing the directed graph structure "SD" (using the model file) and encounters a branch, the Sandbox Manager 134 must select one of the transitions of the branch. The Sandbox Manager 134 may perform a weighted depth first traversal of the directed graph structure "SD," which reflects the order(s) in which the pages are most commonly accessed as determined by the profiling process 700 and the modeling process. Alternatively, other types of traversal, such as a breadth first traversal may be used. The weight assigned to a transition to a particular sequence xsequence file (which stores the pages of one or more transition data structures) may be a percentage that the particular transition occurred out of all of the transitions recorded in the transcripts. FIG. 8 illustrates an exemplary traversal of a streaming model containing the sequence xsequence files SXF1 to SXF6. Each transition between two consecutively accessed sequence xsequence file is assigned a weight. For example, the weight assigned to the transition between the sequence xsequence file SXF1 and SXF2 is 40%. In this example, the sequence xsequence files are downloaded in the following order: SXF1, SXF3, SXF5, SXF6, SXF4, and SXF2.

Returning to FIG. 7, the rest xsequence files are downloaded after the sequence xsequence files have been downloaded. Thus, when the decision in decision block 1045 is "NO," in block 1060, the Sandbox Manager 134 and/or the Client Application 132 download one or more rest xsequence files. The rest xsequence files are ordered by the frequency in which their pages were accessed during the profiling process 700. For example, a rest file "0" (r0.xs) may contains pages that are most likely to be accessed, and should be downloaded first. Then, the Sandbox Manager 134 and/or the Client Application 132 advances to decision block 1065.

In decision block 1065, the Sandbox Manager 134 determines whether all of the xsequence files have been downloaded. The decision in decision block 1065 is "YES" when all of the xsequence files have been downloaded. Otherwise, the decision in decision block 1065 is "NO" when all of the xsequence files have not been downloaded.

When the decision in decision block 1065 is "NO," the Sandbox Manager 134 returns to decision block 1022.

When the decision in decision block 1065 is "YES," all of the rest xsequence files have been downloaded. Therefore, the application download is complete, and the method 1000 terminates.

The following pseudo code is a non-limiting example of a method of downloading the rest xsequence files and determining when the download is complete.

```
private Block GetNextRestBlock( )
{
    if (DownloadedRestBlocks < Model.RestBlocks)
    {
        return Model.RestBlocks[DownloadedRestBlocks++];
    }
    else
    {
        DownloadedComplete = true;
        return null;
    }
}
```

Directing Download

U.S. patent application Ser. No. 12/695,107 (which is incorporated herein by reference) describes the Sandbox Manager 134, which is a virtual process manager configured to download and execute a virtualized application file from a server computing device to a client computing device. Each of the streaming model file 1180 (see FIG. 19), the initial execution xsequence files, the sequence xsequence files, and the rest sequence files may be downloaded using well-known conventional download protocols, such as HTTP, FTP, SMB, and the like. As discussed above, the Sandbox Manager 134 may be used to implement the directing process 129 configured to direct the delivery and execution of the virtual application 110. The directing process 129 may perform operations on behalf of the virtual application 110 including, but not limited to, streaming application code and data, profiling execution (e.g., by performing the method 800 illustrated in FIG. 5), managing the sandbox 124, performing shell integration, and performing instance management. To support these operations in a cooperative fashion, the directing process 129 selectively starts, pauses, terminates, and monitors the virtual application 110. By way of a non-limiting example, the directing process 129 may start, pause, resume, terminate the virtual application 110 in response to a command or instruction from a user or another process (or application) separate from the Sandbox Manager 134 and the virtual runtime engine 131. The directing process 129 may also dynamically populate the underlying xlayer file 300 during execution of the virtual application 110.

Figure 14:
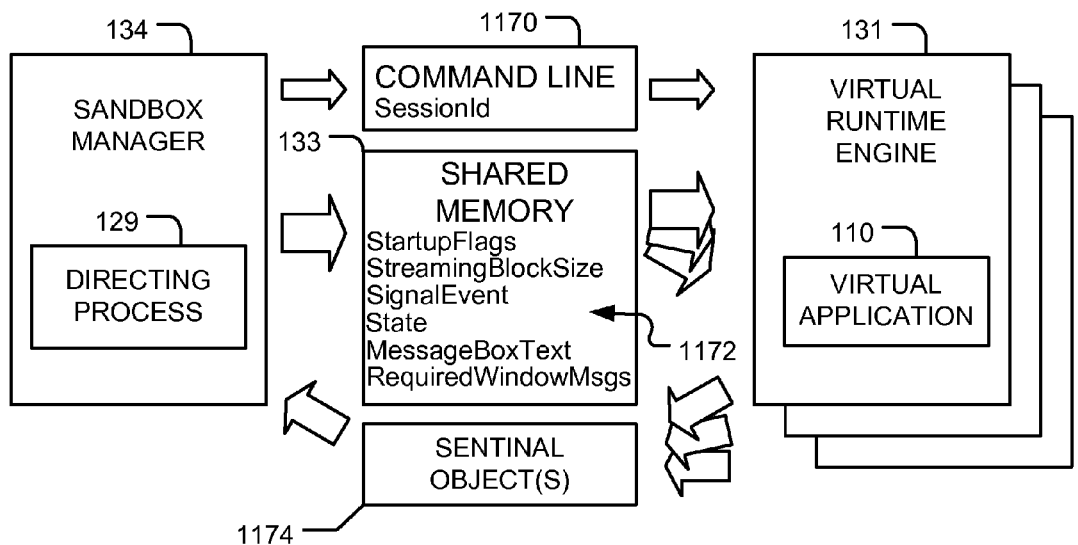
FIG. 14 is an illustration of a block of memory shared by the Sandbox Manager and the virtual runtime engine during directed execution of a virtual application.

FIG. 14 illustrates the block of shared memory 133 that may be used to send settings and state between the directing process 129 and the virtual runtime engine 131. As illustrated in FIG. 14, the directing process 129 may direct multiple virtual runtime engines, which may each communicate with the directing process 129 via a named pipe connection (described above). Depending upon the implementation details, the directing process 129 may use one or more special command-line arguments 1170, status events, one or more sentinel objects 1174, and shared memory structures 1172 (stored in the shared memory block 133) to control the dynamic delivery, starting, monitoring, pausing, and/or termination of the virtual application 110 executing with the virtual environment implemented by the virtual runtime engine 131.

As mentioned above, the directing process 129 may send one or more special command-line arguments 1170 to the virtual runtime engine 131. For example, settings may be provided to the virtual runtime engine 131 via the special command-line arguments 1170. An exemplary command-line argument may include "/XExecutionSession=<SessionId>." This SessionId value is used by the directing process 129 and the virtual runtime engine 131 to lookup the shared memory by name.

By way of a non-limiting example, the shared memory block 133 may have a name with the following format:
_xmgr_<managerVersion>_sessioninfo_<sessionId>
In the above format, "managerVersion" is one of the special command-line arguments 1170 (like the SessionId value). By way of a non-limiting example, the SessionId value may be implemented as a 64-bit integer.

Status events are created and used by the directing process 129 to signal changes in the state of the session to the virtual runtime engine 131. By way of a non-limiting example, the session may have the following states, which may be assigned the exemplary values indicated:

```
ESessionStates
{
    eSessionPaused      = 0x1,
    eSessionRunning     = 0x2,
    eSessionShutdown    = 0x3,
};
```

The sentinel object 1174, which is a named kernel object, is used to indicate the lifetime of the virtual application. For example, a named mutex may be used. Once the sentinel object 1174 disappears (which may be determined by polling in the directing process 129) all processes of the virtual application 110 have terminated. As is appreciated by those of ordinary skill in the art, some operating systems, such as Microsoft WINDOWS®, are configured to track or count references by other objects to named kernel objects. Thus, when a WINDOWS® process has a reference (or handle) to the sentinel object 1174, the host operating system 35A (see FIG. 2) will store an indication of this reference. For example, the host operating system 35A may store a reference count indicating how many objects have references to the sentinel object 1174. When the reference count is zero, no processes have references to the sentinel object 1174.

In addition to the above fixed-sized shared memory structures used to manage execution of the virtual application 110, optionally, another named shared memory block 1176 containing handles to a shared mapping of the xlayer file (e.g., the xlayer file 300) itself may be used, along with a shared memory based bit-array structure 1178 to support dynamic population of the xlayer file (e.g., the xlayer file 300) while the virtual application 110 is running. This is done to support streaming delivery of the virtual application 110 using the streaming model 122.

Starting a Virtual Application

Figure 27:
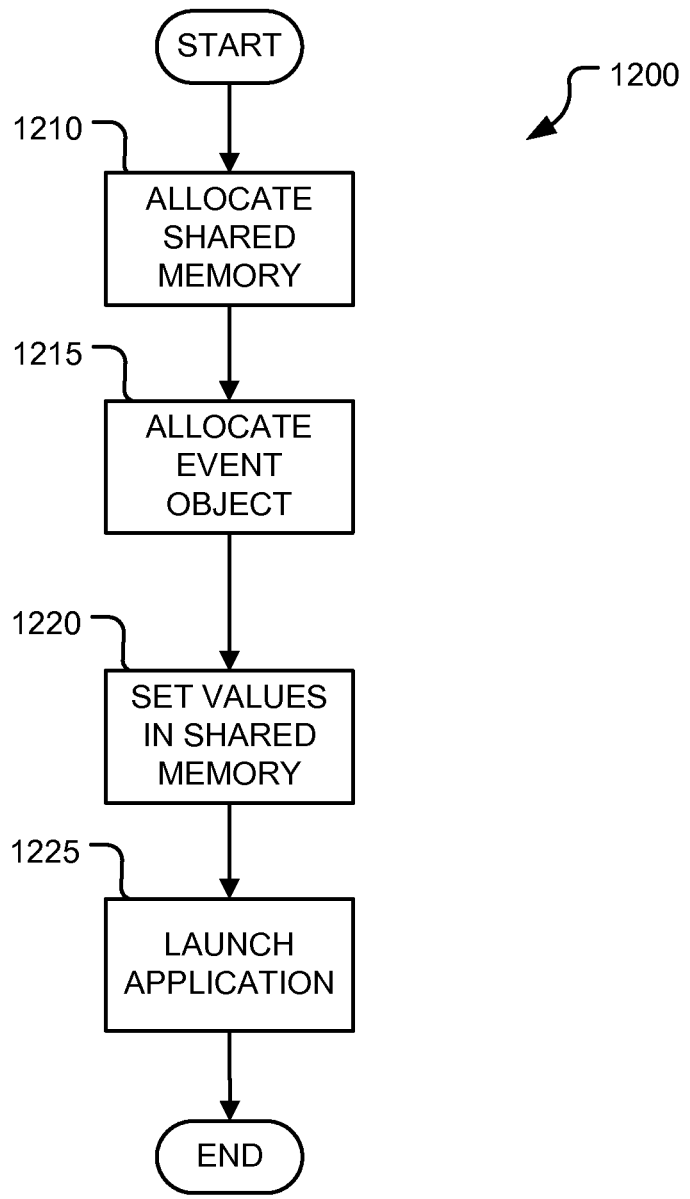
FIG. 27 is a flow diagram of a method of starting a virtual application in a directed fashion.

FIG. 27 is a flow diagram of a method 1200 of starting a virtual application in a directed fashion. The method 1200 may be performed in block 1020 of the method 1000 illustrated in FIG. 7.

In first block 1210, the directing process 129 allocates the block of shared memory 133 (see FIG. 2). In next block 1215, the directing process 129 allocates a status event object used for signaling changes in the state of the session. The status event objects may be implemented using the WINDOWS® event system that uses kernel handles.

Then, in block 1220, the directing process 129 sets the values of any specific settings or values stored in the shared memory block. For example, the shared memory block may store a SignalEvent value and a State value. The SignalEvent value is set to the handle value of the status event object allocated in block 1215.

Whenever the State value is changed or the xlayer mapping 1176 is updated by the directing process 129 (e.g., when additional xsequence files have been downloaded), the directing process 129 triggers a SignalEvent. In response to detecting the SignalEvent, each thread launched by the execution of the virtual application 110 checks the State value to determine if the state of the virtual application 110 is to be changed (e.g., paused, resumed, or terminated). Any threads waiting for the xlayer mapping 1176 to indicate a particular portion of the downloading virtualized application file is available (or stored in a local copy of the virtualized application file), also check the xlayer mapping 1176 to determine whether the data has been delivered.

The initial value of the State value depends upon in which state the virtual application 110 is to be launched. If the virtual application is to be launched in a "paused" state, the State value is set to a value indicating the application is paused (e.g., the eSessionPaused value). Otherwise, the State value is set to a value indicating the application is executing (e.g., the eSessionRunning value). If at some point, the application is terminated, the State value is set to a value indicating the application has shutdown (e.g., the eSessionShutdown value).

Once the shared memory block 133, status event object(s), and command-line arguments are prepared, in block 1225, the directing process 129 launches the virtual application 110. By way of a non-limiting example, the virtual application 110 may be launched via standard a Win32 CreateProcess function or ShellExecute APIs. The following pseudo code provides a non-limiting example of a method of starting a virtual application.

---

SessionId = Allocate random 64-bit integer
SharedMemoryName =
 "__xmgr__<mgrVersion>__sessionInfo__<SessionId>"
SharedMemory = CreateSharedMemory(ReadWritePerms,
  SharedMemoryName)
Prepare shared memory settings and initial state, either
  eSessionPaused or eSessionRunning
CreateProcessArgs = "/XExecutionSession=<SessionId>"
CreateProcess(VirtualAppPath, CreateProcessArgs)

---

The first code portion to execute within the virtual application 110 is called "bootstrap" code. The "bootstrap" code includes the virtual runtime engine code that, when executing, sets up the virtual runtime environment, reads the configuration information (e.g., virtual filesystem information, virtual registry settings, and the like), and other initialization tasks. As explained above, the configuration information may be stored in an xlayer file (e.g., the xlayer file 300). When the SessionId value is passed to the "bootstrap" code, the "bootstrap" code uses the SessionId value to determine a name of the shared memory block 133 having the predetermined format specified above, and searches for the shared memory block 133 using that name. The "bootstrap" code may also create the sentinel object 1174. Once found, addition settings can be read as well as the State value. As discussed above, in particular implementations, the State value may be set to the eSessionPaused value, the eSessionRunning value, or the eSessionShutdown value.

Then, the method 1200 terminates.

Pausing and Resuming a Virtual Application

As mentioned previously, once a virtual application has been started in the directed fashion, it is able to detect Signal Events that provide notification of changes in the state of the session. Depending upon the implementation details, this may be done via the Win32::WaitForMultipleObjects APIs, and by associating the SignalEvent value with the handle of the directing process 129. After detecting a SignalEvent, the virtual application 110 can check the State value of the shared memory block 133. If the State value indicates the session has been paused (e.g., the State value is set to the eSessionPaused value), the virtual runtime engine 131 blocks access by the virtual application 110 to the underlying xlayer file (which contains the virtual filesystem and registry among other things). The virtual runtime engine 131 could also explicitly suspend application threads. However, this may not be necessary.

The following pseudo code provides a non-limiting example of a method of pausing a virtual application by setting the value of the State value to the eSessionPaused value and triggering a SignalEvent to indicate a change in the state of the session.

---

SetStateInSharedMemory(SharedMemory, eSessionPaused)
PulseEvent(SignalEvent)

---

When the State value indicates the session is running (e.g., the State value is set to the eSessionRunning value), access to the xlayer file is restored. In other words, the virtual application 110 resumes. The following pseudo code provides a non-limiting example of a method of resuming a virtual application by setting the value of the State value to the eSessionRunning value and triggering a SignalEvent to indicate a change in the state of the session.

```
SetStateInSharedMemory(SharedMemory, eSessionRunning)
PulseEvent(SignalEvent)
```

Monitoring a Virtual Application

The directing process 129 has the ability to tell the virtual application to shutdown. However, this shutdown occurs asynchronously. Additionally, the virtual application can shut itself down at any time, or may be shut down due to user control, for example when the user closes the virtual application. As mentioned above, the named sentinel object 1174 is used to determine when the virtual application is completely shutdown. Each process within the virtual application duplicates the handle of the named sentinel object 1174 to the child process during any create-process call. For example, the name of the named sentinel object 1174 may be determined as follows:

_xmgr_<managerVersion>_mtx_sentinel_<sessionId>

Duplicating the handle of the named sentinel object 1174 into each child process ensures that the named sentinel object 1174 remains alive (e.g., has a reference count greater than zero) for the lifetime of the virtual application. The directing process 129 may determine the virtual application is executing by polling for the existence of the named sentinel object 1174 occasionally (e.g., at regular intervals). For example, the directing process 129 may poll for the named sentinel object 1174 once every second via a Win32 timer thread function. In embodiments in which a reference count is available, the polling may simply poll to determine if the reference count is equal to zero meaning no objects have references (or handles) to the named sentinel object 1174.

The following pseudo code provides a non-limiting example of a method of monitoring for virtual application shutdown.

```
Begin Shutdown Polling
    Delay For Polling Interval
    SentinelName =
        "_xmgr_<mgrVersion>_mtx_sentinel_<SessionId>"
    OpenMutex(SyncPermission, SentinelName)
    If Found
        Goto Begin Shutdown Polling
    End
End
```

Once shutdown is detected, the directing process 129 may perform custom actions, such as cleaning up resources, marking the end time in usage statistics, recording the termination in a transcript file, etc.

Dynamic Population of XLayer File During Application Execution

To begin execution of a virtual application as soon as possible, one may try to determine which portions of the xlayer file are necessary for initial execution and deliver those portions to the virtual application first. To actually support dynamic population of the underlying xlayer file while it is being executed requires a system and method for doing so.

The directing process 129 is responsible for preparing the data-structures described above and illustrated in FIG. 15. The named shared-memory block 133 contains handle values of the xlayer mapping 1176 and the bit-array page mask 1178. The shared-memory block 133 includes a file 1176 mapping of the underlying xlayer file (e.g., the xlayer file 300) with read-write access enabled. The shared-memory block 133 includes a block of shared memory used to store the bit-array 1178 for indicating which pages have been populated within the xlayer being used by the virtual runtime engine 131 to execute the virtual application 110.

By way of a non-limiting example, the name of the shared memory block 133 may have the following format:
_xmgr_<managerVersion>_mem_xlayerinfo_
<xlayerpathhash>. Where "managerVersion" is an argument passed on the command line from the directing process 129. The "xlayerpathhash" may be a hash (e.g., a "good" hash) of the normalized path to the xlayer file being populated.

If the shared memory block 133 has been allocated, the virtual runtime engine 131 concludes the xlayer file is to be dynamically delivered. If the shared memory block 133 has not been allocated, the virtual runtime engine 131 concludes the xlayer file is fully populated.

By way of a non-limiting example, the shared-memory block 133 may be implemented using the following structure:

```
struct SXLayerInfo
{
    HANDLE XLayerMapping;
    HANDLE PageMap;
};
```

The following pseudo code provides a non-limiting example of a method of preparing dynamic xlayer population data-structures.

```
xlayerPathHash = GoodHash(xlayerPath)
String nameSharedMemory =
    _xmgr_<managerVersion>_mem_xlayerinfo_<xlayerPathHash>
SXLayerInfo info = CreateSharedMemory(ReadWritePerms,
    nameSharedMemory)
info.XLayerMapping = CreateFileMapping(xlayerPath)
PageMapPages = (FileSize(xlayerPath) + PAGESIZE – 1) /
    PAGESIZE
PageMapSize = (PageMapPages + 7) / 8
into.PageMap = CreateSharedMemory(ReadWritePerms,
    NULL_NAME, PageMapSize)
```

After this data structure is prepared, execution of the application may be started as described above. Note the local copy of the xlayer file need not be fully populated to launch the virtual application. However, once started, the virtual application will begin to demand access to various parts of the local copy of the xlayer file and will wait until these requests are satisfied. By way of a non-limiting example, this access may be requested via an IStream interface abstraction of the xlayer file. The blocking is done by way of a check of the pageMap bit-array 1178. If a requested page is not yet populated, as indicated by this bit-array, the virtual application waits on the SignalEvent, until the PageMap indicates the page has been populated within the local copy of the xlayer file. The following pseudo code provides a non-limiting example of a method by which the virtual application may access the xlayer file and check the PageMap.

```
XLayerAccess (AccessOffset, AccessBytes)
    PageStart = AccessOffset / PAGESIZE
    PageEnd = (AccessOffset + AccessBytes – 1) / PAGESIZE
    For Each (Page from PageStart to PageEnd)
```

```
        While (IsBitSetInBitArray(PageMap, Page) is FALSE)
            WaitForSingleObject(SignalEvent,
                ONE_SECOND_POLL_TIMEOUT)
        End
    End
```

Simultaneously, the directing process 129 may populate any portion of the xlayer file. The following pseudo code provides a non-limiting example of a method by which the directing process may populate any portion of the xlayer file.

```
    PopulateXLayer(Data, Index)
        OffsetTarget = Index * PAGESIZE
        MappedView = MapViewOfFile(info.XLayerMapping,
                OffsetTarget, PAGESIZE)
        Memcpy(MappedView, Data, PAGESIZE)
        UnMapViewOfFile(MappedView)
        SetBitInBitArray(info.PageMap, Index)
        PulseEvent(SignalEvent)
```

As the virtual application 110 executes, it sends messages (e.g., messages using the data structure named "SFeedbackStatsMessage") to the directing process 129 indicating which page of the local copy of the xlayer file is currently being accessed by the executing virtual application 110. The directing process 129 uses these messages to determine where in the streaming model file 1180 the page currently being accessed by the executing virtual application 110 is located. The directing process 129 then begins reading the streaming model file 1180 from that location. This allows the traversal of the directed graph structure stored by the streaming model file 1180 to be modified by the user choices occurring during the execution of the virtual application 110. Thus, the directing process 129 traverse the streaming model file 1180 in a custom manner dictated by the actions of a user. As discussed above, the SFeedbackStatsMessage type message includes the blocked value. The virtual runtime engine 131 may communicate to the directing process 129 that the virtual runtime engine has tried to access a page that has not yet been downloaded (e.g., is not indicated as being included in the local copy of the downloaded xlayer file by the xlayer mapping 1176) by setting the blocked value to "TRUE."

Xsequence File Format

Figure 16:
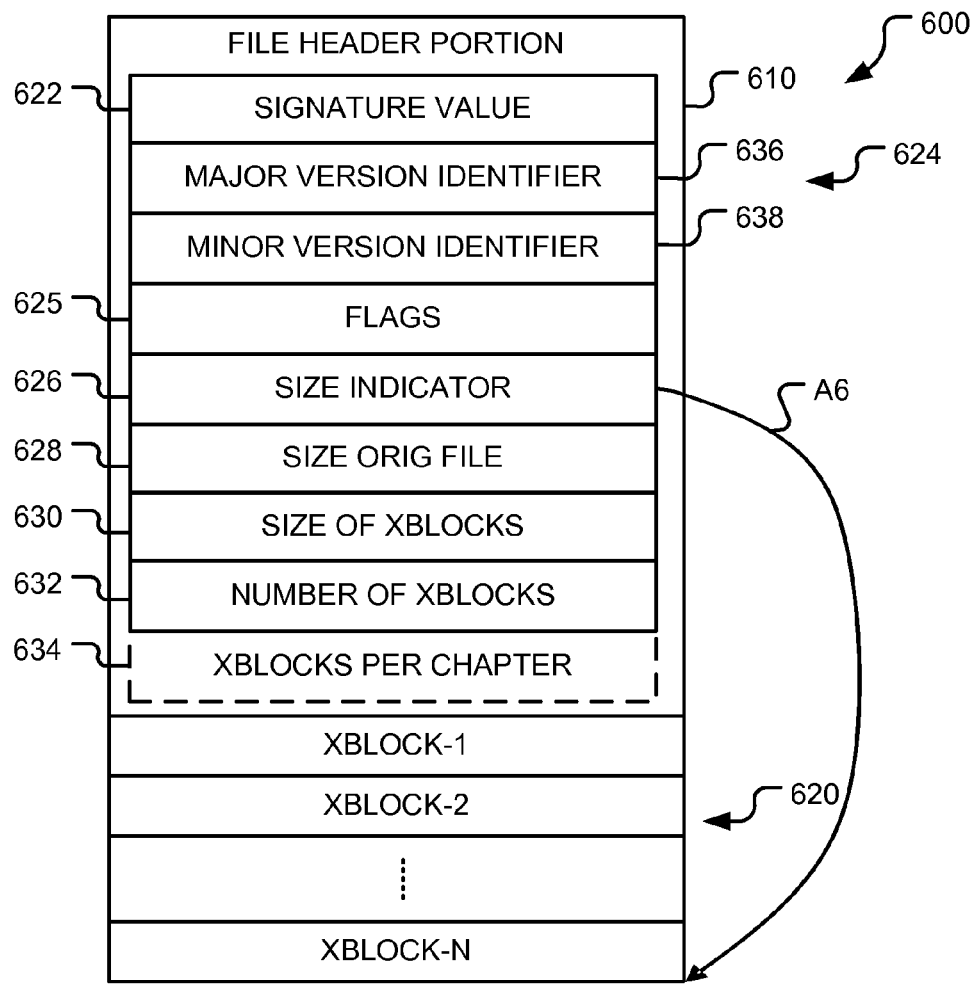
FIG. 16 is an exemplary xsequence file format.

FIG. 16 illustrates an exemplary xsequence file format 600. The initial execution xsequence file, sequence xsequence files, and rest xsequence files may each be constructed using the xsequence file format 600. The xsequence file format 600 illustrated in FIG. 16 includes a file header portion 610, which may be the first item of the xsequence file format, and one or more data blocks 620 (referred to as "xblocks"). Each of the xblocks 820 may store a single page. The file header portion 610 includes a signature value 622, a version stamp 624, one or more flags 625, a size indicator 626, an indicator of size of the original file 628, an indicator of size of the xblocks 630, a number of xblocks indicator 632, and an optional number of xblocks per chapter indicator 634. The data in file header portion 610 is ordered with the signature value 622 being first followed by the version stamp 624, which is followed by the size indicator 626, which is followed by the indicator of size of the original file 628, which is followed by the indicator of size of the xblocks 630, which is followed by the number of xblocks indicator 632, which is followed by the optional number of xblocks per chapter indicator 634.

The signature value 622 is a value used to authenticate the information stored in a file. For example, the signature value 622 may be used to validate a particular xsequence file. By way of a non-limiting example, the signature value 622 of a valid xsequence file may store a predetermined value (e.g., the string "xsequencedfile"). Thus, to validate the xsequence file, the Sandbox Manager 134 may simply confirm the signature value 622 stores the predetermined value. The signature value 622 may be implemented as a 16-byte array. The value stored in the signature value 622 may be generated using any method and the present teachings are not limited to use with a signature value generated using any particular method.

The version stamp 624 may include a major version identifier 636 and a minor version identifier 638. The major version identifier 636 is typically modified when a change is made to the xsequence file format 600 that would make the file incompatible with a previous version of the virtual runtime engine 131. The minor version identifier 638 may be incremented for informational purposes when the xsequence file format 600 is modified such that it requires special handling to enable backwards compatibility. By way of a non-limiting example, each of the major and minor version identifiers 636 and 638 may be implemented as 32-bit integers.

The flags 625 may include a flag that indicates whether the data stored in the xblocks 620 has been compressed. The flags 625 may include a flag that indicates which type of compression was used to compress the data stored in the xblocks 620. By way of a non-limiting example, the flags 625 may be implemented as a 32-bit integer.

The size indicator 626 identifies a location in memory that corresponds to the end of an xsequence file having the xsequence file format 600. The location in memory to which the size indicator 626 refers is identified in FIG. 16 by a curved arrow "A6." By way of a non-limiting example, the size indicator 626 may be implemented as a 64-bit integer.

The indicator of size of the original file 628 indicates the size of the original file (e.g., the xlayer file 300). By way of a non-limiting example, the indicator of size of the original file 628 may be implemented as a 64-bit integer.

The indicator of size of the xblocks 630 indicates the size of all of the xblocks 620 in the xsequence file combined. By way of a non-limiting example, the indicator of size of the xblocks 630 may be implemented as a 32-bit integer.

The number of xblocks indicator 632 indicates the number of the xblocks 620 in the xsequence file. By way of a non-limiting example, the number of xblocks indicator 632 may be implemented as a 32-bit integer.

The number of xblocks per chapter indicator 634 indicates a number of xblocks stored in a particular chapter. Chapters may be used by the directing process 129 of the Sandbox Manager 134 to skip to a particular portion of the xsequence file. By way of a non-limiting example, the number of xblocks per chapter indicator 634 may be implemented as a 32-bit integer.

Figure 17:
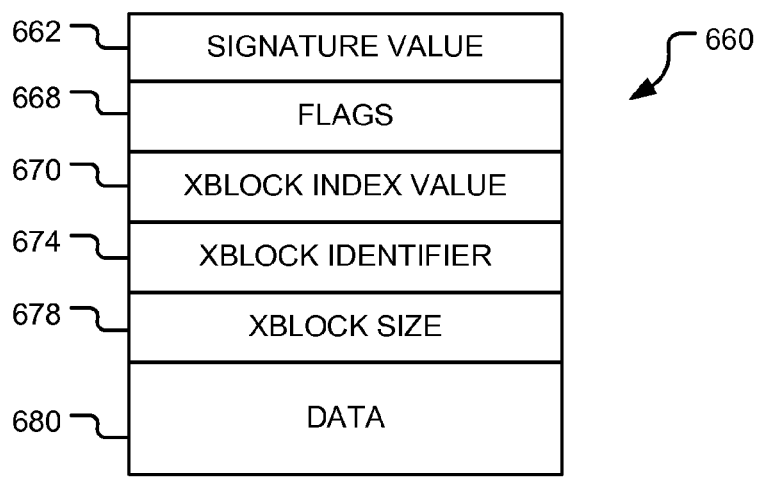
FIG. 17 is an exemplary xblock format.

As mentioned above, the xsequence file format 600 includes one or more xblocks 620 that each contains a portion of the data stored in the original file (e.g., the xlayer file 300). Referring to FIG. 17, each of the xblocks 620 has a block structure 660 that may include a signature value 662, one or more flags 668, an xblock index value 670, an xblock identifier 674, an xblock size indicator 678, and a data portion 680. The data in the block structure 660 is ordered with the signature value 662 being first followed by the flags 668, which is followed by the xblock index value 670, which is followed by the xblock identifier 674, which is followed by the xblock size indicator 678, which is followed by the number of the data portion 680.

The signature value 662 is a value used to authenticate the information stored in an xblock and contains a unique value assigned to the xblock. The signature value 662 may be implemented as a 6-byte array. The value stored in the signature value 662 may be generated using any method and the present teachings are not limited to use with a signature value generated by any particular method.

The flags 668 may include values for various block options. By way of a non-limiting example, the flags 668 may include an indicator that a block stores metadata instead of virtual application data. By way of a non-limiting example, the flags 668 may be implemented as a 16-bit integer.

The xblock index value 670 is a numeric index value assigned to the xblock within the xsequence file. This xblock index value 670 is an index value associated with the block within an xsequence file. For example, if an xsequence file has four xblocks, the xblocks may be assigned index values of 0, 1, 2, and 3 in the order in which the xblocks were written to xsequence file. By way of a non-limiting example, the index value 670 may be implemented as a 32-bit integer.

The xblock identifier 674 identifies the data stored in the xblock within the original file (e.g., the xlayer file 300). The model builder server 8 divides the original xlayer file into pages. For example, an xlayer file may be divided into pages P0, P1, P2, P3, P4, . . . PN. The xblock identifier 674 stores the location of the page in the original xlayer file. Thus, when the xblock is read by the Sandbox Manager 134, the Sandbox Manager 134 knows where to write the xblock in the locally reconstructed copy of the xlayer file. By way of a non-limiting example, the xblock identifier 674 may be implemented as a 32-bit integer.

The xblock size indicator 678 indicates the size of the xblock. By way of a non-limiting example, the xblock size indicator 678 may be implemented as a 32-bit integer.

The data portion 680 stores the data of the xblock.

As described above, the streaming model is used to create the initial execution xsequence file, sequence xsequence files, and rest xsequence files in accordance with an order specified in the streaming model. After one or more of these files are downloaded, the Sandbox Manager 134 may begin the process of reassembling or reconstructing the original file (e.g., the xlayer file 300).

Reconstructing the Original File from One or More Xsequence Files

Figure 18:
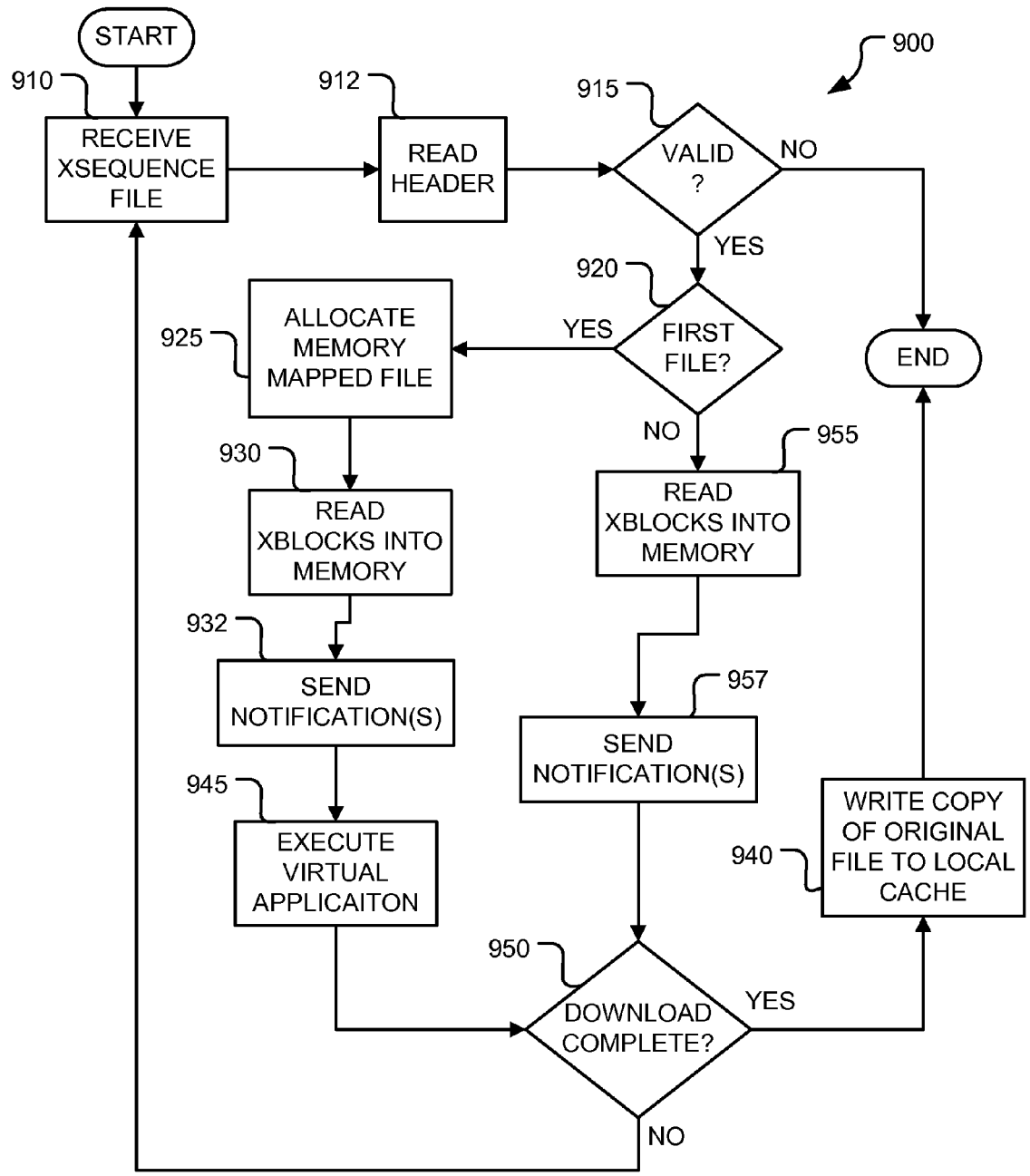
FIG. 18 is a flow diagram of a method that may be performed by the Sandbox Manager.

FIG. 18 is a flow diagram of a method 900 that may be performed by the Sandbox Manager 134. In particular, the method 900 may be performed by the directing process 129 of the Sandbox Manager 134.

In first block 910, the Sandbox Manager 134 receives an xsequence file.

In next block 912, the Sandbox Manager 134 reads the information stored in the file header portion 610 (see FIG. 16) of the xsequence file.

In decision block 915 (using the information read in block 912), the Sandbox Manager 134 determines whether the xsequence file received in block 910 is valid. An xsequence file must be validated (or authenticated) before it can be used. As mentioned above, the Sandbox Manager 134 may validate an xsequence file by confirming the signature value 622 stores the predetermined value (e.g., the unique string "xsequenced-file"). Further, to ensure compatibility, the Sandbox Manager 134 may confirm that the major and minor versions match those of the virtual runtime engine 131.

The following pseudo code provides a non-limiting example of an implementation of blocks 912 and 915.

```
Method ReadXSequenceFileHeader(File)
    Byte[ ] signature = File.Read(GLOBAL_SIGNATURE_LENGTH)
    For (int i = 0; i < GLOBAL_SIGNATURE_LENGTH; i++)
    Begin
        If (signature[i] != GLOBAL_SIGNATURE[i]) Then
            Throw Invalid signature exception
        End
    End
    MajorVersion = File.ReadInt32( )
    MinorVersion = File.ReadInt32( )
    If (MajorVersion != CURRENT_MAJOR_VERSION) or
       (MinorVersion != CURRENT_MINOR_VERSION)
    Begin
        Throw Invalid version exception
    End
    Flags = File.ReadInt32( )
    Size = File.ReadInt64( )
    SourceFileSize = File.ReadInt64( )
    BlockSize = File.ReadInt32( )
    BlockCount = File.ReadInt32( )
    BlocksPerChapter = File.ReadInt32( )
```

In the pseudo code above, if the signature value 622 (read into variable "signature") does not equal the predetermined value (stored in the constant "GLOBAL_SIGNATURE"), an exception is generated. Further, if the major version identifier 636 (read into variable "MajorVersion") does not match the major version of the virtual runtime engine 131 (stored in the constant "CURRENT_MAJOR_VERSION") or the minor version identifier 638 (read into variable "MinorVersion") does not match the major version of the virtual runtime engine 131 (stored in the constant "CURRENT_MINOR_VERSION"), an exception is generated. After the xsequence file has been verified, in the pseudo code above, the remaining data stored in the file header portion 610 is read (e.g., the flags 625, the size indicator 626, the indicator of size of the original file 628, the indicator of size of the xblocks 630, the number of xblocks indicator 632, and the number of xblocks per chapter indicator 634). At this point, the Sandbox Manager 134 knows the number of blocks stored in the xsequence file (which is provided by the number of xblocks indicator 632) and block sizes (which is provided by the indicator of size of the xblocks 630).

The decision in decision block 915 is "YES" when Sandbox Manager 134 determines the xsequence file is valid. Otherwise, the decision in decision block 915 is "NO" when Sandbox Manager 134 determines the xsequence file is invalid. By way of a non-limiting example, the decision in decision block 915 is "NO" when the pseudo code above generates an exception because the signature value 622 does not equal the predetermined value, the major version identifier 636 does not match the major version of the virtual runtime engine 131, and/or the minor version identifier 638 does not match the minor version of the virtual runtime engine 131. Otherwise, in this example, the decision in decision block 915 is "YES."

When the decision in decision block 915 is "NO," the method 900 terminates.

As mentioned above, the xsequence files are configured to be transferred from one computing device to another (e.g., using conventional streaming methods). When the client computing device 9 receives an xsequence file from the server computing device 7, portions of the original file contained in the received xsequence file are used to populate a copy of the original file constructed or assembled on the client computing device 9.

When the decision in decision block 915 is "YES," in decision block 920, the Sandbox Manager 134 determines whether the xsequence file received is the first one for the original file. The decision in decision block 920 is "YES" when the xsequence file received in block 910 is the first one for the original file. Otherwise, the decision in decision block 920 is "NO" when one or more xsequence files have been received previously for the original file.

Figure 15:
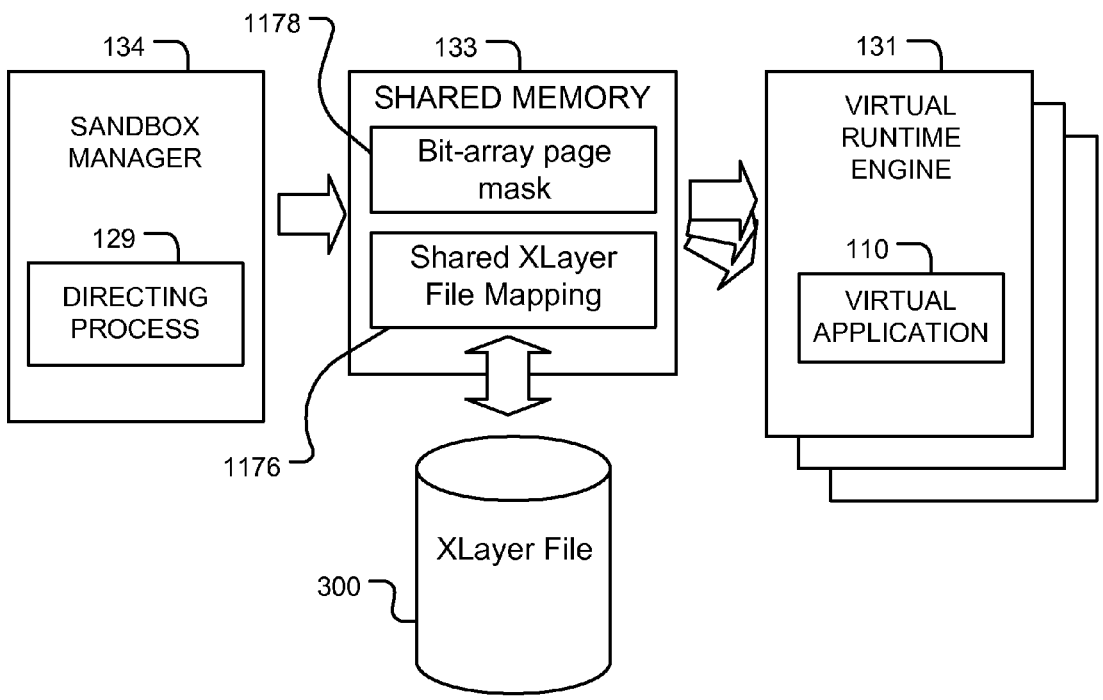
FIG. 15 is an illustration of data structures uses to implement dynamic population of an xlayer file on the client computing device.

When the decision in decision block 920 is "YES," in block 925, the Sandbox Manager 134 allocates the memory mapped file 1176 illustrated in FIG. 15. The memory mapped file 1176 is not yet populated with data at this point. Alternatively, the Sandbox Manager 134 may create the memory mapped file 1176 when the Sandbox Manager 134 receives the model file. In such embodiments, block 925 is omitted from the method 900 and when the decision in decision block 920 is "YES," the Sandbox Manager 134 advances directly to block 930.

In block 930, the Sandbox Manager 134 reads the data portions 680 of the xblocks into the memory mapped file 1176 (optionally allocated in block 925). As explained above, the block structure 660 includes the xblock identifier 674 that indicates the location in the original file from which the data in the xblock was obtained. The xblock identifier 674 may be used to write the data stored in the xblock in the correct location of the memory mapped file 1176.

The following pseudo code provides a non-limiting example of a method of reading a single xblock into memory.

```
Method ReadXSequenceBlocks(File)
    Byte[ ] signature = File.Read(BLOCK_SIGNATURE_LENGTH)
    For (int i = 0; i < BLOCK_SIGNATURE_LENGTH; i++)
    Begin
        If (signature[i] != BLOCK_SIGNATURE[i]) Then
            Throw Invalid block signature exception
        End
    End
    Flags = File.ReadInt32( )
    CurrentBlockIndex = File.ReadInt32( )
    CurrentBlockOriginId = File.ReadInt32( )
    CurrentBlockSize = File.ReadInt32( )
```

Then, in block 932, the Sandbox Manager 134 sends one or notifications that data has been downloaded. In block 932, the Sandbox Manager 134 may send a notification to the virtual runtime engine 131 (e.g., that signals an event) that the blocks have been downloaded. The following pseudo code provides a non-limiting example of a method of writing the data in an xblock into the correct location of the memory mapped file 1176 and sending a notification to the virtual runtime ermine 131.

```
Method ReadXSequenceData(File, TargetStream)
    Byte[ ] CurrentBlockData = File.Read(CurrentBlockSize)
    TargetStream.Position = CurrentBlockOriginId *
    BlockSize
    TargetStream.Write(CurrentBlockData, BlockSize)
    NotifyBlockDownloaded(CurrentBlockIndex,
    CurrentBlockOriginId)
```

In block 932, the Sandbox Manager 134 may also modify the bit array page mask 1178 before sending the notification to the virtual runtime engine 131.

Then, in block 945, the Sandbox Manager 134 instructs the virtual runtime engine 131 to launch the virtualized application file 140 to thereby execute the virtual application 110. Depending upon the implementation details, at this point, a initial execution xsequence file may have been downloaded and used to initiate execution of the virtual application 110.

However, the data stored in the initial execution xsequence file may be inadequate to support all features of the virtual application 110. Therefore, in decision block 950, the Sandbox Manager 134 determines whether all of the xsequence files have been downloaded. The method 1000 illustrated in FIG. 7 and described above is used to determine the order in which the xsequence files are downloaded and to request the download of each of the xsequence files in accordance with that order. Then, the Sandbox Manager 134 advances to decision block 950.

When the decision in decision block 920 is "NO," in block 955, the Sandbox Manager 134 reads the data portions 680 of the xblocks into the memory mapped file 1176 (optionally allocated in block 925). Block 955 may be substantially identical to block 930.

Then in block 957, the Sandbox Manager 134 sends one or more notifications that blocks have been downloaded. Block 957 may be substantially identical to block 932. Then, the Sandbox Manager 134 advances to decision block 950.

The decision in decision block 950 is "YES" when all of the xsequence files have been downloaded. The decision in decision block 950 is "NO" when all of the xsequence files have not been downloaded.

When the decision in decision block 950 is "NO," the Sandbox Manager 134 returns to block 910 whereat the Sandbox Manager 134 receives another xsequence file.

When the decision in decision block 950 is "YES," in block 935, in block 940, the copy of the original file (which is at least partially populated) is written to the local cache 139 illustrated in FIG. 2. The following pseudo code provides a non-limiting example of a method of copying the copy of the original file to the local cache 139.

```
Method WriteXSequenceData(TargetStream, FileName)
    TargetStream.Position = 0
    FileTarget = OpenFile(FileName)
    For (int i; i < TargetStream.Length; i++)
        FileTarget.WriteByte(TargetStream.ReadByte)
    End
```

Thus, the Sandbox Manager 134 need not wait until the entire original file has been assembled to instruct the virtual runtime engine 131 to execute the virtual application 110. In other words, a partially assembled version of the original file may be written to the local cache 139 illustrated in FIG. 2.

The copy of the original file is illustrated in FIG. 2 as the virtualized application file 140 (e.g., a copy of the xlayer file 300) stored in the local cache 139.

Computing Devices

Figure 28:
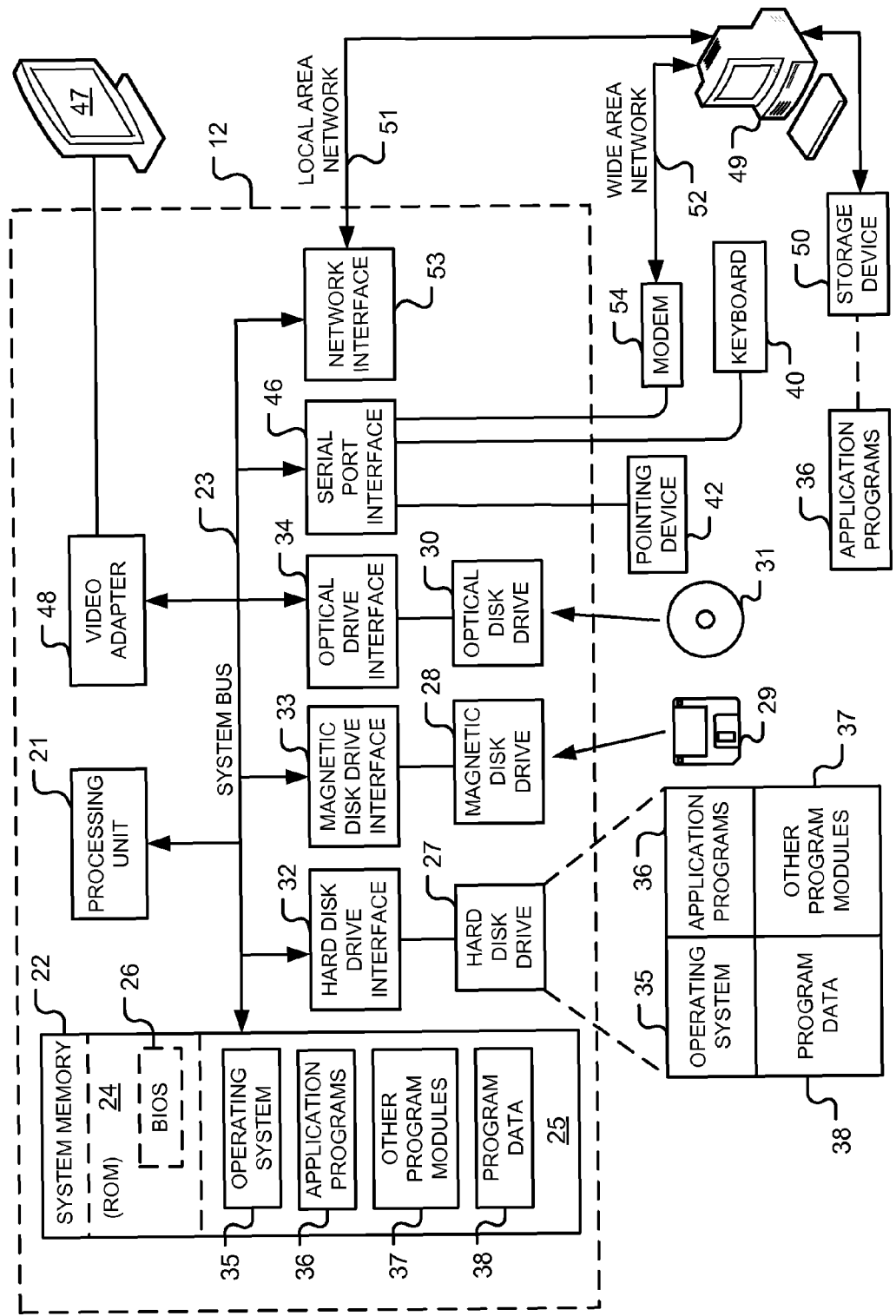
FIG. 28 is a diagram of a hardware environment and an operating environment in which one or more of the computing devices of the system of FIG. 1 may be implemented.

FIG. 28 is a diagram of hardware and an operating environment in conjunction with which implementations of the virtual application file 140, the xlayer file 300, the authoring tool 170, the Sandbox Manager 134, the Client Application 132, and/or virtual runtime engine 131 may be practiced. The description of FIG. 28 is intended to provide a brief, general description of suitable computer hardware and a suitable computing environment in which implementations may be practiced. Although not required, implementations are described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that implementations may be practiced with other computer system configurations, including hand-held devices, multiprocessor systems, microprocessor-based or programmable consumer electronics, network PCs, minicomputers, mainframe computers, and the like. Implementations may also be practiced in distributed computing environments where tasks are performed by remote processing devices that are linked through a communications network. In a distributed computing environment, program modules may be located in both local and remote memory storage devices.

The exemplary hardware and operating environment of FIG. 28 includes a general-purpose computing device in the form of a computing device 12. Each of the virtual application file 140, the xlayer file 300, the authoring tool 170, the Sandbox Manager 134, the Client Application 132, and/or virtual runtime engine 131 may be implemented using one or more computing devices like the computing device 12. By way of non-limiting example, the virtual application file 140, the xlayer file 300, the authoring tool 170, the Sandbox Manager 134, the Client Application 132, and/or virtual runtime engine 131 may be implemented on the computing device 12. Further, each of the server computing device 7, the model building server 8, the client computing device 9, and the computing device 11 may be implemented by computing devices substantially similar to the computing device 12.

The computing device 12 includes the system memory 22, a processing unit 21, and a system bus 23 that operatively couples various system components, including the system memory 22, to the processing unit 21. There may be only one or there may be more than one processing unit 21, such that the processor of computing device 12 comprises a single central-processing unit (CPU), or a plurality of processing units, commonly referred to as a parallel processing environment. The computing device 12 may be a conventional computer, a distributed computer, or any other type of computer.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computing device 12, such as during start-up, is stored in ROM 24. The computing device 12 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules, and other data for the computing device 12. It should be appreciated by those skilled in the art that any type of computer-readable media which can store data that is accessible by a computer, such as magnetic cassettes, flash memory cards, USB drives, digital video disks, Bernoulli cartridges, random access memories (RAMs), read only memories (ROMs), and the like, may be used in the exemplary operating environment. As is apparent to those of ordinary skill in the art, the hard disk drive 27 and other forms of computer-readable media (e.g., the removable magnetic disk 29, the removable optical disk 31, flash memory cards, USB drives, and the like) accessible by the processing unit 21 may be considered components of the system memory 22.

A number of program modules may be stored on the hard disk drive 27, magnetic disk 29, optical disk 31, ROM 24, or RAM 25, including an operating system 35, one or more application programs 36, other program modules 37, and program data 38. A user may enter commands and information into the computing device 12 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus 23, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computing device 12 may operate in a networked environment using logical connections to one or more remote computers, such as remote computer 49. These logical connections are achieved by a communication device coupled to or a part of the computing device 12 (as the local computer). Implementations are not limited to a particular type of communications device. The remote computer 49 may be another computer, a server, a router, a network PC, a client, a memory storage device, a peer device or other common network node, and typically includes many or all of the elements described above relative to the computing device 12. The remote computer 49 may be connected to a memory storage device 50. The logical connections depicted in FIG. 28 include a local-area network (LAN) 51 and a wide-area network (WAN) 52. Such networking environments are commonplace in offices, enterprise-wide computer networks, intranets and the Internet.

When used in a LAN-networking environment, the computing device 12 is connected to the local area network 51 through a network interface or adapter 53, which is one type of communications device. When used in a WAN-networking environment, the computing device 12 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computing device 12, or portions thereof, may be stored in the remote computer 49 and/or the remote memory storage device 50. It is appreciated that the network connections shown are exemplary and other means of and communications devices for establishing a communications link between the computers may be used.

The computing device 12 and related components have been presented herein by way of particular example and also by abstraction in order to facilitate a high-level view of the concepts disclosed. The actual technical design and implementation may vary based on particular implementation while maintaining the overall nature of the concepts disclosed.

Returning to FIGS. 1B and 1C, the system memory 22A and the system memory 22B may each be substantially similar to the system memory 22. Thus, the host operating system 35A, the host operating system 35B, the virtual application file 140, the xlayer file 300, the authoring tool 170, the Sandbox Manager 134, the Client Application 132, and/or virtual runtime engine 131 may be stored as computer executable components on the system memory 22A and/or 22B. Each of the host operating system 35A, the host operating system 35B, the virtual application file 140, the xlayer file 300, the authoring tool 170, and/or virtual runtime engine may be implemented using software components that are executable by the processing unit 21 and when executed perform the functions described above. Further, each of the methods 500, 505, 518, 540, 700, 800, 900, 1000, 1100, and 1200 may be implemented as computer executable instructions that are executable by the processing unit 21.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A computer-implemented method performed by a server computing device connected to a requesting computing device, the method comprising:
   receiving a request from the requesting computing device to download an application file via a conventional download protocol without using a specialized streaming protocol, when executing, the application file implementing an application;
   in response to the request, downloading a streaming model file and one or more initial execution files to the requesting computing device via the conventional download protocol without using a specialized streaming protocol, the one or more initial execution files comprising a first portion of the application file that is less than the entire application file but contains enough data to initiate execution of the application on the requesting computing device, the streaming model file comprising download information; and
   as the application is executing on the requesting computing device and until the entire application file has been downloaded to the requesting computing device, receiving requests from the requesting computing device to download one or more other files each comprising another portion of the application file in accordance with the download information of the streaming model file, and in response to the requests to download the one or more other files, downloading the one or more other files to the requesting computing device via the conventional download protocol without using a specialized streaming protocol,
   wherein the requests to download the one or more other files comprise (i) a request to download one or more sequence files each comprising a portion of the application file not contained in the first portion of the application file, and (ii) a request to download one or more rest files each comprising portions of the application file ordered by frequency in which the portions of the application file were accessed during a profiling process performed when the application was executed previously.

2. The computer-implemented method of claim 1, wherein the application file is a virtualized application file that when executed, at least partially implements a virtual application.

3. The computer-implemented method of claim 1, wherein the conventional download protocol comprises Hypertext Transfer Protocol, File Transfer Protocol, or Server Message Block Protocol.

4. The computer-implemented method of claim 1, wherein the download information indicates each of the one or more sequence files is to be downloaded before the one or more rest files, and
   the server computing device receives the request to download the one or more sequence files to the requesting computing device before receiving the request to download any of the one or more rest files to the requesting computing device.

5. The computer-implemented method of claim 1, wherein the download information comprises a data structure storing one or more download orders, and
   the requesting computing device is configured to analyze the data structure to determine an order in which to send requests to download the one or more other files.

6. The computer-implemented method of claim 1, wherein each of the one or more initial execution files comprises one or more blocks of data,
   each of the one or more blocks of data comprises an identifier that identifies a location in a local copy of the application file whereat the block of data is to be written by the requesting computing device, and the application is executed by the requesting computing device by executing the local copy of the application file.

7. The computer-implemented method of claim 6, wherein each of the one or more initial execution files further comprises version information identifying a runtime engine configured to execute the local copy of the application file.

8. The computer-implemented method of claim 1, wherein the downloading of the streaming model file, the one or more initial execution files, and the one or more other files are performed over a download pipeline, and the method further comprises downloading the one or more rest files when the download pipeline is idle.

9. The computer-implemented method of claim 1, wherein together the one or more initial execution files, the one or more sequence files, and the one or more rest files include duplicate copies of portions of the application file.

10. The computer-implemented method of claim 1, wherein the streaming model file was created by a model building process that:

organized blocks of data of the application file into a data structure based at least in part on an order in which the blocks of data were accessed by the application when executed previously at least once, and divided the blocks of data into the one or more initial execution files and the one or more other files by traversing the data structure.

11. The computer-implemented method of claim 10, wherein the data structure comprises an origin, and blocks of data in the one or more initial execution files are closer to the origin than blocks of data in the one or more other files.

12. The computer-implemented method of claim 11, wherein the download information specifies when each of the one or more other files is to be downloaded based on distances of the blocks of data stored in the one or more other files from the origin.

13. The computer-implemented method of claim 1, wherein the streaming model file was created by a model building process that:

organized blocks of data of the application file into a directed graph structure based at least in part on an order in which the blocks of data were accessed by the application when executed previously at least once, the directed graph structure comprising an origin, and divided the blocks of data into the one or more initial execution files and the one or more other files by traversing the directed graph.

14. The computer-implemented method of claim 13, wherein the one or more sequence files comprise blocks of data organized by their distance from the origin.

15. The computer-implemented method of claim 14, wherein the one or more rest files comprise blocks of data organized by their frequency in the directed graph structure.

16. The computer-implemented method of claim 14, wherein the order in which the blocks of data were accessed by the application when executed previously at least once was recorded in one or more transcripts, and the one or more rest files comprise blocks of data organized by their frequency in the one or more transcripts.

17. The computer-implemented method of claim 1, wherein the one or more initial execution files each comprises one or more blocks of data, the one or more sequence files each comprises one or more blocks of data, the one or more rest files each comprises one or more blocks of data, the one or more blocks of data of one or more initial execution files, the one or more sequence files, and the one or more rest files each comprises an identifier that identifies a location in a local copy of the application file whereat the block of data is to be written by the requesting computing device, and the application is executable by the requesting computing device by executing the local copy of the application file.

18. A computer-implemented method performed by a server computing device connected to a requesting computing device, the method comprising:

receiving a request from the requesting computing device to download an application file via a conventional download protocol without using a specialized streaming protocol, when executing, the application file implementing an application;

in response to the request, downloading a streaming model file and one or more initial execution files to the requesting computing device via the conventional download protocol without using a specialized streaming protocol, the one or more initial execution files comprising a first portion of the application file that is less than the entire application file but contains enough data to initiate execution of the application on the requesting computing device, the streaming model file comprising download information, the streaming model file having been created by a model building process that (a) organized blocks of data of the application file into a data structure based at least in part on an order in which the blocks of data were accessed by the application when executed previously at least once, and (b) divided the blocks of data into the one or more initial execution files and one or more other files by traversing the data structure; and as the application is executing on the requesting computing device and until the entire application file has been downloaded to the requesting computing device, receiving requests from the requesting computing device to download the one or more other files each comprising another portion of the application file in accordance with the download information of the streaming model file, and in response to the requests to download the one or more other files, downloading the one or more other files to the requesting computing device via the conventional download protocol without using a specialized streaming protocol.

19. The computer-implemented method of claim 18, wherein the data structure comprises an origin, and the blocks of data in the one or more initial execution files are closer to the origin than the blocks of data in the one or more other files.

20. The computer-implemented method of claim 19, wherein the download information specifies when each of the one or more other files is to be downloaded based on distances of the blocks of data stored in the one or more other files from the origin.

21. The computer-implemented method of claim 18, wherein the application file is a virtualized application file that when executed, at least partially implements a virtual application.

22. The computer-implemented method of claim 18, wherein the conventional download protocol comprises Hypertext Transfer Protocol, File Transfer Protocol, or Server Message Block Protocol.

23. The computer-implemented method of claim 18, wherein the one or more other files comprise one or more sequence files and one or more rest files,
    the download information indicates each of the one or more sequence files is to be downloaded before the one or more rest files, and
    the server computing device receives a request to download each of the one or more sequence files to the requesting computing device before receiving a request to download any of the one or more rest files to the requesting computing device.

24. The computer-implemented method of claim 18, wherein the download information comprises a data structure storing one or more download orders, and
    the requesting computing device is configured to analyze the data structure to determine an order in which to send requests to download the one or more other files.

25. The computer-implemented method of claim 18, wherein each of the one or more blocks of data of the one or more initial execution files comprises an identifier that identifies a location in a local copy of the application file whereat the block of data is to be written by the requesting computing device, and
    the application is executed by the requesting computing device by executing the local copy of the application file.

26. The computer-implemented method of claim 25, wherein each of the one or more initial execution files further comprises version information identifying a runtime engine configured to execute the local copy of the application file.

27. The computer-implemented method of claim 18, wherein the requests to download one or more other files comprise requests to download sequence files each sequence file comprising a portion of the data of the application file that is not included in the first portion of the application file.

28. The computer-implemented method of claim 27, wherein the downloading of the streaming model file, the one or more initial execution files, and the one or more other files are performed over a download pipeline,
    the requests to download the one or more other files comprise a request to download a rest file, and
    the method further comprises downloading the rest file when the download pipeline is idle.

29. The computer-implemented method of claim 18, wherein the requests to download the one or more other files comprise a request to download one or more sequence files each comprising a portion of the application file not contained in the first portion of the application file,
    the requests to download the one or more other files further comprise a request to download one or more rest files each comprising portions of the application file ordered by frequency in which the portions of the application file were accessed during a profiling process performed when the application was executed previously, and
    together the one or more initial execution files, the one or more sequence files, and the one or more rest files include duplicate copies of portions of the application file.

30. The computer-implemented method of claim 18, wherein
    the one or more other files comprise (a) one or more sequence files that each comprise one or more blocks of data, and (b) one or more rest files that each comprise one or more blocks of data,
    the one or more blocks of data of one or more initial execution files, the one or more sequence files, and the one or more rest files each comprises an identifier that identifies a location in a local copy of the application file whereat the block of data is to be written by the requesting computing device, and
    the application is executed by the requesting computing device by executing the local copy of the application file.

31. A computer-implemented method performed by a server computing device connected to a requesting computing device, the method comprising:
    receiving a request from the requesting computing device to download an application file via a conventional download protocol without using a specialized streaming protocol, when executing, the application file implementing an application;
    in response to the request, downloading a streaming model file and one or more initial execution files to the requesting computing device via the conventional download protocol without using a specialized streaming protocol, the one or more initial execution files comprising a first portion of the application file that is less than the entire application file but contains enough data to initiate execution of the application on the requesting computing device, the streaming model file comprising download information, the streaming model file having been created by a model building process that (a) organized blocks of data of the application file into a directed graph structure based at least in part on an order in which the blocks of data were accessed by the application when executed previously at least once, and (b) divided the blocks of data into the one or more initial execution files and one or more other files by traversing the directed graph, the directed graph structure comprising an origin; and
    as the application is executing on the requesting computing device and until the entire application file has been downloaded to the requesting computing device, receiving requests from the requesting computing device to download the one or more other files each comprising another portion of the application file in accordance with the download information of the streaming model file, and in response to the requests to download the one or more other files, downloading the one or more other files to the requesting computing device via the conventional download protocol without using a specialized streaming protocol.

32. The computer-implemented method of claim 31, wherein the one or more other files comprise one or more sequence files, and
    the one or more sequence files each comprise one or more blocks of data organized by their distance from the origin.

33. The computer-implemented method of claim 32, wherein the one or more other files further comprise one or more rest files, and
    the one or more rest files each comprise one or more blocks of data organized by their frequency in the directed graph structure.

34. The computer-implemented method of claim 32, wherein the order in which the blocks of data were accessed by the application when executed previously at least once was recorded in one or more transcripts,
    the one or more other files further comprise one or more rest files, and
    the one or more rest files each comprise one or more blocks of data organized by their frequency in the one or more transcripts.

35. The computer-implemented method of claim 31, wherein the application file is a virtualized application file that when executed, at least partially implements a virtual application.

36. The computer-implemented method of claim 31, wherein the conventional download protocol comprises Hypertext Transfer Protocol, File Transfer Protocol, or Server Message Block Protocol.

37. The computer-implemented method of claim 31, wherein the one or more other files comprise one or more sequence files and one or more rest files, the download information indicates each of the one or more sequence files is to be downloaded before the one or more rest files, and the server computing device receives a request to download each of the one or more sequence files to the requesting computing device before receiving a request to download any of the one or more rest files to the requesting computing device.

38. The computer-implemented method of claim 31, wherein the download information comprises a data structure storing one or more download orders, and the requesting computing device is configured to analyze the data structure to determine an order in which to send requests to download the one or more other files.

39. The computer-implemented method of claim 31, wherein each of the one or more blocks of data of the one or more initial execution files comprises an identifier that identifies a location in a local copy of the application file whereat the block of data is to be written by the requesting computing device, and the application is executed by the requesting computing device by executing the local copy of the application file.

40. The computer-implemented method of claim 39, wherein each of the one or more initial execution files further comprises version information identifying a runtime engine configured to execute the local copy of the application file.

41. The computer-implemented method of claim 31, wherein the requests to download one or more other files comprise requests to download sequence files each sequence file comprising a portion of the data of the application file that is not included in the first portion of the application file.

42. The computer-implemented method of claim 41, wherein the downloading of the streaming model file, the one or more initial execution files, and the one or more other files are performed over a download pipeline, the requests to download the one or more other files comprise a request to download a rest file, and the method further comprises downloading the rest file when the download pipeline is idle.

43. The computer-implemented method of claim 31, wherein the requests to download the one or more other files comprise a request to download one or more sequence files each comprising a portion of the application file not contained in the first portion of the application file, the requests to download the one or more other files further comprise a request to download one or more rest files each comprising portions of the application file ordered by frequency in which the portions of the application file were accessed during a profiling process performed when the application was executed previously, and together the one or more initial execution files, the one or more sequence files, and the one or more rest files include duplicate copies of portions of the application file.

44. The computer-implemented method of claim 31, wherein the blocks of data in the one or more initial execution files are closer to the origin than the blocks of data in the one or more other files.

45. The computer-implemented method of claim 44, wherein the download information specifies when each of the one or more other files is to be downloaded based on distances of the blocks of data stored in the one or more other files from the origin.

46. The computer-implemented method of claim 31, wherein the one or more other files comprise (a) one or more sequence files that each comprises one or more blocks of data, and (b) one or more rest files that each comprise one or more blocks of data, the one or more blocks of data of one or more initial execution files, the one or more sequence files, and the one or more rest files each comprises an identifier that identifies a location in a local copy of the application file whereat the block of data is to be written by the requesting computing device, and the application is executed by the requesting computing device by executing the local copy of the application file.

\* \* \* \* \*